US012769964B2

(12) United States Patent
Yamasaki

(10) Patent No.: US 12,769,964 B2
(45) Date of Patent: Oct. 20, 2026

(54) CONTROL SYSTEM

(71) Applicant: CANON KABUSHIKI KAISHA, Tokyo (JP)

(72) Inventor: Toshiteru Yamasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 304 days.

(21) Appl. No.: 18/584,347

(22) Filed: Feb. 22, 2024

(65) Prior Publication Data

US 2024/0193385 A1 Jun. 13, 2024

Related U.S. Application Data

(63) Continuation of application No. PCT/JP2022/033625, filed on Sep. 1, 2022.

(30) Foreign Application Priority Data

Sep. 2, 2021 (JP) ................................ 2021-142984

(51) Int. Cl.
*G06V 10/10* (2022.01)
*G06K 7/10* (2006.01)
(Continued)

(52) U.S. Cl.
CPC ....... *G06K 7/10722* (2013.01); *G06K 7/1413* (2013.01); *G06K 7/1417* (2013.01);
(Continued)

(58) Field of Classification Search
CPC ... G06K 7/10722; G06K 7/1417; G06V 10/10
(Continued)

(56) References Cited

U.S. PATENT DOCUMENTS 5,555,504 A 9/1996 Lepper et al.
10,954,067 B1 3/2021 Theobald et al.
(Continued)

FOREIGN PATENT DOCUMENTS

AU 2015100894 A4 * 8/2015
JP 2000280143 A 10/2000
(Continued)

OTHER PUBLICATIONS

Extended European Search Report issued in European Appln. No. 22864772.3 mailed May 16, 2025.
(Continued)

*Primary Examiner* — Jeffery A Williams
(74) *Attorney, Agent, or Firm* — ROSSI, KIMMS & McDOWELL LLP

(57) ABSTRACT

In a control system, at least one first mark indicating information on at least the returnable box is attached to a returnable box, and a mark reading portion 140 for picking up the returnable box, an image analyzing portion 150 for analyzing an image, of the first mark of the returnable box, picked up by the mark reading portion and acquiring the information on the returnable box and record controlling portion 130 for constructing a database by associating the information on the returnable box acquired by the image analyzing portion 150 with at least one of information on time and information on an order of the molding member.

24 Claims, 36 Drawing Sheets

(51) Int. Cl.
*G06K 7/14* (2006.01)
*G06V 20/62* (2022.01)

(52) U.S. Cl.
CPC .............. *G06V 10/10* (2022.01); *G06V 20/63* (2022.01); *G06V 2201/02* (2022.01)

(58) Field of Classification Search
USPC ............................................................ 348/91
See application file for complete search history.

(56) References Cited

U.S. PATENT DOCUMENTS

| | | | | |
|---|---|---|---|---|
| 2008/0078827 | A1* | 4/2008 | Geiss | G06Q 10/087 235/375 |
| 2016/0096298 | A1 | 4/2016 | Uchiyama | |
| 2017/0291343 | A1 | 10/2017 | Uchiyama | |
| 2018/0025460 | A1 | 1/2018 | Watanabe et al. | |
| 2018/0108063 | A1* | 4/2018 | Yap | G06K 7/1417 |
| 2018/0307199 | A1 | 10/2018 | Sekiya | |
| 2018/0326744 | A1* | 11/2018 | Sawamura | B41J 2/473 |
| 2020/0307054 | A1 | 10/2020 | Tanaka et al. | |
| 2022/0253046 | A1 | 8/2022 | Baudin et al. | |
| 2022/0274729 | A1* | 9/2022 | Kelly | B65B 61/025 |
| 2023/0264401 | A1 | 8/2023 | Hosomoto | |
| 2024/0193385 | A1 | 6/2024 | Yamasaki | |

FOREIGN PATENT DOCUMENTS

| | | | |
|---|---|---|---|
| JP | 2000355379 | A | 12/2000 |
| JP | 2005063095 | A | 3/2005 |
| JP | 3714994 | B2 | 11/2005 |
| JP | 2013012100 | A | 1/2013 |
| JP | 6434441 | B2 | 12/2018 |
| JP | 6677701 | B2 | 4/2020 |
| JP | 6851688 | B2 | 3/2021 |
| JP | 7174134 | B2 | 11/2022 |
| JP | 7263607 | B2 | 4/2023 |
| JP | 7397200 | B2 | 12/2023 |
| WO | 2020260030 | A1 | 12/2020 |

OTHER PUBLICATIONS

International Search Report issued in Intl. Appln. No. PCT/JP2022/033625, mailed Nov. 8, 2022. English translation provided.
Written Opinion issued in Intl. Appln. No. PCT/JP2022/033625, mailed Nov. 8, 2022.

* cited by examiner (c)

| 1001 | 1002 | 1003 | 1004 | 1005 | 1006 | 1007 |
|---|---|---|---|---|---|---|
| MARK No. | BAR CODE No. | KIND | AGING TIME | COMP TIME | SHIPBL/UN | PRIORITY |
| 400a | 0001 | A | 3 | 2110091000 | UNSHIPBL | |
| | | | | | | |
| | | | | | | |

(a)

(b)

1001 1002 1003 1004 1005 1006 1007

| MARK No. | BAR CODE No. | KIND | AGING TIME | COMP TIME | SHIPBL/UN | PRIORITY |
|---|---|---|---|---|---|---|
| 400a | 0001 | A | 3 | 2110091000 | UNSHIPBL | |
| 400b | 0010 | A | 3 | 2110091020 | UNSHIPBL | |
| 400c | 0012 | A | 3 | 2110091040 | UNSHIPBL | |
| 400d | 0005 | A | 3 | 2110091100 | UNSHIPBL | |
| 400e | 0100 | A | 3 | 2110091120 | UNSHIPBL | |
| 400f | 0002 | B | 4 | 2110090800 | UNSHIPBL | |
| 400g | 0032 | B | 4 | 2110090830 | UNSHIPBL | |
| 400h | 0046 | B | 4 | 2110090900 | UNSHIPBL | |
| 400i | 0008 | B | 4 | 2110090930 | UNSHIPBL | |
| | | | | | | |
| | | | | | | |

(a)

(b)

(a)

1001 1002 1003 1004 1005 1006 1007

| MARK No. | BAR CODE No. | KIND | AGING TIME | COMP TIME | SHIPBL/UN | PRIORITY |
|---|---|---|---|---|---|---|
| 400a | 0001 | A | 3 | 2110091000 | SHIPBL | 1 |
| 400b | 0010 | A | 3 | 2110091020 | UNSHIPBL | |
| 400c | 0012 | A | 3 | 2110091040 | UNSHIPBL | |
| 400d | 0005 | A | 3 | 2110091100 | UNSHIPBL | |
| 400e | 0100 | A | 3 | 2110091120 | UNSHIPBL | |
| 400f | 0002 | B | 4 | 2110090800 | SHIPBL | 1 |
| 400g | 0032 | B | 4 | 2110090830 | SHIPBL | 2 |
| 400h | 0046 | B | 4 | 2110090900 | SHIPBL | 3 |
| 400i | 0008 | B | 4 | 2110090930 | UNSHIPBL | |
| | | | | | | |
| | | | | | | |

(b)

1001 1002 1003 1004 1005 1006 1007

| MARK No. | BAR CODE No. | KIND | AGING TIME | COMP TIME | SHIPBL/UN | PRIORITY |
|---|---|---|---|---|---|---|
| 400a | 0001 | A | 3 | 2110091000 | SHIPBL | 1 |
| 400b | 0010 | A | 3 | 2110091020 | SHIPBL | 2 |
| 400c | 0012 | A | 3 | 2110091040 | UNSHIPBL | |
| 400d | 0005 | A | 3 | 2110091100 | UNSHIPBL | |
| 400e | 0100 | A | 3 | 2110091120 | UNSHIPBL | |
| 400f | 0002 | B | 4 | 2110090800 | SHIPBL | 1 |
| 400g | 0032 | B | 4 | 2110090830 | SHIPBL | 2 |
| 400h | 0046 | B | 4 | 2110090900 | SHIPBL | 3 |
| 400i | 0008 | B | 4 | 2110090930 | UNSHIPBL | |
| | | | | | | |
| | | | | | | |

Fig. 9

(a)

1001 1002 1003 1004 1005 1006 1007

| MARK No. | BAR CODE No. | KIND | AGING TIME | COMP TIME | SHIPBL/UN | PRIORITY |
|---|---|---|---|---|---|---|
| 400a | 0001 | A | 3 | 2110091000 | SHIPPED | |
| 400b | 0010 | A | 3 | 2110091020 | SHIPBL | 1 |
| 400c | 0012 | A | 3 | 2110091040 | SHIPBL | 2 |
| 400d | 0005 | A | 3 | 2110091100 | SHIPBL | 3 |
| 400e | 0100 | A | 3 | 2110091120 | SHIPBL | 4 |
| 400f | 0002 | B | 4 | 2110090800 | SHIPBL | 1 |
| 400g | 0032 | B | 4 | 2110090830 | SHIPBL | 2 |
| 400h | 0046 | B | 4 | 2110090900 | SHIPBL | 3 |
| 400i | 0008 | B | 4 | 2110090930 | SHIPBL | 4 |

(b)

1001 1002 1003 1004 1005 1006 1007 1011

| MARK No. | BAR CODE No. | KIND | AGING TIME | COMP TIME | SHIPBL/UN | PRIORITY | DEST |
|---|---|---|---|---|---|---|---|
| 400a | 0001 | A | 3 | 2110091000 | SHIPPED | | A |
| 400b | 0010 | A | 3 | 2110091020 | SHIPPED | | B |
| 400c | 0012 | A | 3 | 2110091040 | SHIPPED | | C |
| 400d | 0005 | A | 3 | 2110091100 | SHIPPED | | D |
| 400e | 0100 | A | 3 | 2110091120 | SHIPPED | | E |
| 400f | 0002 | B | 4 | 2110090800 | SHIPPED | | F |
| 400g | 0032 | B | 4 | 2110090830 | SHIPPED | | G |
| 400h | 0046 | B | 4 | 2110090900 | SHIPPED | | H |
| 400i | 0008 | B | 4 | 2110090930 | SHIPPED | | I |

Fig. 12

1001 1002 1003 1004 1005 1006 1007 1008 1009

| MARK No. | BAR CODE No. | KIND | AGING TIME | COMP TIME | SHIPBL/UN | PRIORITY | VIRTUAL PSTN INFMTN | | REAL COORDINATE | |
|---|---|---|---|---|---|---|---|---|---|---|
| | | | | | | | CORD XX | CORD YY | CORD XXX | CORD YYY |
| 400a | 0001 | A | 3 | 2110091000 | SHIPPED | | | | | |
| 400b | 0010 | A | 3 | 2110091020 | SHIPBL | 1 | XX2 | YY2 | XXX2 | YYY2 |
| 400c | 0012 | A | 3 | 2110091040 | SHIPBL | 2 | XX3 | YY3 | XXX3 | YYY3 |
| 400d | 0005 | A | 3 | 2110091100 | SHIPBL | 3 | XX4 | YY4 | XXX4 | YYY4 |
| 400e | 0100 | A | 3 | 2110091120 | SHIPBL | 4 | XX5 | YY5 | XXX5 | YYY5 |
| 400f | 0002 | B | 4 | 2110090800 | SHIPBL | 1 | XX6 | YY6 | XXX6 | YYY6 |
| 400g | 0032 | B | 4 | 2110090830 | SHIPBL | 2 | XX7 | YY7 | XXX7 | YYY7 |
| 400h | 0046 | B | 4 | 2110090900 | SHIPBL | 3 | XX8 | YY8 | XXX8 | YYY8 |
| 400i | 0008 | B | 4 | 2110090930 | SHIPBL | 4 | XX9 | YY9 | XXX9 | YYY9 |

Fig. 14

| MARK No. | BAR CODE No. | KIND | AGING TIME | COMP TIME | SHIPBL/UN | PRIORITY | DISP PSTN |
|---|---|---|---|---|---|---|---|
| 400k | 0001 | K | 10 | 2110091000 | UNSHIPBL | | P1 |
| | | | | | | | |
| | | | | | | | |
| | | | | | | | |

(a)

(b)

1031 1032 1033 1034 1035

| MARK No. | BAR CODE No. | KIND | COMP TIME | ERASING TIME |
|---|---|---|---|---|
| 400a | 0001 | A | 2110091000 | 2110091820 |
| | | | | |
| | | | | |

(a)

1001 1002 1003 1004 1005 1006 1007

| MARK No. | BAR CODE No. | KIND | AGING TIME | COMP TIME | SHIPBL/UN | PRIORITY |
|---|---|---|---|---|---|---|
| 400a | 0001 | | | | | |
| 400b | 0010 | A | 3 | 2110091020 | SHIPBL | 1 |
| 400c | 0012 | A | 3 | 2110091040 | SHIPBL | 2 |
| 400d | 0005 | A | 3 | 2110091100 | SHIPBL | 3 |
| 400e | 0100 | A | 3 | 2110091120 | SHIPBL | 4 |
| 400f | 0002 | B | 4 | 2110090800 | SHIPBL | 1 |
| 400g | 0032 | B | 4 | 2110090830 | SHIPBL | 2 |
| 400h | 0046 | B | 4 | 2110090900 | SHIPBL | 3 |
| 400i | 0008 | B | 4 | 2110090930 | SHIPBL | 4 |

(b)

1001 1002 1003 1004 1005 1006 1007

| MARK No. | BAR CODE No. | KIND | AGING TIME | COMP TIME | SHIPBL/UN | PRIORITY |
|---|---|---|---|---|---|---|
| 400a | 0001 | C | 6 | 2110091920 | UNSHIPBL | |
| 400b | 0010 | A | 3 | 2110091020 | SHIPBL | 1 |
| 400c | 0012 | A | 3 | 2110091040 | SHIPBL | 2 |
| 400d | 0005 | A | 3 | 2110091100 | SHIPBL | 3 |
| 400e | 0100 | A | 3 | 2110091120 | SHIPBL | 4 |
| 400f | 0002 | B | 4 | 2110090800 | SHIPBL | 1 |
| 400g | 0032 | B | 4 | 2110090830 | SHIPBL | 2 |
| 400h | 0046 | B | 4 | 2110090900 | SHIPBL | 3 |
| 400i | 0008 | B | 4 | 2110090930 | SHIPBL | 4 |

Fig. 17

| MARK No. (BOX) | BAR CODE No. | MARK No. (LID) | BAR CODE No. |
|---|---|---|---|
| 450p | 0251 | 400p | 6020 |
| | | | |
| | | | |

1041 1042 1043 1044

| MARK No. (BOX) | BAR CODE No. | MARK No. (LID) | BAR CODE No. |
|---|---|---|---|
| 450p | 0251 | 400p | 6020 |
| 450q | 0426 | 400q | 1069 |
| 450r | 0651 | 400r | 2054 |

(a)

(b)

1001 1002 1003 1004 1005 1006 1007 1060 1061 1062 1063

| MARK No. | BAR CODE No. | KIND | AGING TIME | COMP TIME | SHIPBL/UN | PRIORITY | MOLD CND | MAX INJCTN | CUSHN AMNT | INSPCTN INF |
|---|---|---|---|---|---|---|---|---|---|---|
| 400a | 0001 | A | 3 | 2110091000 | UNSHIPBL | | 001 | 140 | 5.3 | NOT COMP |
| | | | | | | | | | | |
| | | | | | | | | | | |

(a)

| MARK No. (1101) | BAR CODE No. (1102) | KIND (1103) | AGING TIME (1104) | COMP TIME (1105) | SHIPBL/UN (1106) | PRIORITY (1107) |
|---|---|---|---|---|---|---|
| 500a | 7889 | H | 5 | 2110101000 | UNSHIPBL | |
| | | | | | | |
| | | | | | | |

(b)

1071 1072 1078 1079 1073 1080 1074 1075 1081 1082 1083 1076 1077

| MARK No. | BAR CODE No. | Sp | WORK ID | KIND | CAVITY No. | AGING TIME | COMP TIME | INT PRSS | MAX INJCTN | PRSS INSPCT | SHIPBL/UN | PRIORITY |
|---|---|---|---|---|---|---|---|---|---|---|---|---|
| | | 1 | 2105310001 | J | 1 | 6 | 2105311000 | 20 | 30 | OK | UNSHIPBL | |
| | | 2 | 2105310002 | J | 2 | 6 | 2105311000 | 18 | 30 | OK | UNSHIPBL | |
| | | 3 | 2105310003 | J | 3 | 6 | 2105311000 | 17 | 30 | OK | UNSHIPBL | |
| | | 4 | 2105310004 | J | 4 | 6 | 2105311000 | 15 | 30 | OK | UNSHIPBL | |
| | | 5 | 2105310005 | | | | | | | | | |
| | | 6 | 2105310006 | | | | | | | | | |
| | | 7 | 2105310007 | | | | | | | | | |
| | | 8 | 2105310008 | | | | | | | | | |
| | | 9 | 2105310009 | | | | | | | | | |
| | | 10 | 2105310010 | | | | | | | | | |
| | | 11 | 2105310011 | | | | | | | | | |
| | | 12 | 2105310012 | | | | | | | | | |

Fig. 29A

| MARK No. (1071) | BAR CODE No. (1072) | Sp (1078) | WORK ID (1079) | KIND (1073) | CAVITY No. (1080) | AGING TIME (1074) | COMP TIME (1075) | INT PRSS (1081) | MAX INJCTN (1082) | PRSS INSPCT (1083) | SHIPBL/UN (1076) | PRIORITY (1077) |
|---|---|---|---|---|---|---|---|---|---|---|---|---|
| 400s | 1000 | 1 | 2105310001 | J | 1 | 6 | 2105311000 | 20 | 30 | OK | UNSHIPBL | |
| | | 2 | 2105310002 | J | 2 | 6 | 2105311000 | 18 | 30 | OK | UNSHIPBL | |
| | | 3 | 2105310003 | J | 3 | 6 | 2105311000 | 17 | 30 | OK | UNSHIPBL | |
| | | 4 | 2105310004 | J | 4 | 6 | 2105311000 | 15 | 30 | OK | UNSHIPBL | |
| | | 5 | 2105310005 | J | 1 | 6 | 2105311005 | 19 | 29 | OK | UNSHIPBL | |
| | | 6 | 2105310006 | J | 2 | 6 | 2105311005 | 18 | 29 | OK | UNSHIPBL | |
| | | 7 | 2105310007 | J | 3 | 6 | 2105311005 | 17 | 29 | OK | UNSHIPBL | |
| | | 8 | 2105310008 | J | 4 | 6 | 2105311005 | 15 | 29 | OK | UNSHIPBL | |
| | | 9 | 2105310009 | J | 1 | 6 | 2105311010 | 21 | 29 | OK | UNSHIPBL | |
| | | 10 | 2105310010 | J | 2 | 6 | 2105311010 | 21 | 29 | OK | UNSHIPBL | |
| | | 11 | 2105310011 | J | 3 | 6 | 2105311010 | 21 | 29 | OK | UNSHIPBL | |
| | | 12 | 2105310012 | J | 4 | 6 | 2105311010 | 10 | 29 | NG | UNSHIPBL | |

Fig. 29B (a)

| MARK No. (1201) | BAR CODE No. (1202) | KIND (1203) | AGING TIME (1204) | COMP TIME (1205) | RESIN LOT (1206) | SHIPBL/UN (1207) | PRIORITY (1208) |
|---|---|---|---|---|---|---|---|
| 400a | 0001 | A | 3 | 2110091000 | L001 | UNSHIPBL | |
| | | | | | | | |
| | | | | | | | |

(b)

CONTROL SYSTEM

TECHNICAL FIELD

The present invention relates to a control system, e.g., a control system for a molding member.

BACKGROUND ART

Conventionally, a molding member molded by an injection molding machine is stored in a returnable box for feeding after being molded. Generally, injection molding involves molding a large number of the molding members of the same shape and storing them in a predetermined returnable box. The molding members are then controlled in a certain group (hereinafter referred to as a "lot control"), and are transported to downstream assembly processes or other plants after undergoing aging, sampling inspections, and other predetermined processes. The molding members and various other components are then combined to form a product. However, if a defect is found after the molding, during the assembly, or after the product is finished, it is difficult to trace back information such as when and under what kind of molding history the molding member was molded (hereinafter referred to as "molding history information"). This is because it is difficult to identify when the molding member was molded, since the molding members of the same shape are stored in returnable boxes of the same shape, which are designed for ease of feeding, storage, and providing to a machine. In addition, if a defect is found, all members in a lot, to which the molding member in which the defect occurs belongs, may be inspected or discarded, which has a significant impact.

Therefore, a prior art, for example, as in Japanese Patent Application Laid-Open No. 2005-063095, whereby an identification number which identifies production history information of a member or data which includes the production history information is made into a two-dimensional code, laser-marked directly on the member, and the production history information of the member is acquired from the two-dimensional code, is known.

SUMMARY OF THE INVENTION

However, attempting to apply a prior art to existing facilities presents challenges in terms of cost and space, such as for adding a new process for laser marking a two-dimensional code directly onto a member. Furthermore, since some injection molding machines produce a large number of molding members at a time, applying identifying means to each member directly by a laser marking, etc., presents challenges in terms of productivity and cost. In addition, it may be difficult to introduce from a standpoint of deteriorating an appearance of the molding member.

Problem to be Solved by the Invention

The present invention is conceived under circumstances as described above, and an object of the present invention is to control a molding member in unit of a returnable box.

Means for Solving the Problem

In order to solve the aforementioned problems, the present invention includes the following configuration.

A control system for controlling a molding member stored in at least one box, with at least one first mark indicating information on at least the box, in which the molding member molded by an injection molding machine, the control system comprising: a first image pickup means for picking up the box; an acquiring means for analyzing an image, of the first mark of the box, picked up by the first image pickup means and acquiring the information on the box; and a construction means for constructing a database by associating the information on the box acquired by the acquiring means with at least one of information on time and information on order of the molding member.

Effect of the Invention

According to the present invention, it is possible to control a molding member in unit of a returnable box.

Figure 2:
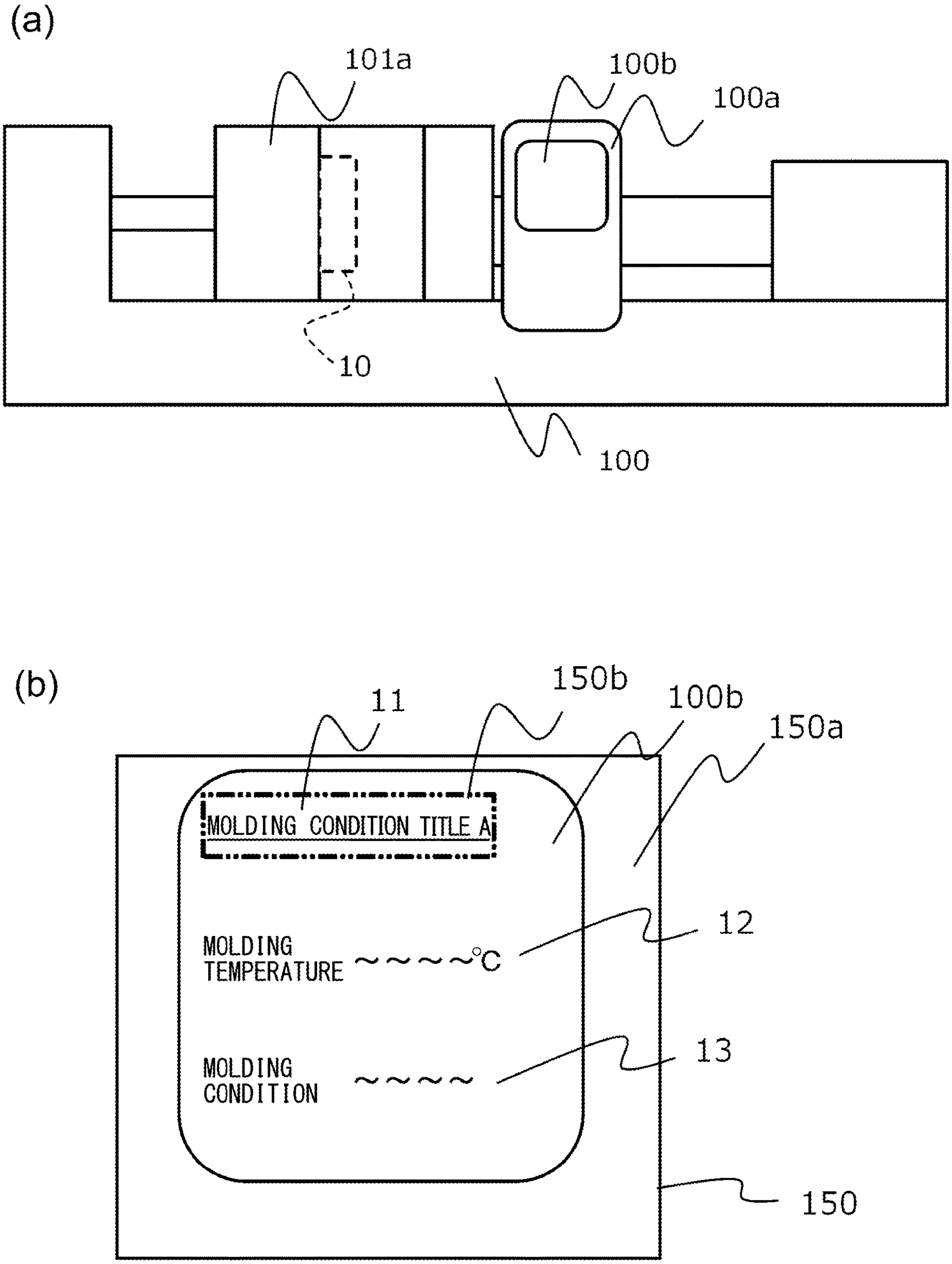

Part (a) of FIG. 2 is a view illustrating an injection molding machine of the Embodiment 1 and part (b) of FIG. 2 is a view illustrating an operating screen of the injection molding machine.

Figure 3:
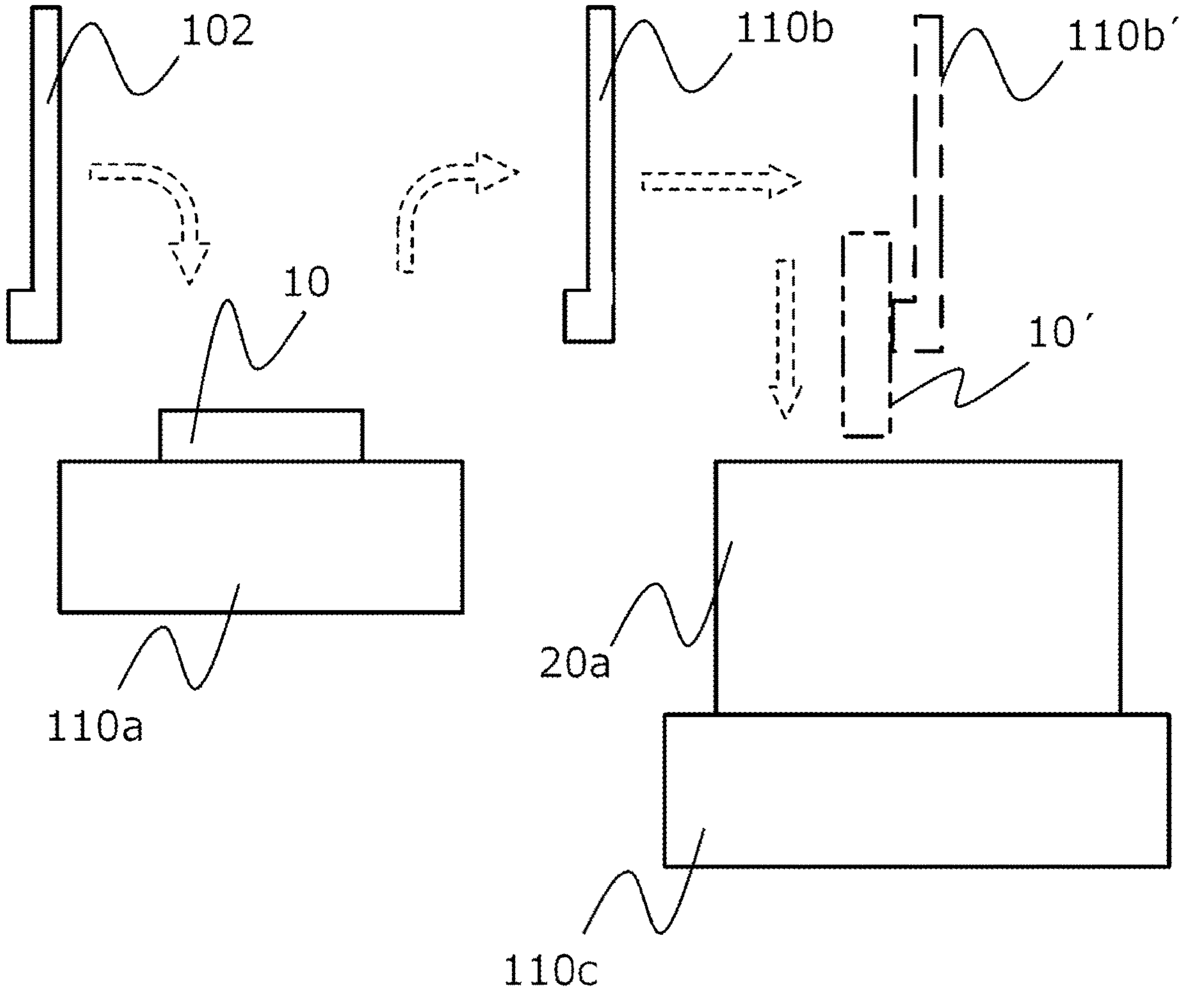

FIG. 3 is a view illustrating a process until a molding member of the Embodiment 1 is packed.

Figure 4:
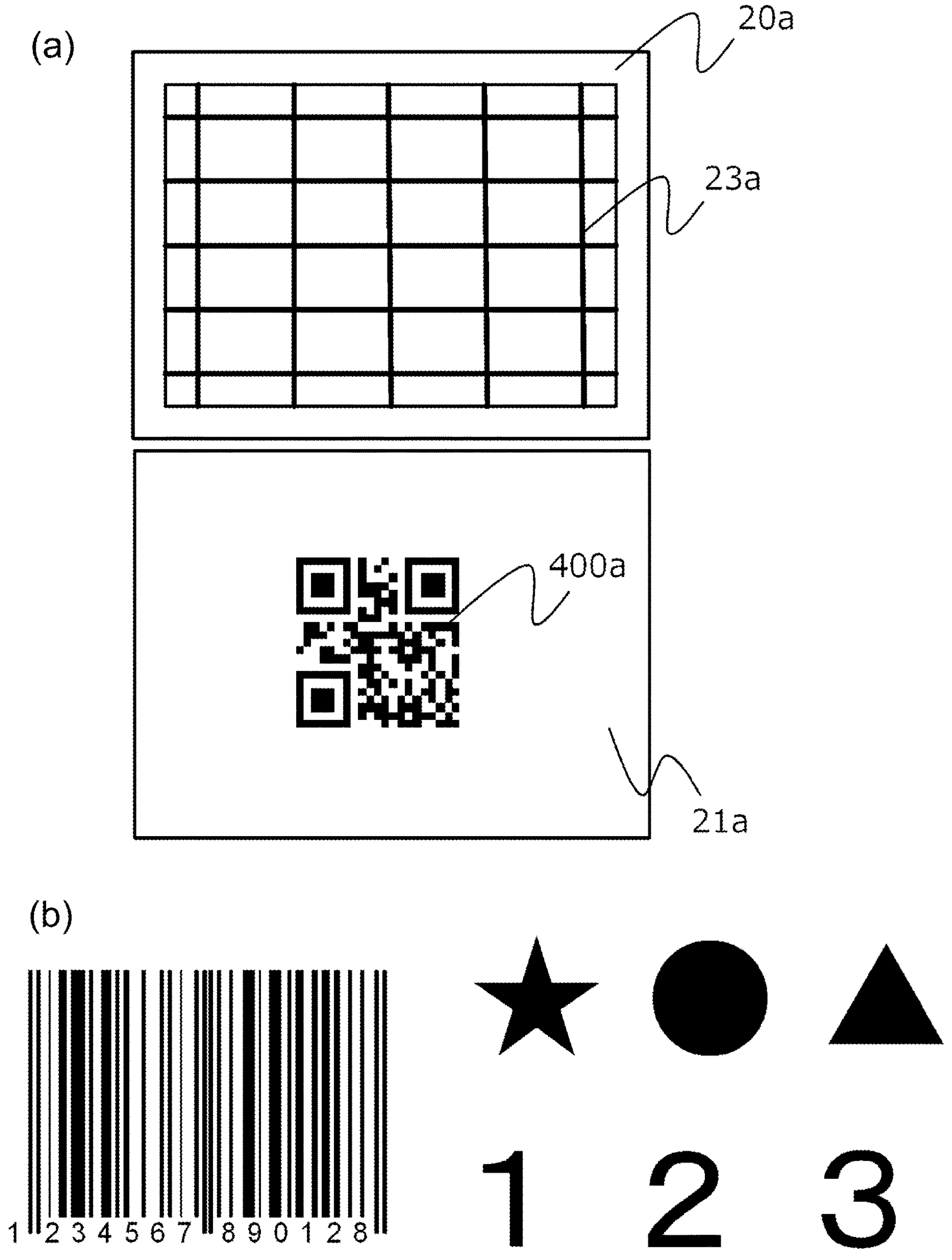

Part (a) of FIG. 4 is a view illustrating a partition and a mark on a lid of a returnable box of the Embodiment 1, and part (b) of FIG. 4 is a view illustrating other marks.

Figure 5:
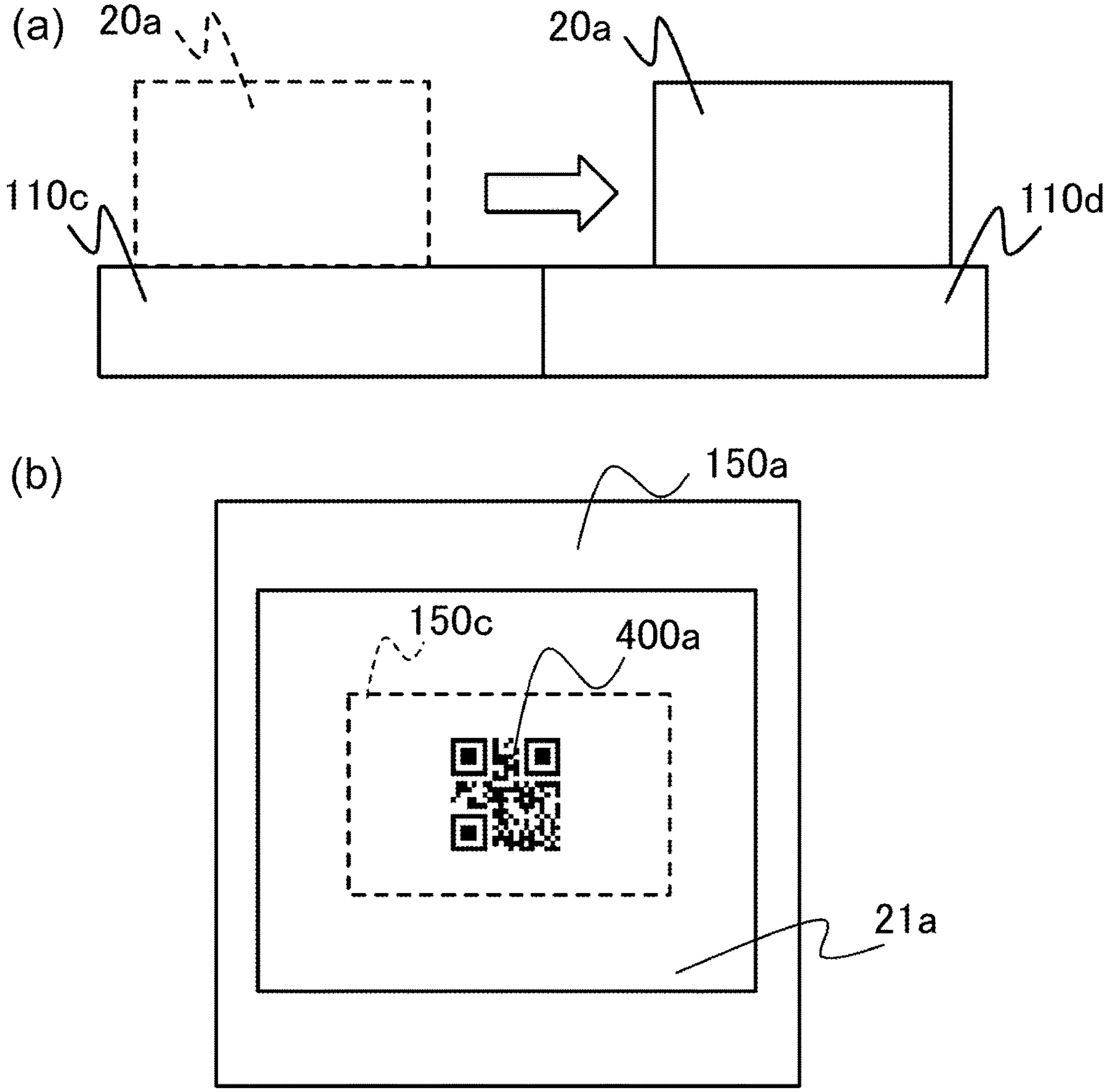

Part (a) of FIG. 5 is a view illustrating a movement to a packing completion position of the returnable box of the Embodiment 1, part (b) of FIG. 5 is a view illustrating an image processing screen, and part (c) of FIG. 5 is a view illustrating a database at the packing completion position.

Figure 6:
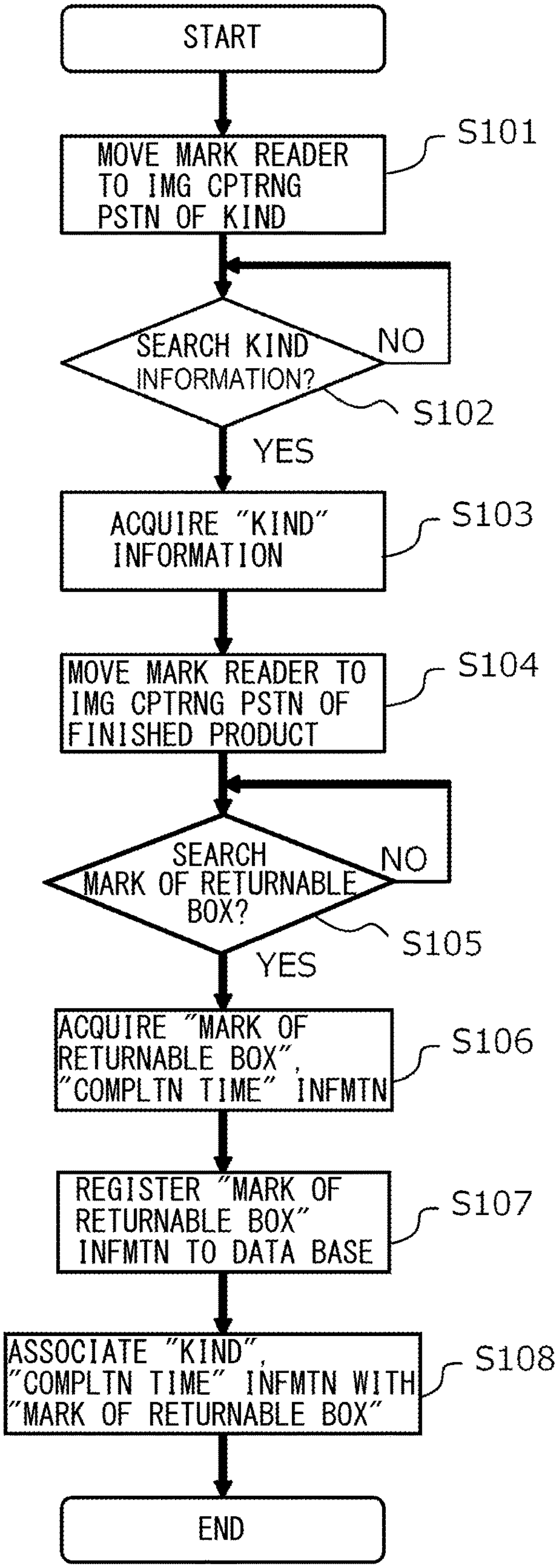

FIG. 6 is a flowchart illustrating a registration process to the database of the Embodiment 1.

Figure 7:
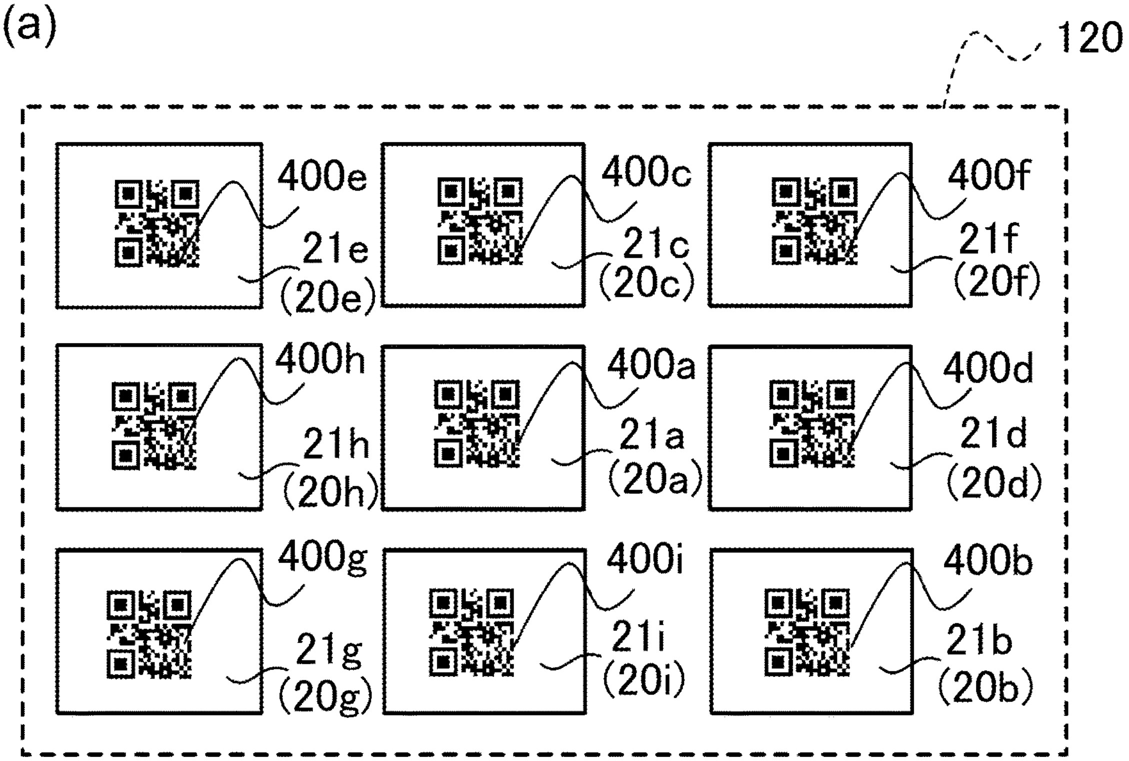

Part (a) of FIG. 7 is a view illustrating a state of an inventory storage area of the Embodiment 1, and part (b) of FIG. 7 is a view illustrating the database in the state of part (a).

Figure 8:
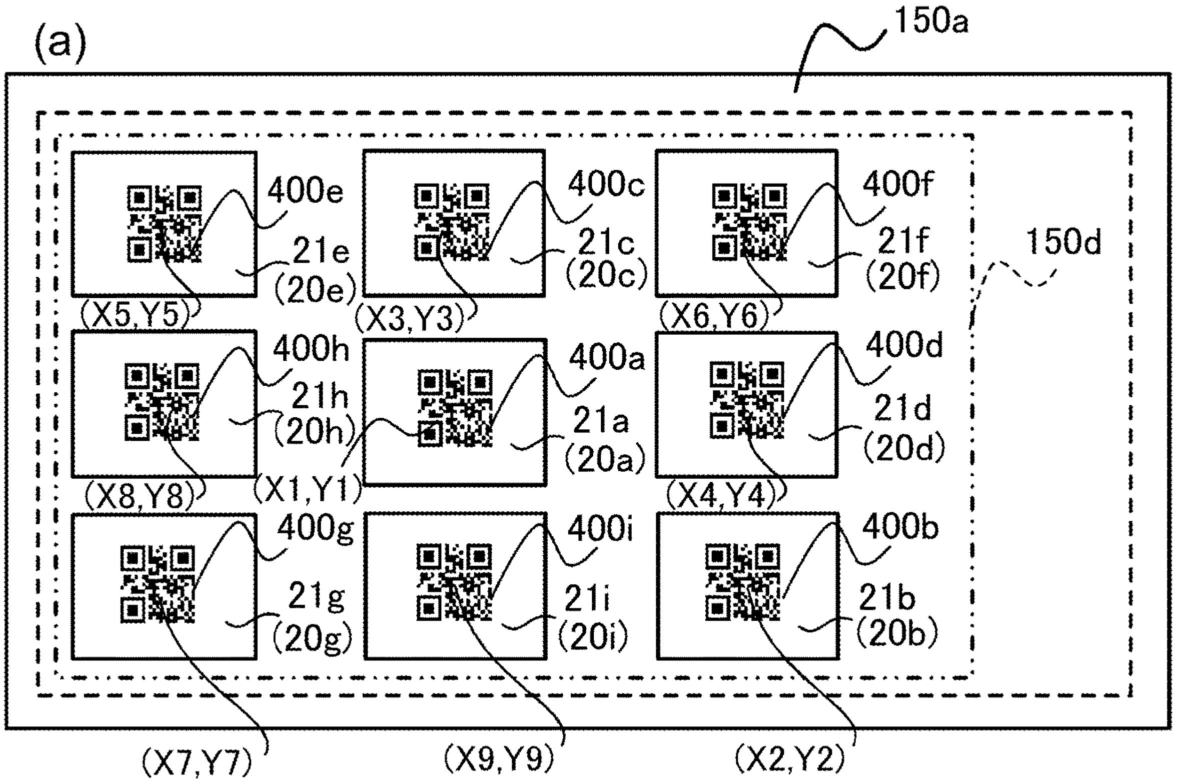
Figure 8:
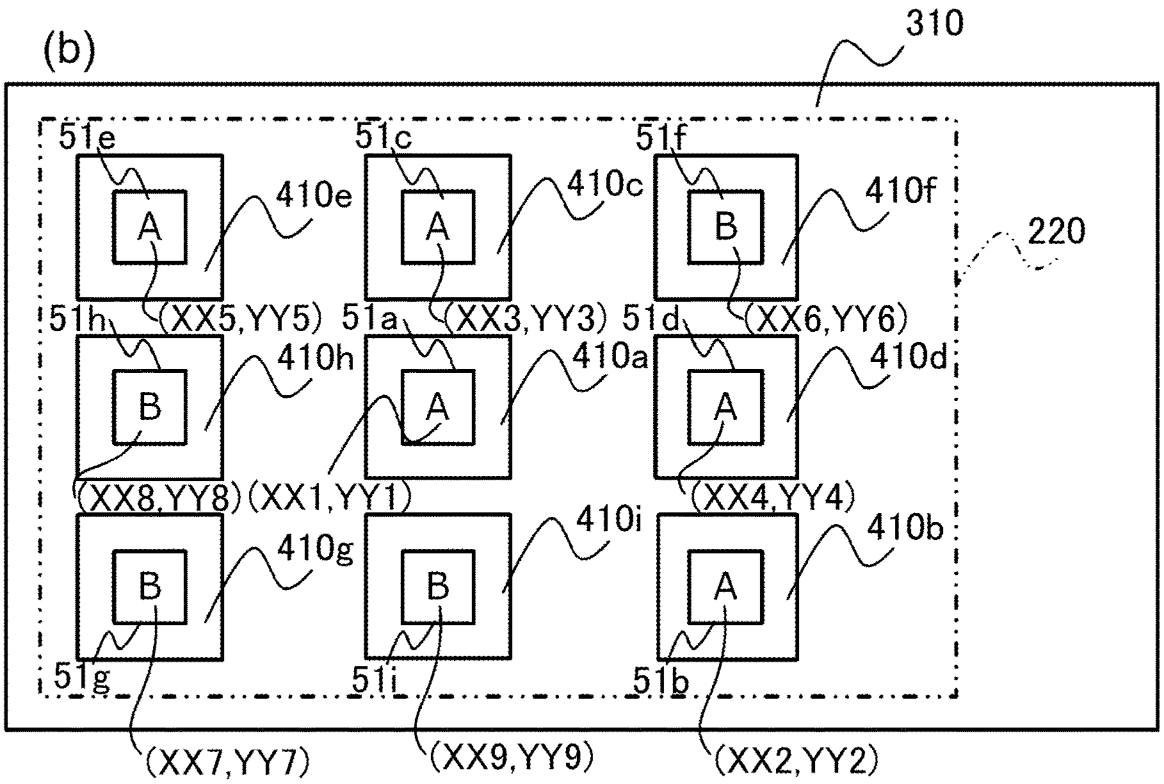

Part (a) of FIG. 8 is a view illustrating the image processing screen of the Embodiment 1 and part (b) of FIG. 8 is a view illustrating a virtual inventory storage area of a display unit.

Part (a) of FIG. 9 is a view illustrating the database of the Embodiment 1 at 13:00 and part (b) of FIG. 9 is a view illustrating the database of the Embodiment 1 at 13:20.

Figure 10:
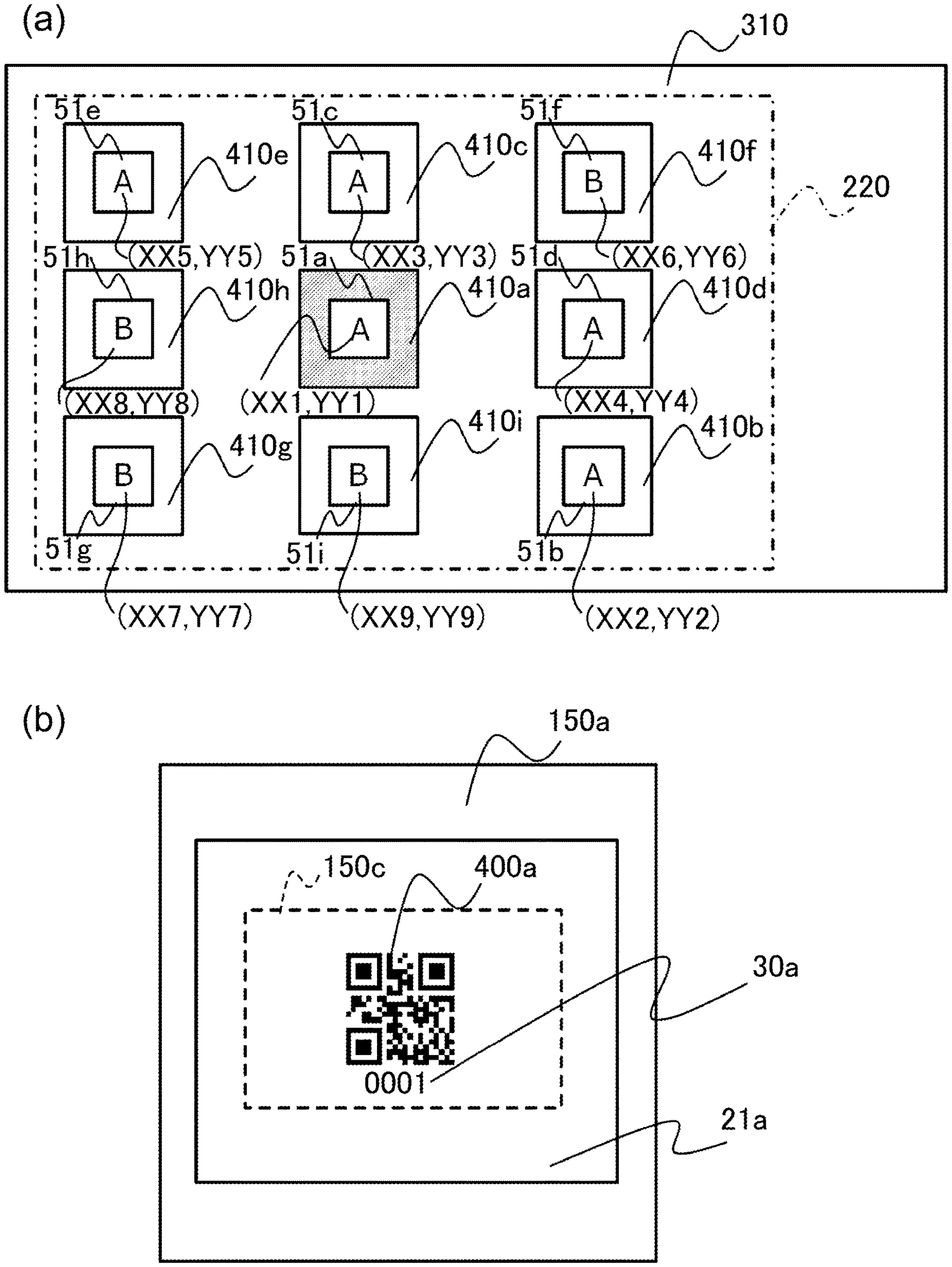

Part (a) of FIG. 10 is a view illustrating the virtual inventory storage area of the display unit of the Embodiment 1 and part (b) of FIG. 10 is a view illustrating the image processing screen.

Figure 11:
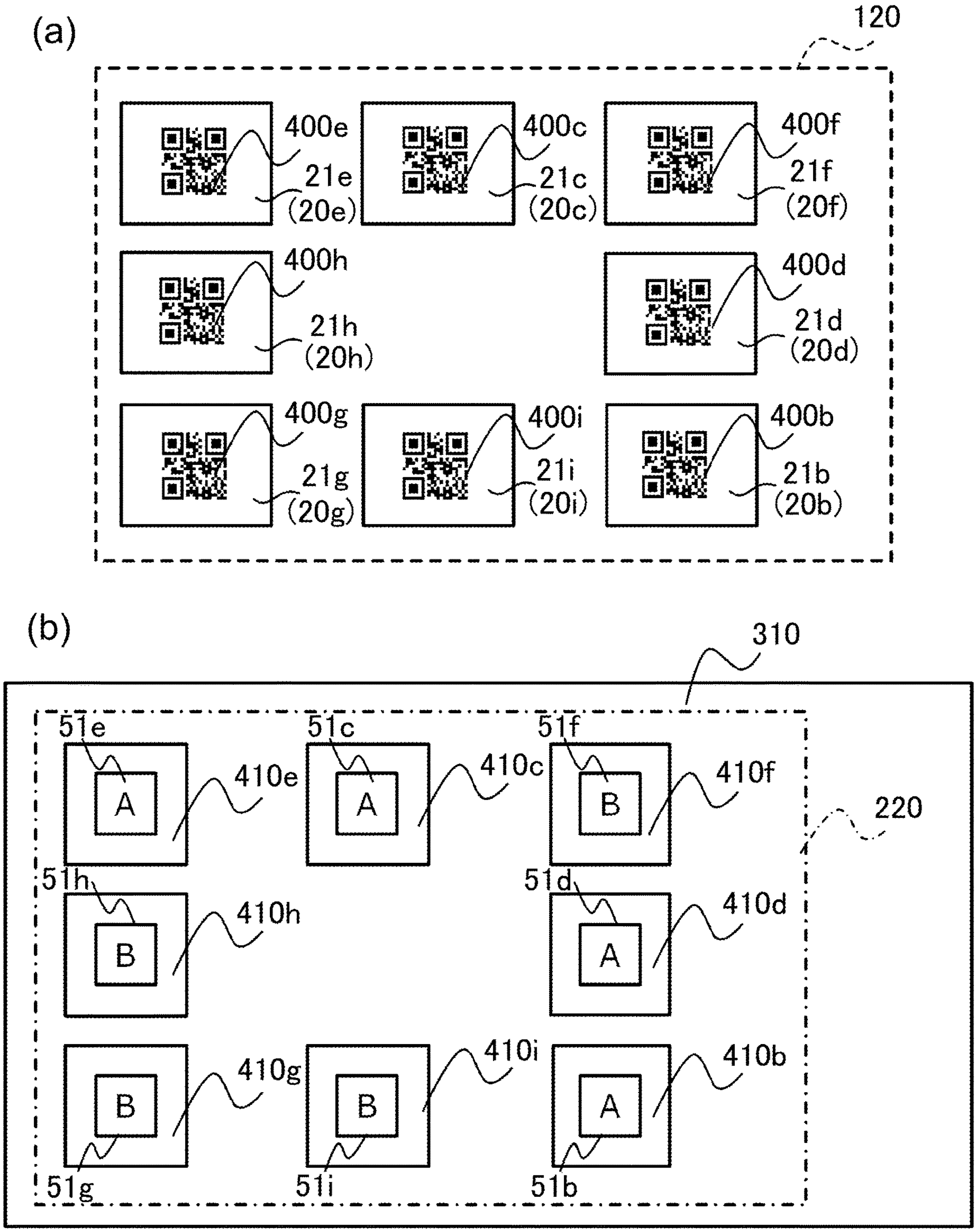

Part (a) of FIG. 11 is a view illustrating the inventory storage area of the Embodiment 1, and part (b) of FIG. 11 is a view illustrating the virtual inventory storage area of the display unit in the state of part (a).

Part (a) and part (b) of FIG. 12 are views illustrating the database of the Embodiment 1 in the state of part (b) of FIG. 11.

Figure 13:
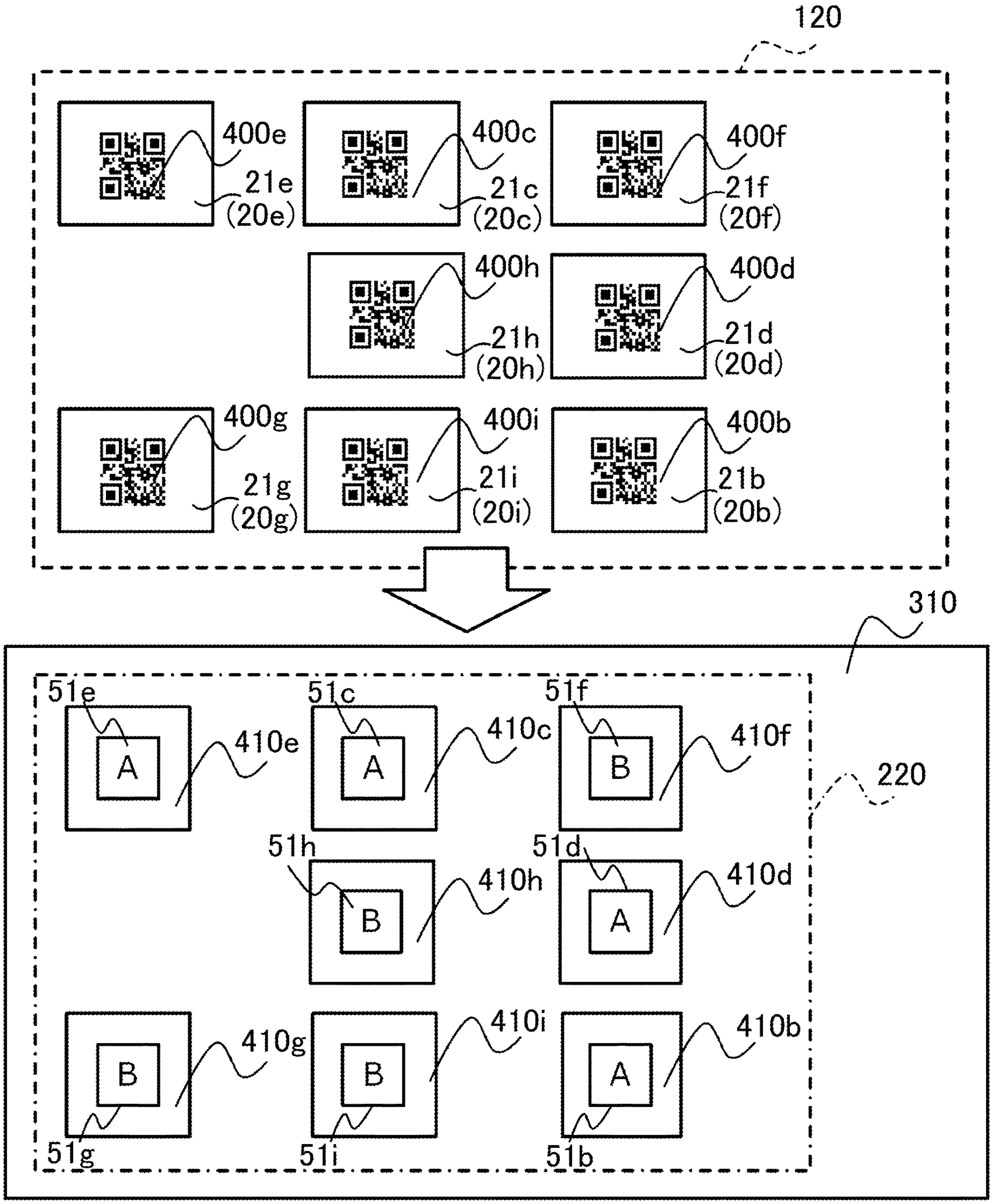

FIG. 13 is a view illustrating the inventory storage area and the virtual inventory storage area of the display unit of the Embodiment 1.

FIG. 14 is a view illustrating the database shared with a device controlling a free feeding trolley of the Embodiment 1, etc.

Figure 15:
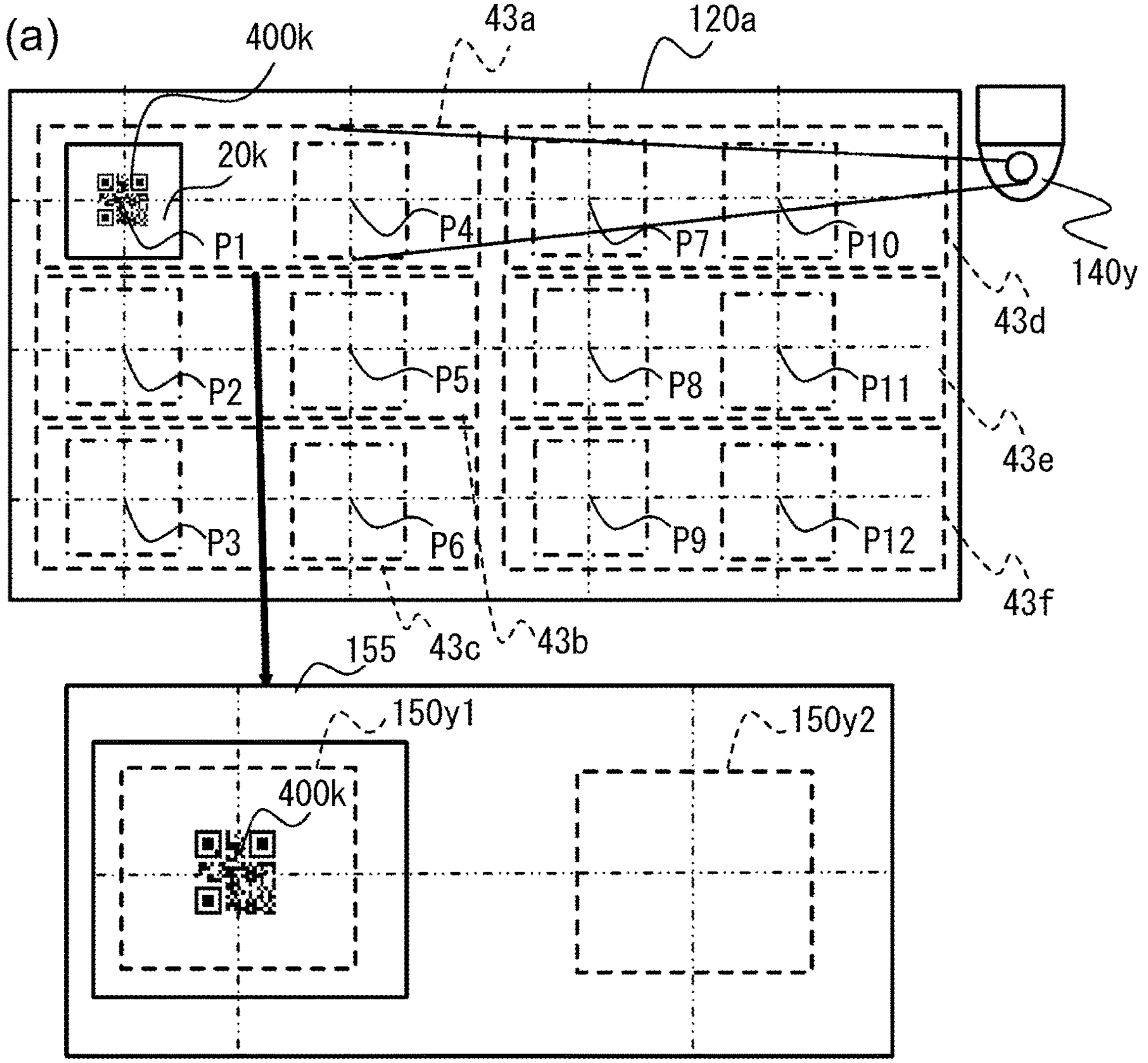

Part (a) of FIG. 15 is a view illustrating coordinates shared with the device controlling the free feeding trolley of the Embodiment 1, etc., and part (b) of FIG. 15 is a view illustrating the database in the state of part (a).

Figure 16:
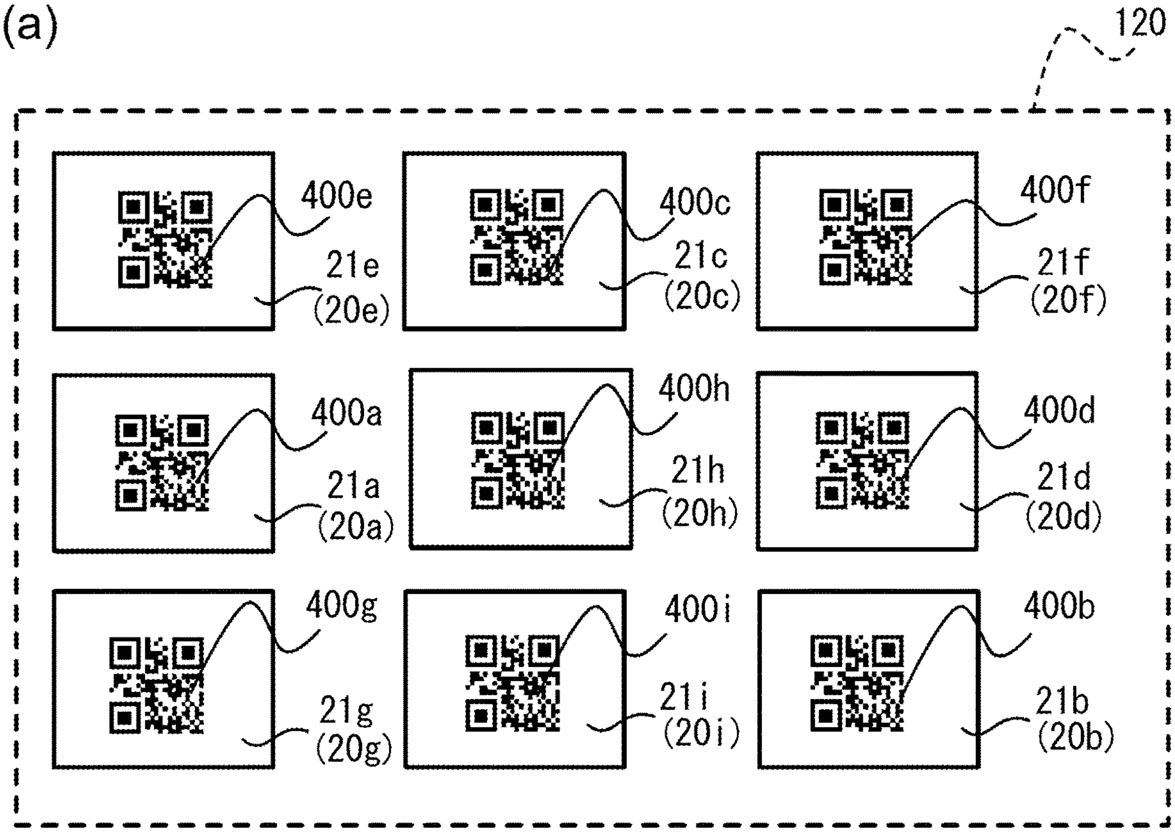

Part (a) of FIG. 16 is a view illustrating the inventory storage area of the Embodiment 1 and part (b) of FIG. 16 is a view illustrating a backup of the database.

Part (a) of FIG. 17 is a view illustrating the database of the Embodiment 1 when the returnable box becomes empty and part (b) of FIG. 17 is a view illustrating the database of the Embodiment 1 when a new molding member is stored in the returnable box.

Figure 18:
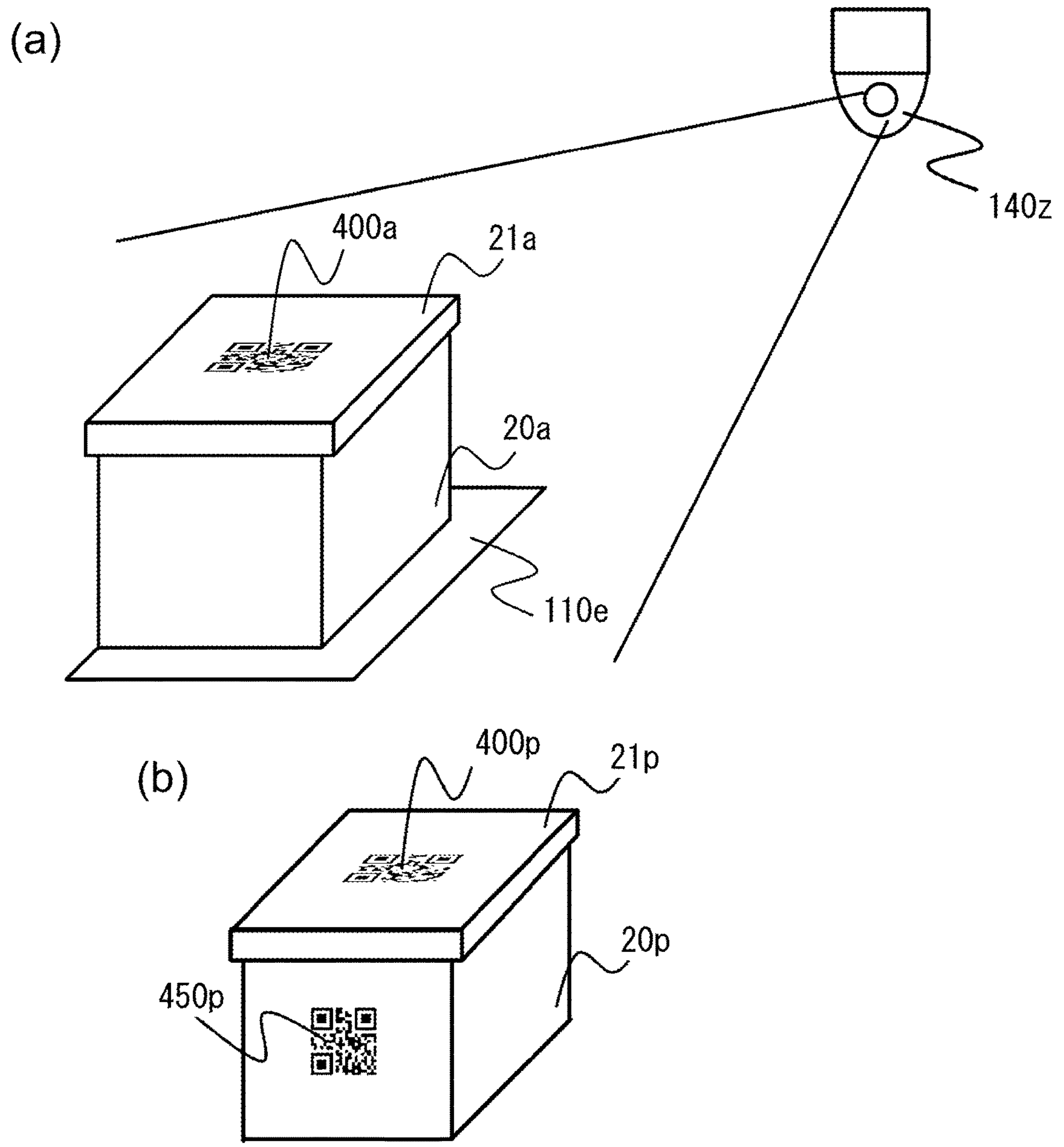

Part (a) of FIG. 18 is a view illustrating an empty box standby position of the Embodiment 1 and part (b) of FIG. 18 is a view illustrating a state in which the mark is attached to both the returnable box and the lid thereof and the database thereof.

Figure 19A:
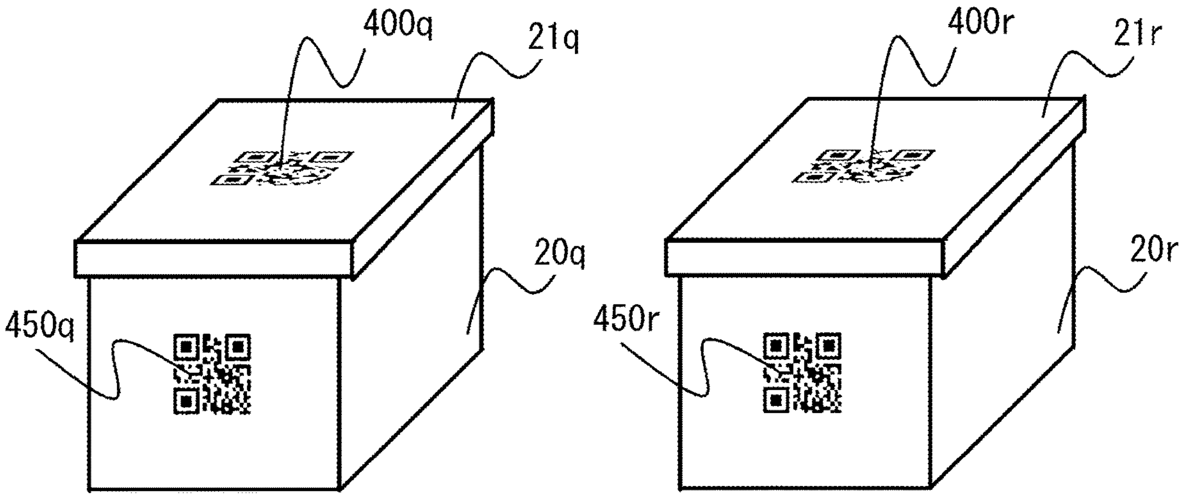

FIG. 19A is a view illustrating a plurality of the returnable boxes of the Embodiment 1 with the mark being attached to the returnable box and the lid thereof and the database thereof.

Figure 19B:
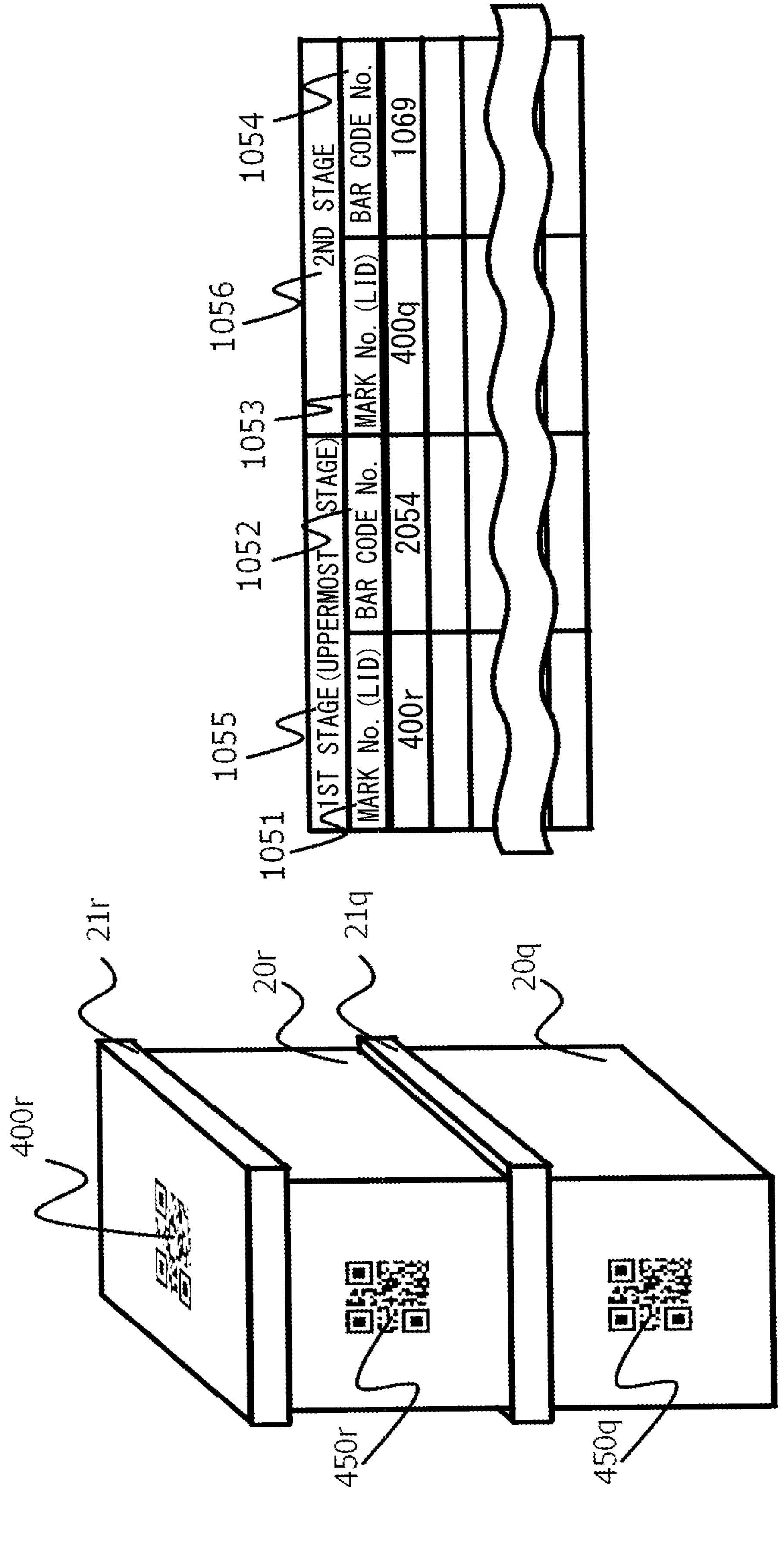

FIG. 19B is a view illustrating a state in which the returnable boxes of the Embodiment 1 are stacked and the database thereof.

Figure 20:
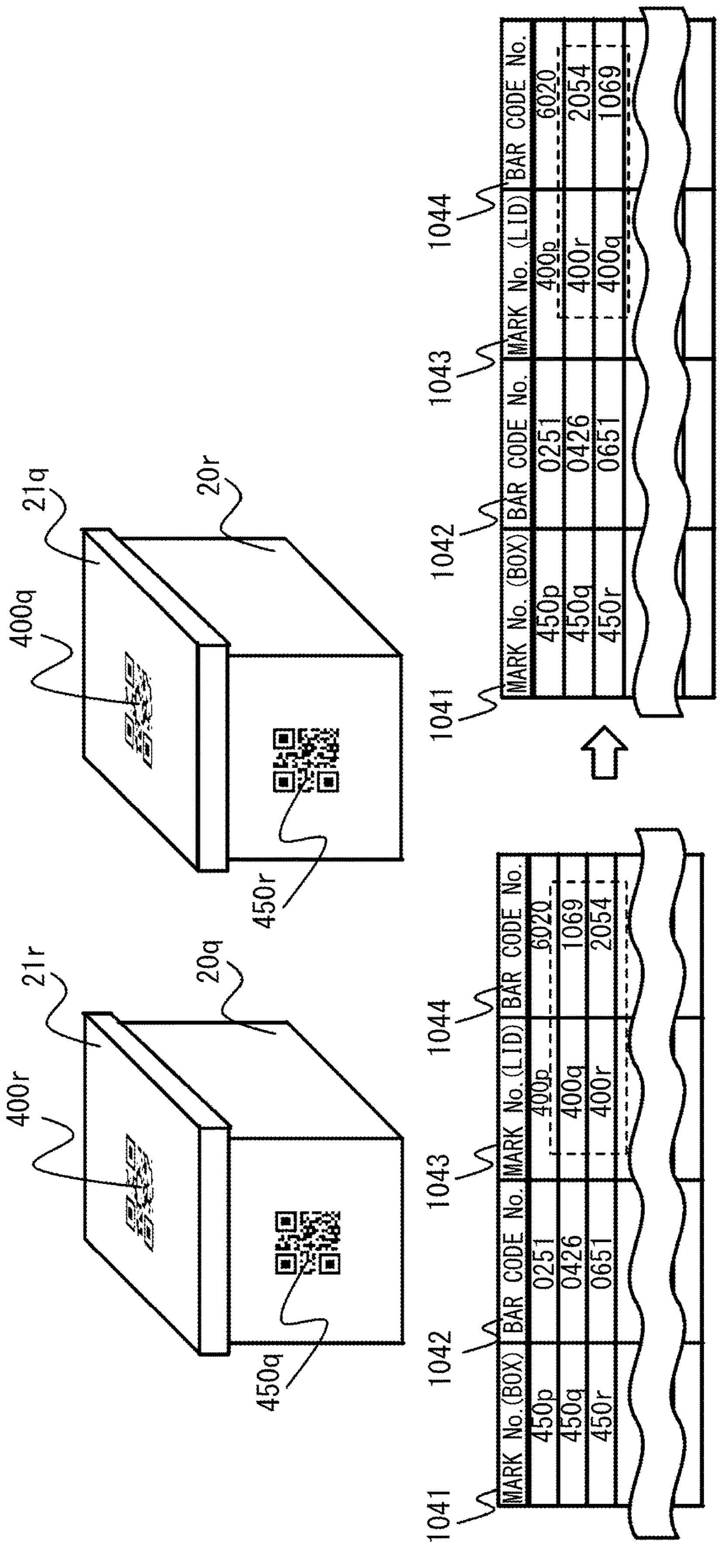

FIG. 20 is a view illustrating a state in which lids of the Embodiment 1 are swapped and the database thereof.

Figure 21:
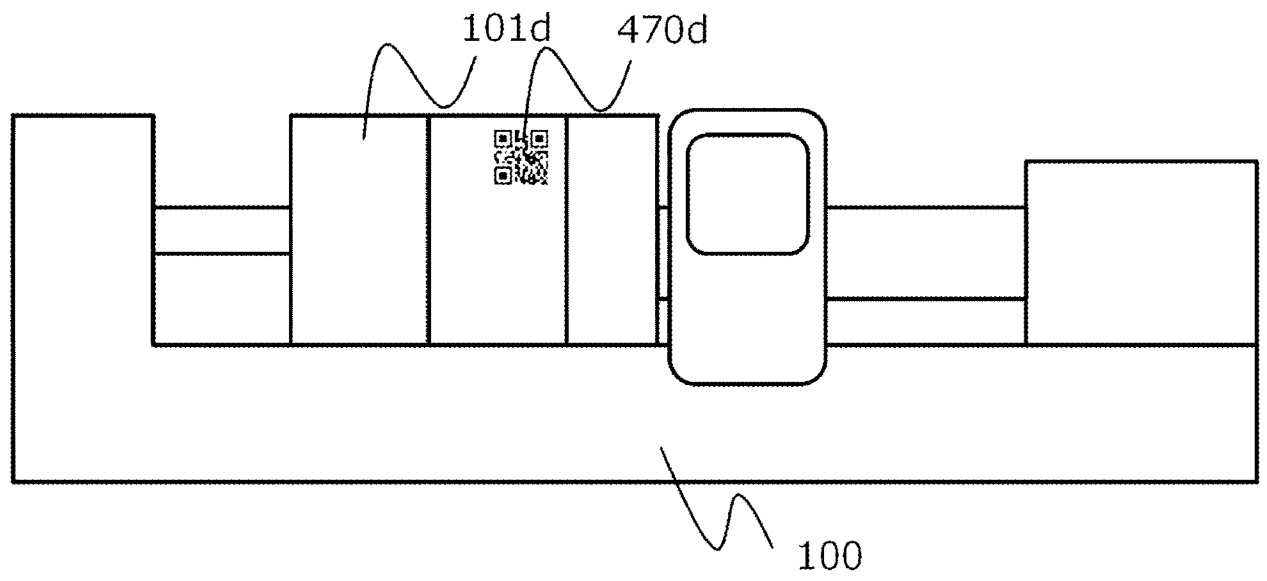

Part (a) of FIG. 21 is a view illustrating a state in which the mark is attached to a mold of the Embodiment 1, and part (b) is a view illustrating the database thereof.

Figure 22A:
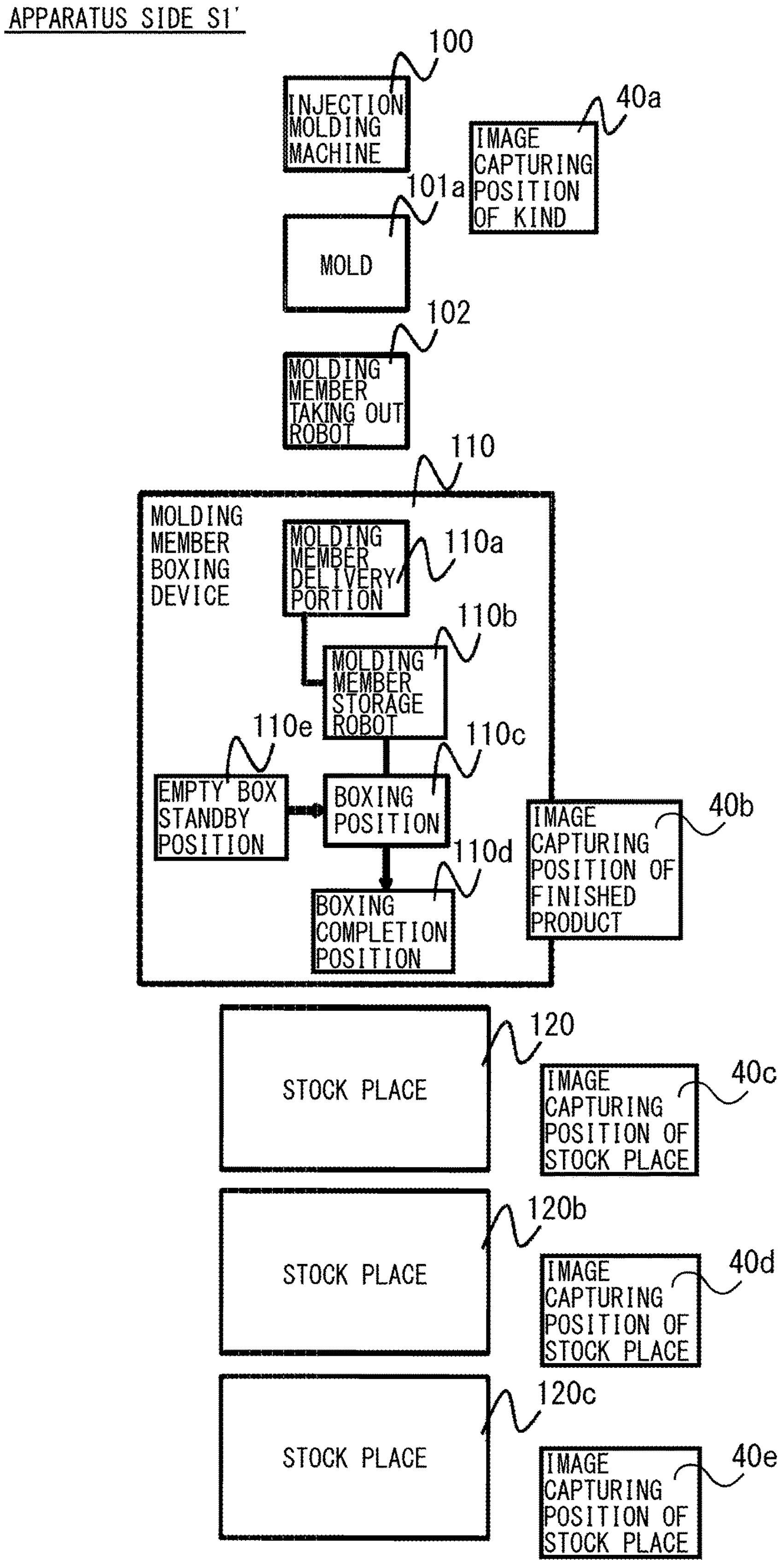

FIG. 22A is a view illustrating a system configuration of a modified example of the Embodiment 1.

Figure 22B:
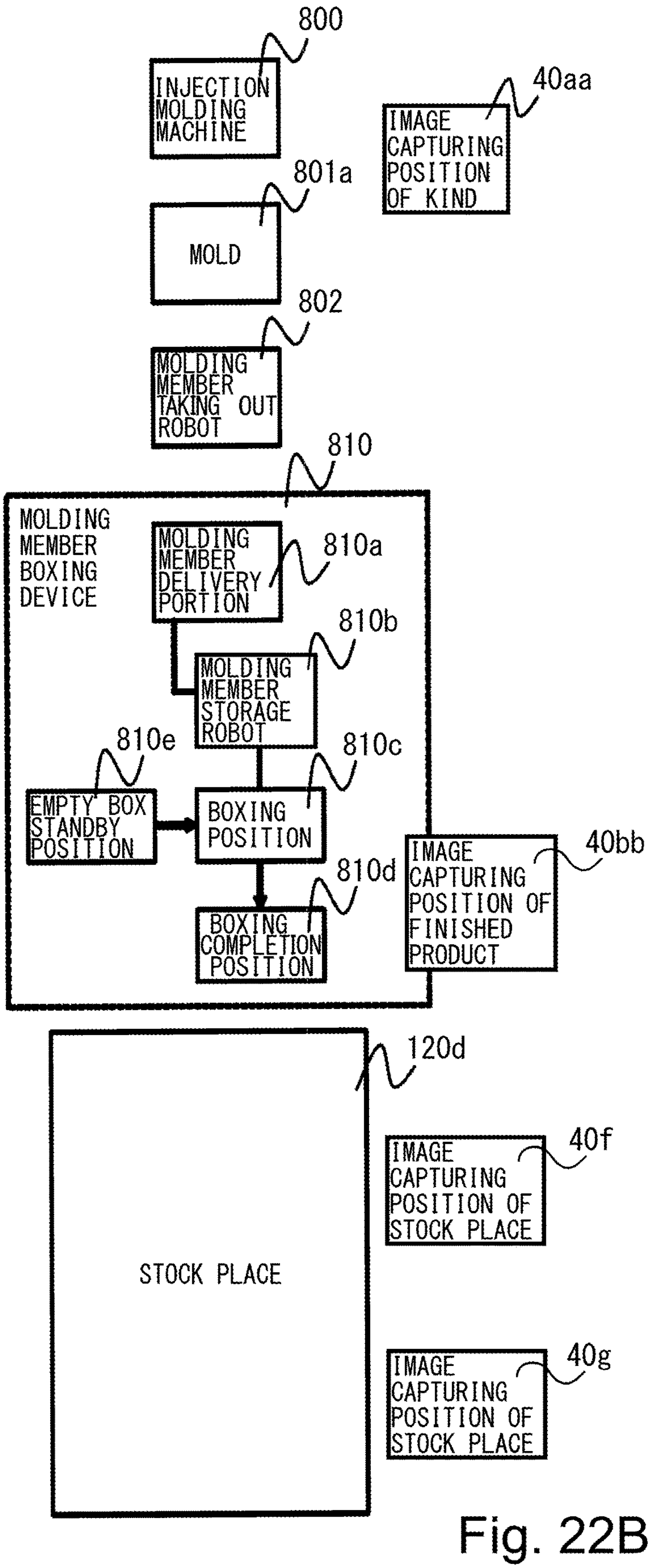

FIG. 22B is a view illustrating the system configuration of the modified example of the Embodiment 1.

Figure 22C:
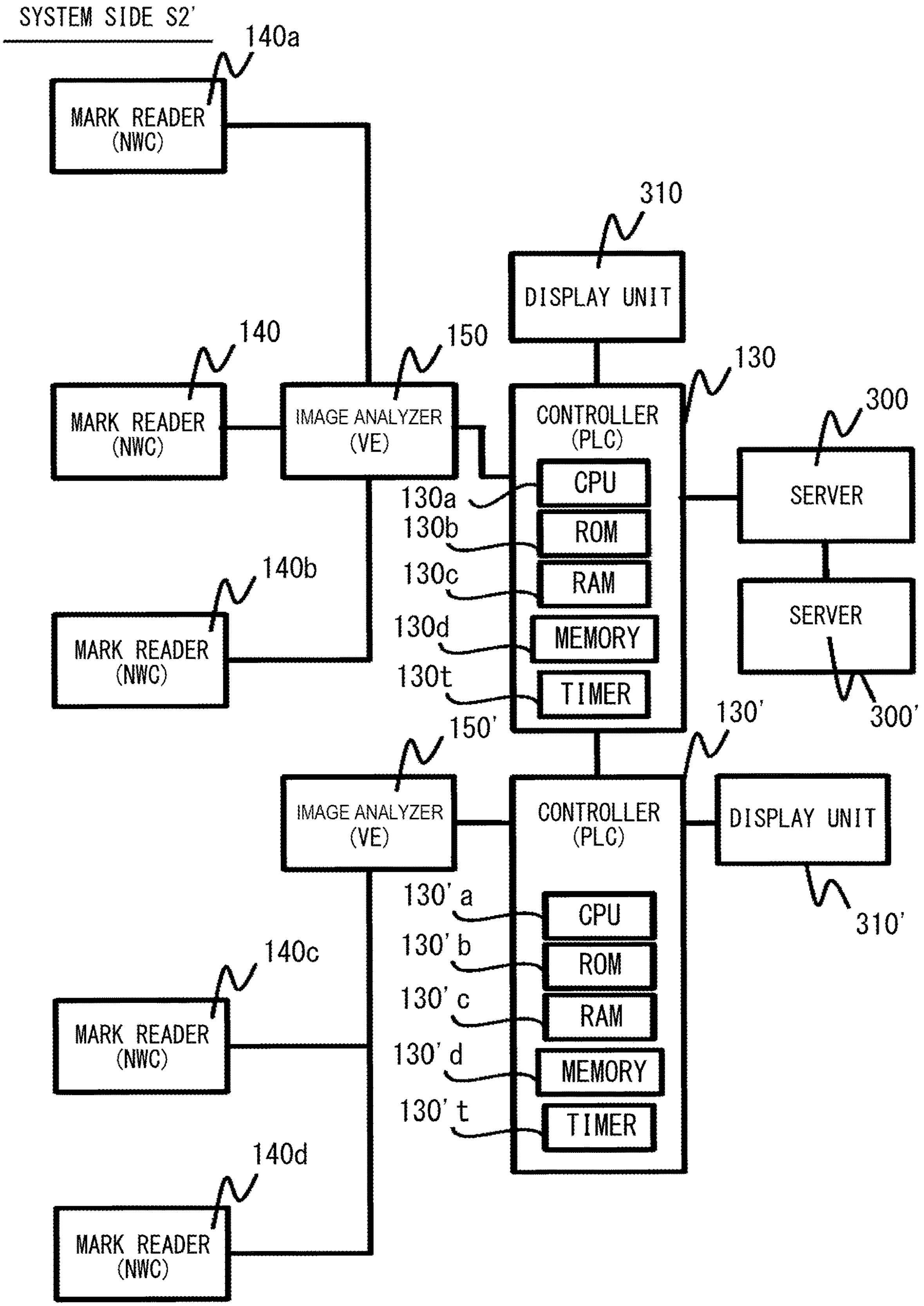

FIG. 22C is a view illustrating the system configuration of the modified example of the Embodiment 1.

Figure 23:
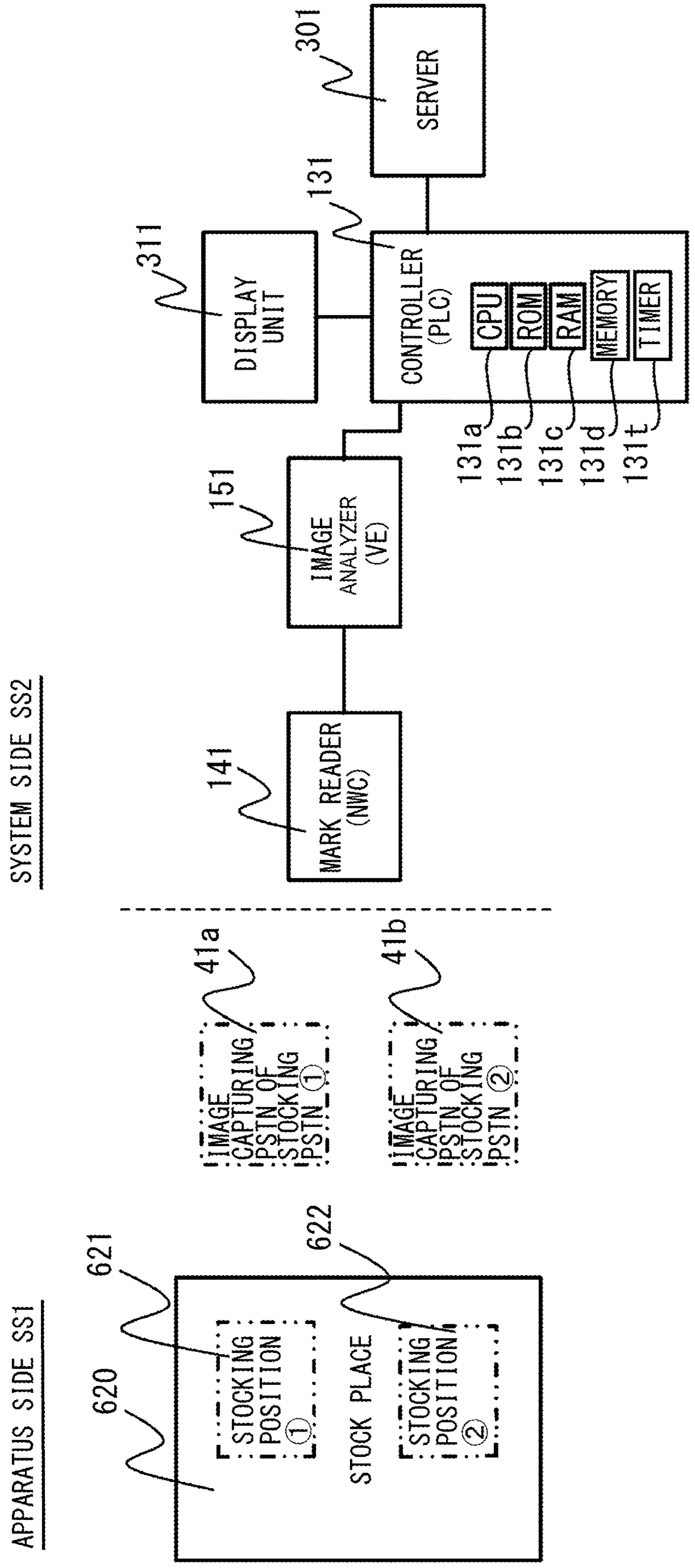

FIG. 23 is a view illustrating a configuration of the control system of an Embodiment 2.

Figure 24:
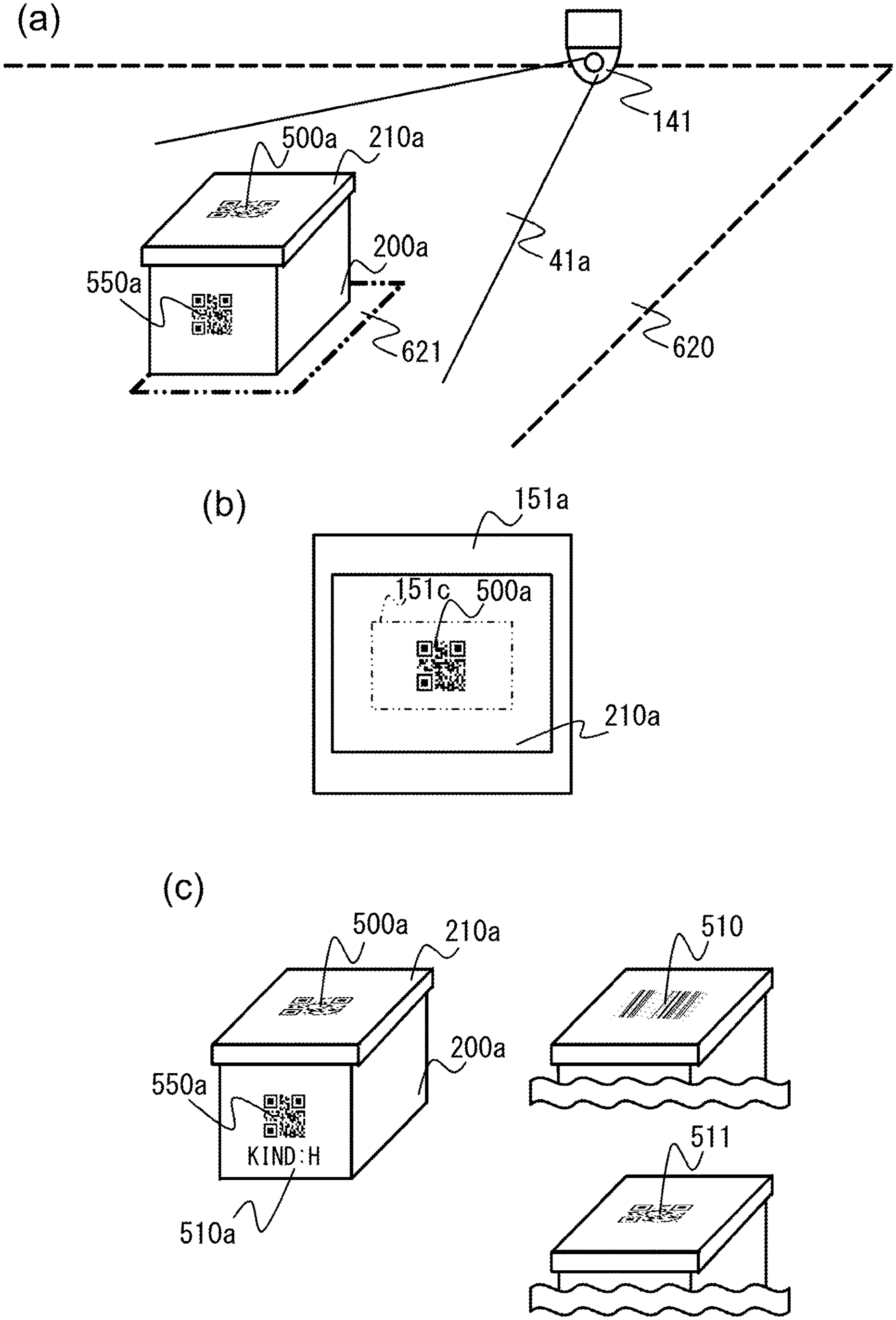

Part (a) of FIG. 24 is a view illustrating a reading by a mark reading portion of the Embodiment 2, part (b) of FIG. 24 is a view illustrating an image processing screen of the Embodiment 2, and part (c) of FIG. 24 is a view illustrating a modified example of information indicating the kind of the Embodiment 2.

Figure 25:
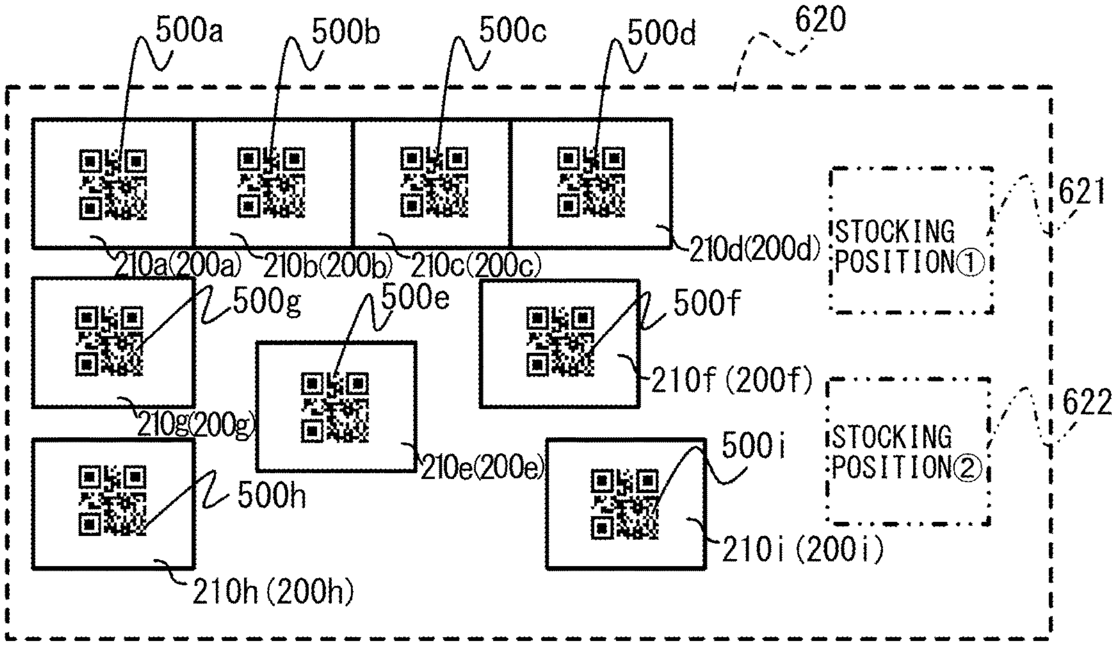

Part (a) of FIG. 25 is a view illustrating a database of the Embodiment 2, and part (b) of FIG. 25 is a view illustrating an inventory storage area of the Embodiment 2.

Figure 26:
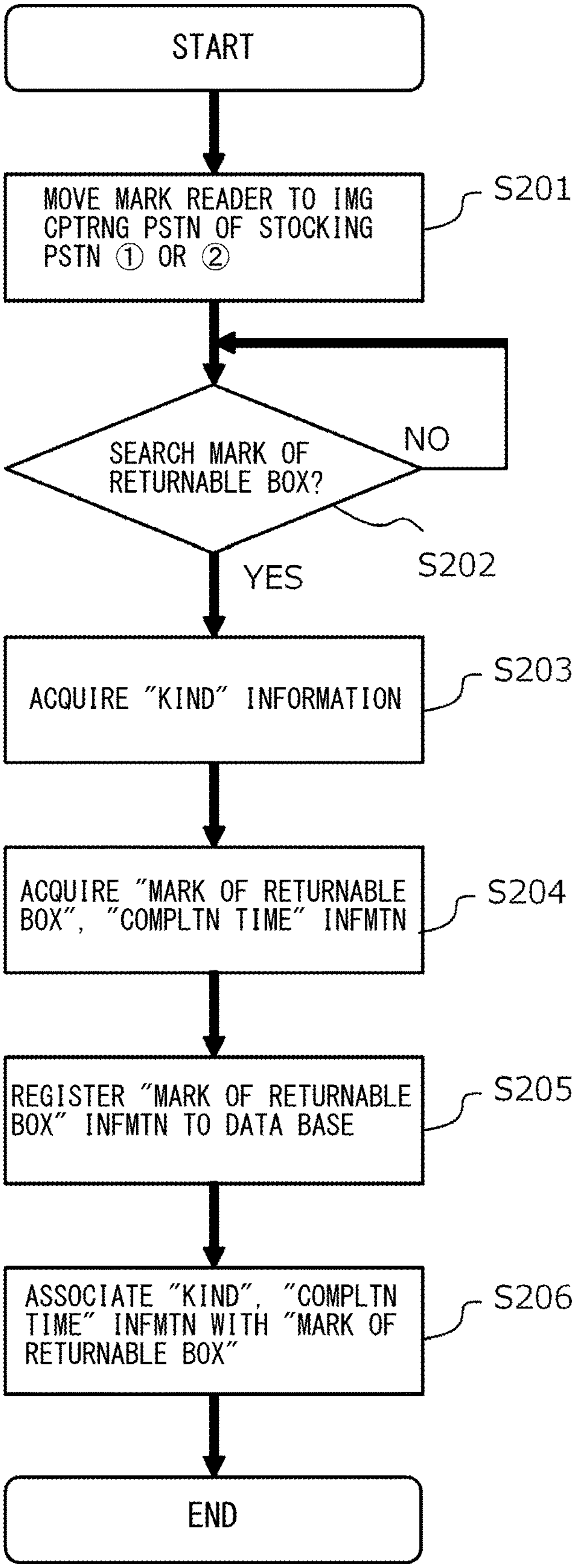

FIG. 26 is a flowchart illustrating a registration process to the database of the Embodiment 2.

Figure 27:
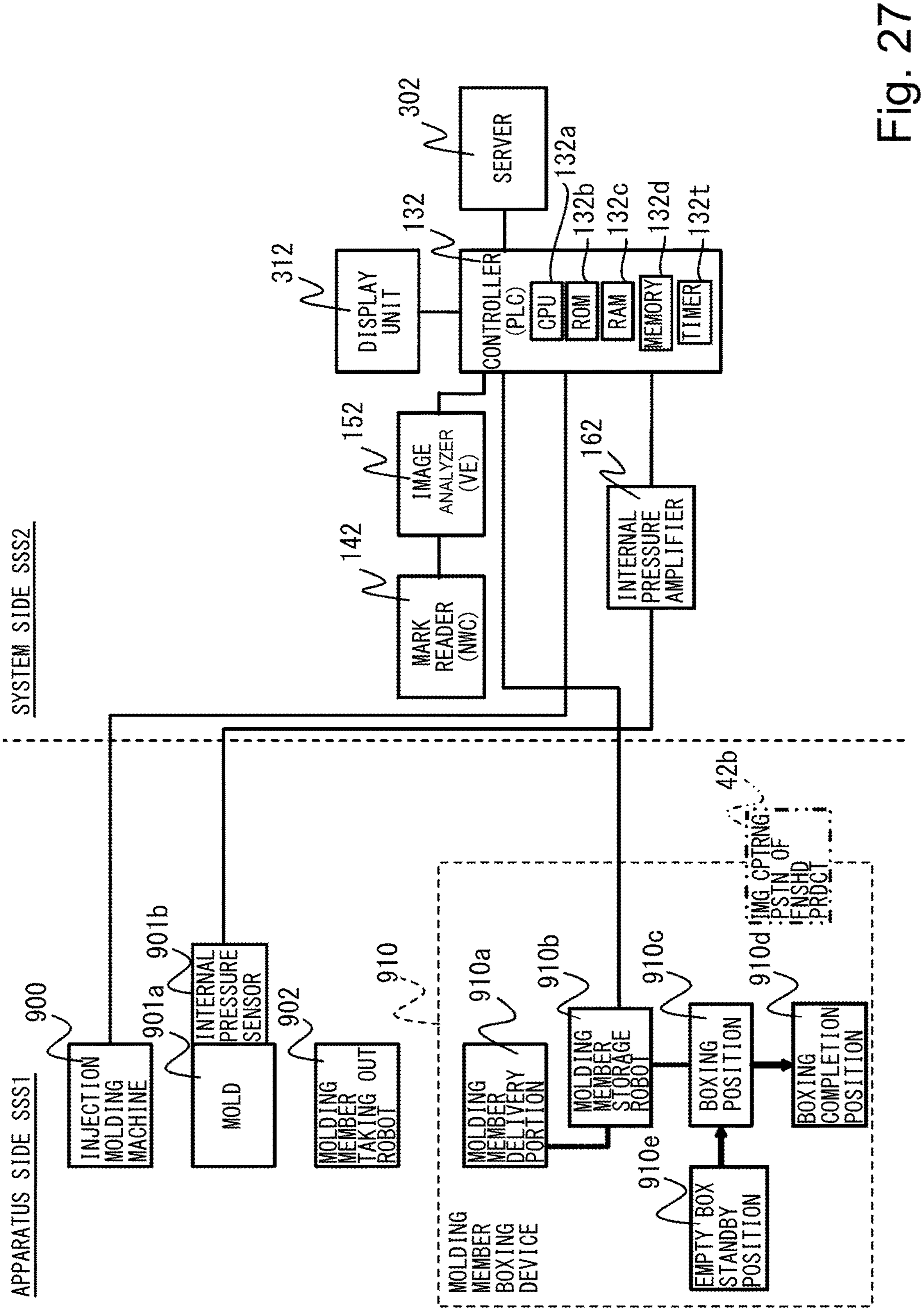

FIG. 27 is a view illustrating a configuration of the control system of an Embodiment 3.

Figure 28:
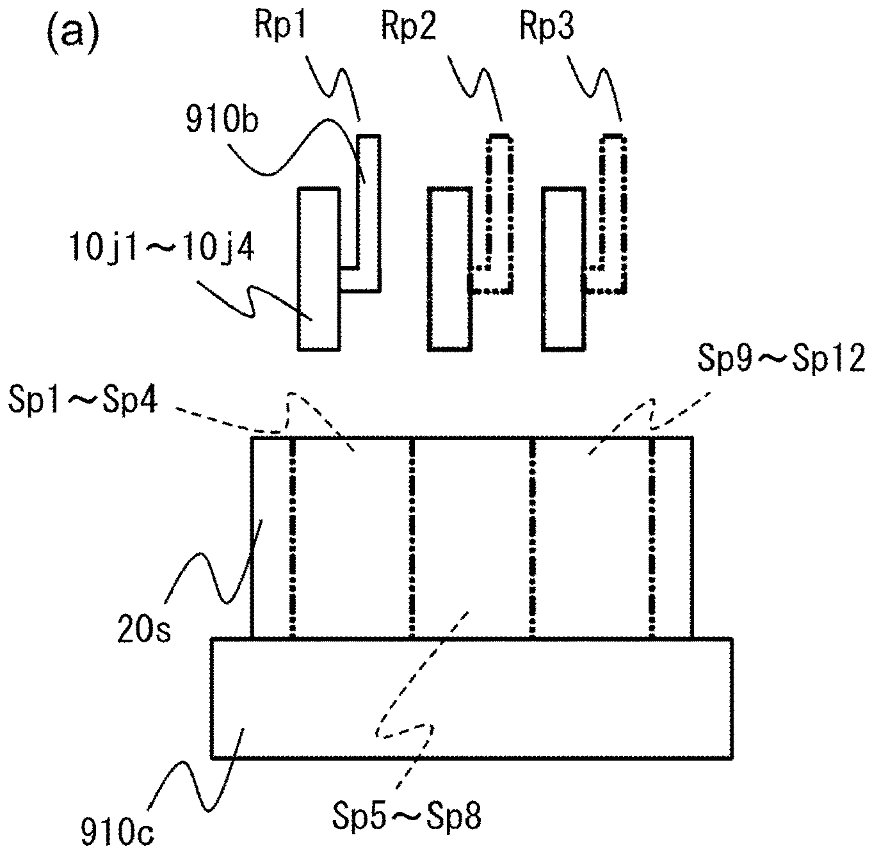
Figure 28:
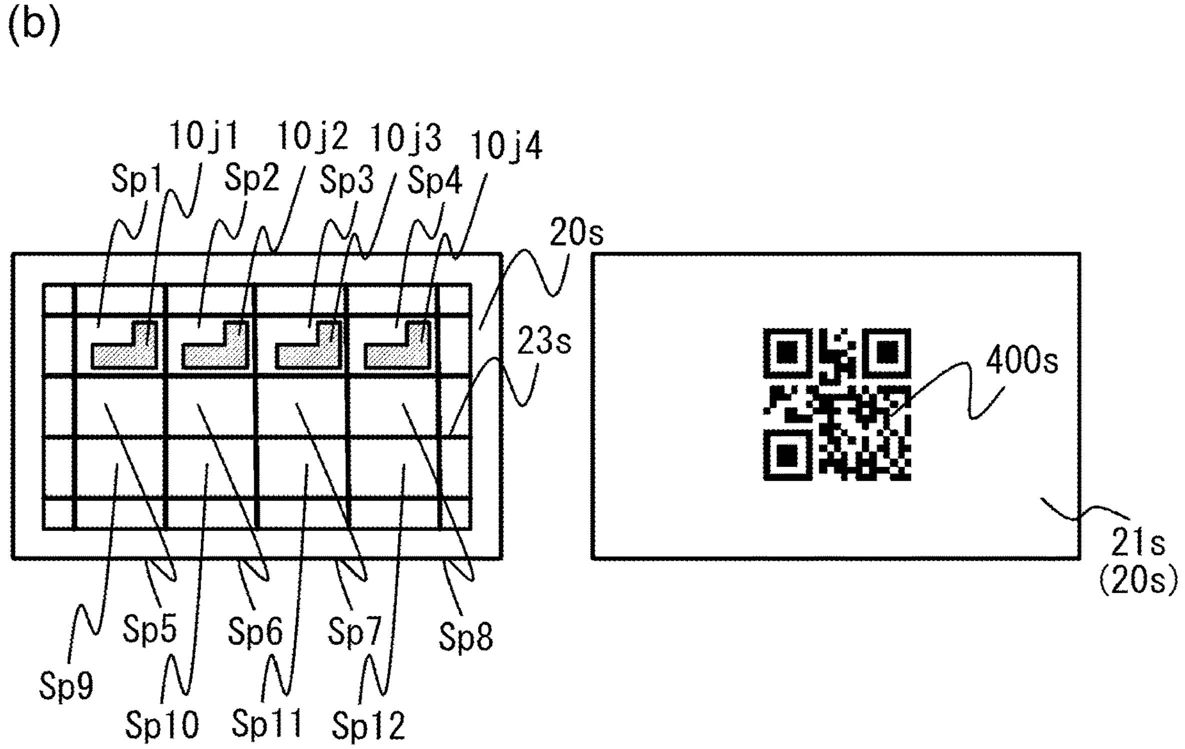

Part (a) of FIG. 28 is a view illustrating a process of the Embodiment 3 until a molding member is packed, and part (b) of FIG. 28 is a view illustrating a state in which the molding members are stored.

FIG. 29A is a view illustrating a database of the Embodiment 3.

FIG. 29B is a view illustrating the database of the Embodiment 3.

Figure 30:
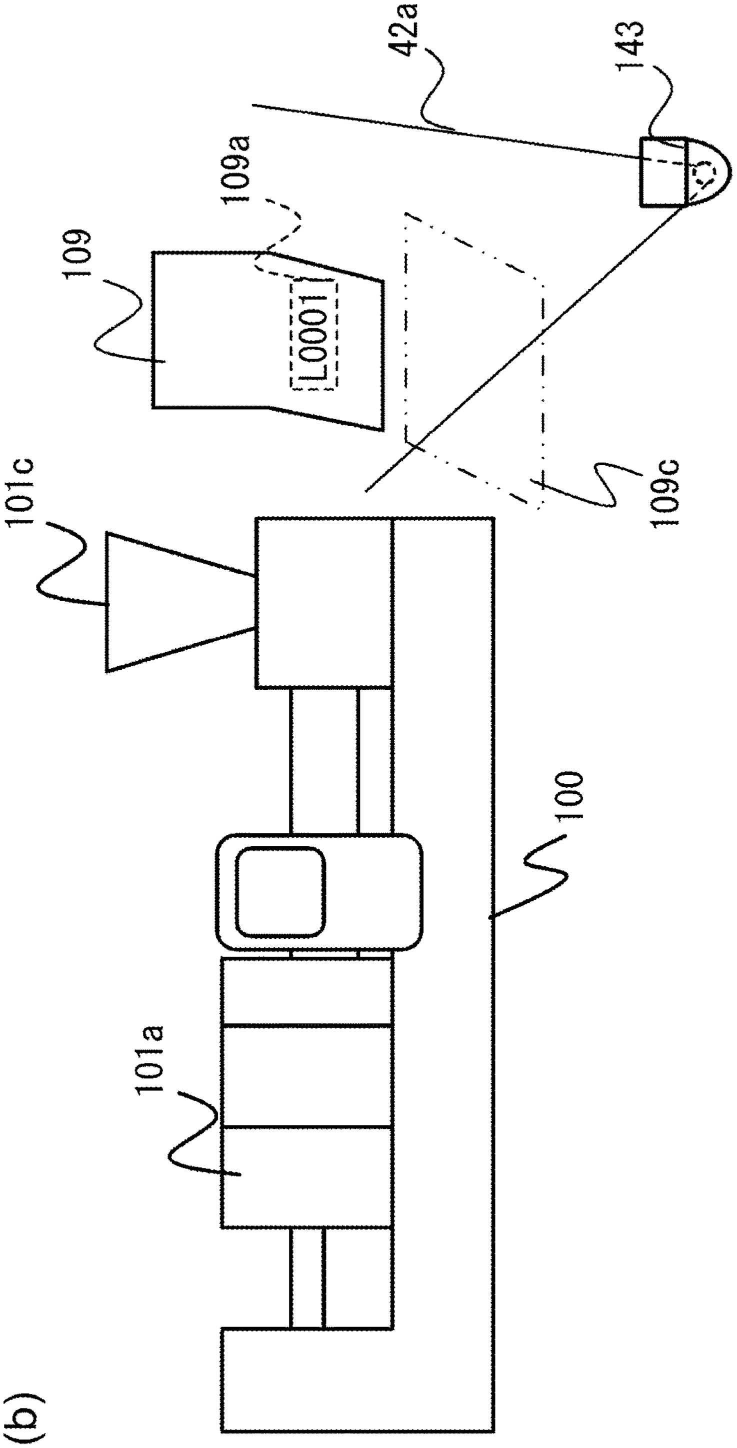

Part (a) of FIG. 30 is a view illustrating a database of a modified example of the Embodiment 3 and part (b) of FIG. 30 is a view illustrating a position for replenishing the resin material.

Figure 31:
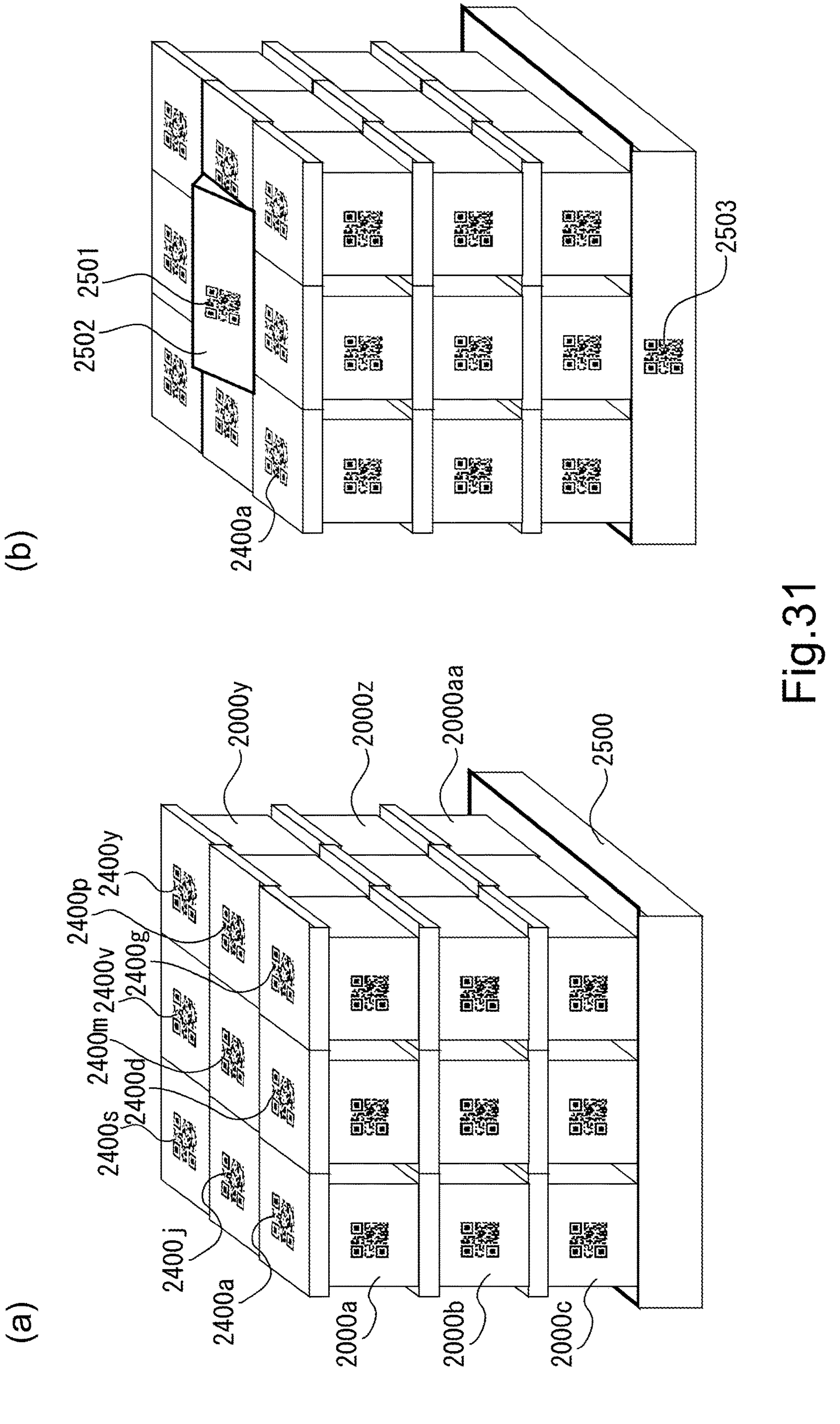

Part (a) and part (b) of FIG. 31 are views illustrating a plurality of returnable boxes in the modified example of the Embodiment 3.

EMBODIMENTS FOR CARRYING OUT THE INVENTION

Hereinafter, Embodiments which are examples for practicing the present invention will be described with referring to the attached drawings. Configurations shown below is only examples, and details, for example, may be changed by those skilled in the art to the extent not to depart from the intent of the present invention. In addition, figures taken up in the present Embodiments are for reference only and do not limit the present invention.

Embodiment 1

[System Configuration]

Figure 1A:
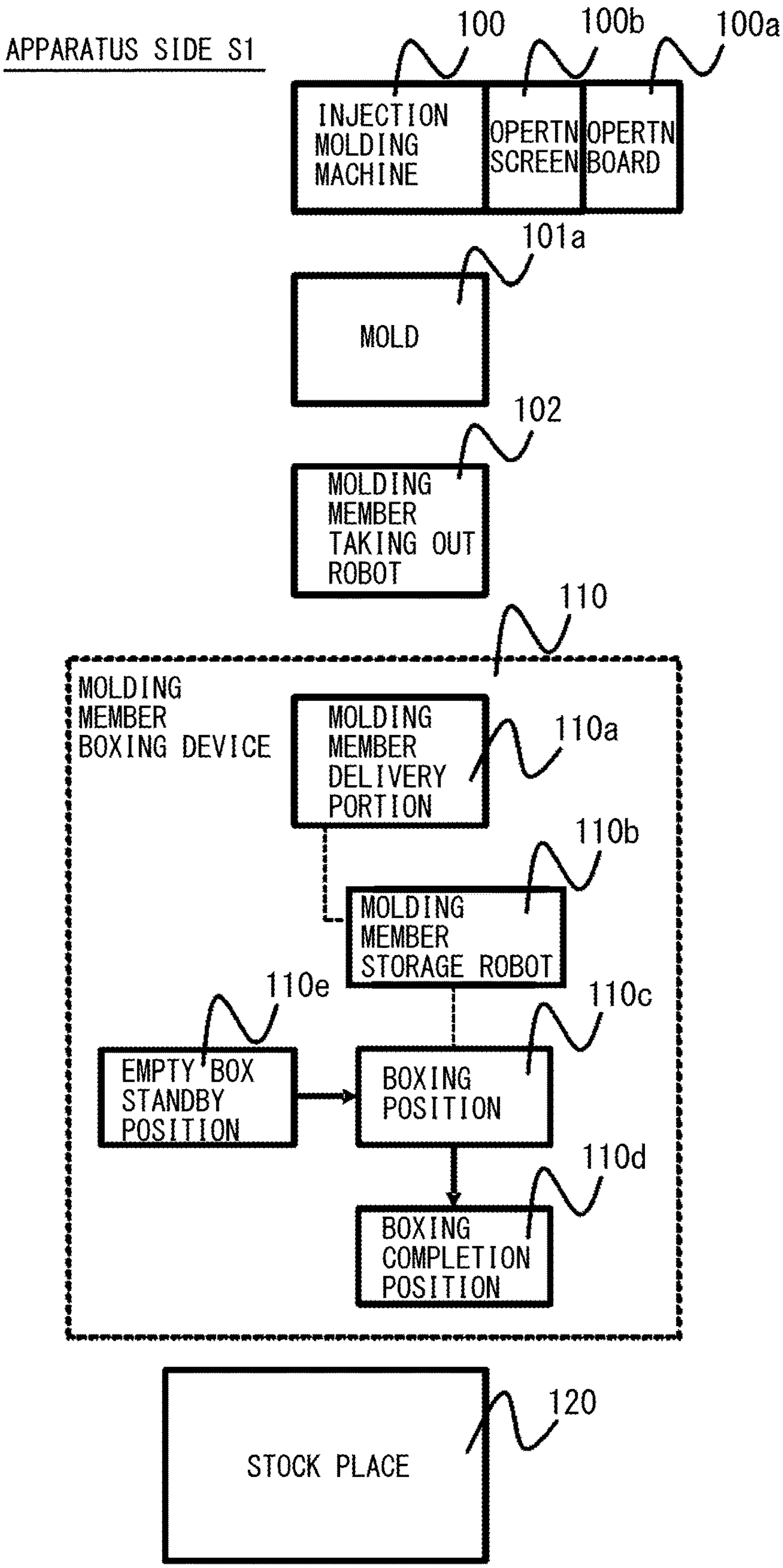
FIG. 1A is a view illustrating a configuration of a control system of an Embodiment 1.
Figure 1B:
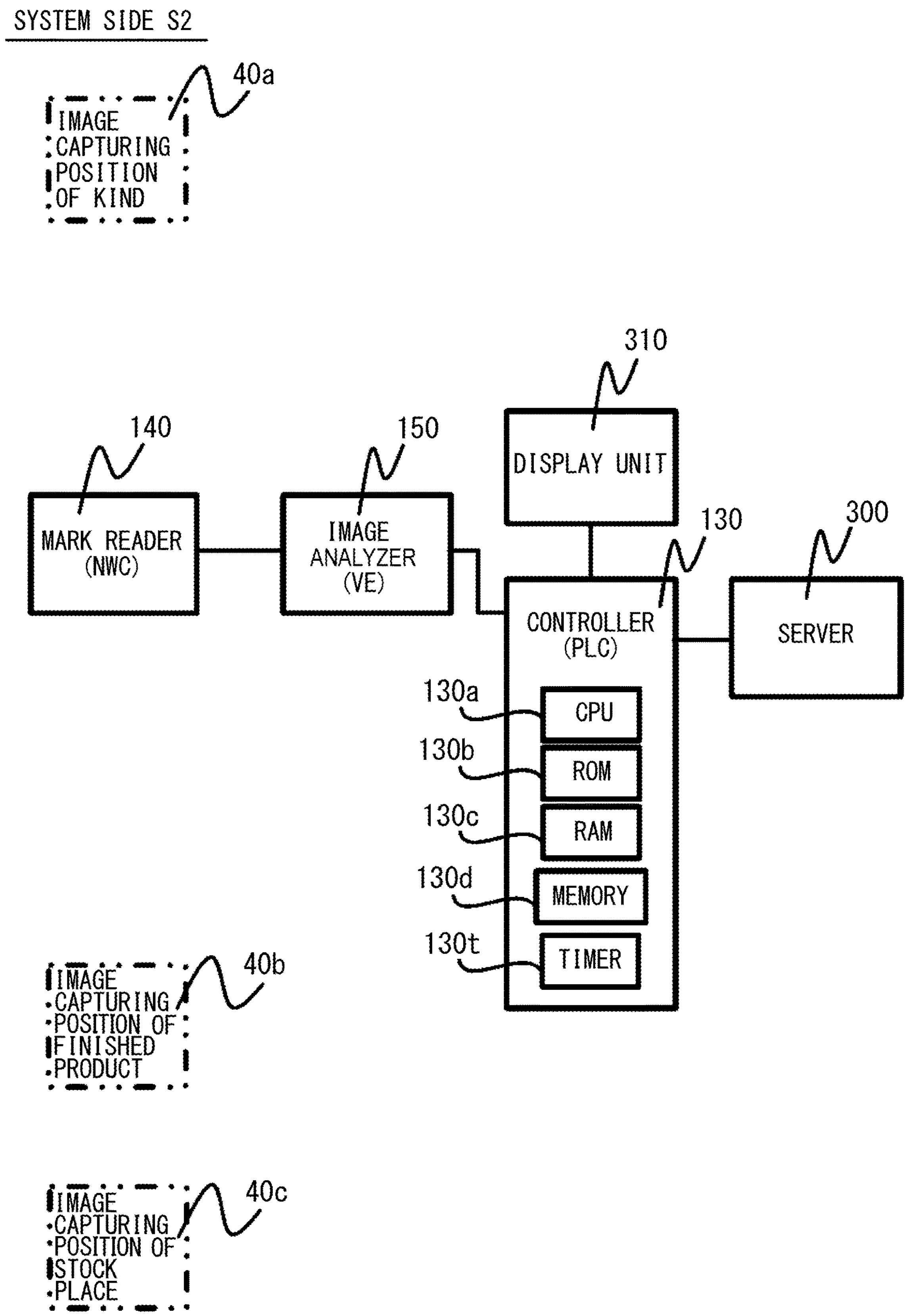
FIG. 1B is a view illustrating the configuration of the control system of the Embodiment 1.

A system configuration of a control system for controlling a molding member of an Embodiment 1 is illustrated in FIG. 1A and FIG. 1B. In the Embodiment 1, the system configuration will be described largely divided into a device side S1 and a system side S2. As shown in FIG. 1A, the device side S1 is constituted by an injection molding machine 100, a mold 101*a*, a robot for taking out the molding member 102, a device for packing the molding member 110 and an inventory storage area 120. The injection molding machine 100, which molds the molding member, includes an operating panel 100*a* and an operating screen 100*b*. The device for packing the molding member 110 includes a portion for handing over the molding member 110*a* and a robot for storing the molding member 110*b*. As a first place, where a returnable box is placed and related to the device for packing the molding member 110, there are provided a packing position 110*c*, a packing completion position 110*d*, an empty box standby position 110*e*, etc.

In addition, the system side S2 is constituted by a record controlling portion 130, a mark reading portion 140, an image analyzing portion 150, a server 300, and a display unit 310. As a position related to the system side S2, there are provided a position for reading and picking up a kind 40*a*, a position for reading and picking up a finished product 40*b*, a position for reading and picking up the inventory storage area 40*c*, etc.

In the Embodiment 1, it will be described with the molding member, which is molded by the injection molding machine 100 on the device side S1, being taken as an example. In addition, a general programmable controller (hereinafter abbreviated as PLC) is used as the record controlling portion 130, which performs an association of various information on the molding member. In addition, the mark reading portion 140, which is a first pickup means, shall be a camera connected to a network (hereinafter abbreviated as NWC). It is configured that an image picked up by the mark reading portion 140 is analyzed by the image analyzing portion 150, which is connected via a network, such as a LAN, for example.

Incidentally, in the Embodiment 1, as the injection molding machine 100, for example, a fully automatic injection molding machine SE-HSZ from Sumitomo Heavy Industries, Ltd. is used, and as the record controlling portion 130, MELSEC-Q series from Mitsubishi Heavy Industries, Ltd. is used. Furthermore, as the mark reading portion 140, VB-H45 from Canon Inc., which is the NWC capable of pan, tilt and zoom, is used. In addition, as the image analyzing portion 150, Canon Industrial Imaging Platform (hereinafter abbreviated as CIIP) Vision Edition (hereinafter abbreviated as VE) from Canon Inc. is used. This CIIP VE has functions to analyze an image picked up by the NWC and to read a bar code.

In addition, the mark reading portion 140 used in the Embodiment 1 can also be mounted on a ceiling in general. Thus, it becomes possible to minimize an impact on a layout of existing devices and on human flow lines, and an additional human work. Incidentally, for each device described above, other products having similar functions may be used. For example, as the mark reading portion 140, a bar code reader may be used, or a plurality of NWCs with fixed views may be set. Furthermore, a hand-held camera may be used. In addition, with respect to information on time and order of the molding member, which will be described below:

[1] The information on the time is defined by time associated with the molding member such as, mold opening/closing time when the molding member is molded, starting or completion time of process time related to the molding such as injection and dwelling time, molding completion time and taking-out time, time when the molding member is stored in the returnable box, starting or completion time of packing of the molding member to the returnable box, time when the returnable box reaches and is placed in the inventory storage area, aging time determined by molded date and time and the molding member, and time when a work ID for storing the information on the molding member to the database is generated.

[2] The information on the order is defined by a shot number of the molding member (order of molding), order of packing the molding member to the returnable box, order of completion of packing of the molding member, etc. For example, in a case in which only [1] the time information is provided, if the completion time of packing of the molding member is defined as year, month, date, hour, minute and second, then the order of molding of the stored molding member can be specified based only on the time information.

Next, in a case in which [1] the time information+[2] the order information are provided, if the completion time of packing of the molding member has only year, month and date (in cases in which the aging time is short, qualitative, or the like), it is difficult to specify the order of molding based only on the time information, therefore, by acquiring the information on the shot number of the molding member, it becomes possible to specify the order of molding.

And in a case in which only the order information is provided, if the aging time is short and the molding member is used up in one day (e.g., in a process where the molding member can be consumed in a downstream process immediately after molding), data may include only the shot number of the molding member or the order of completion of packing. In addition, there is nothing wrong with further combining the information on the time and the information on the order.

[Injection Molding Machine]

Part (a) of FIG. 2 is a view illustrating the injection molding machine 100 of the Embodiment 1, and is a schematic view of a state before the molding member 10 is molded and taken out. As shown in part (a) of FIG. 2, a case in which the mold 101*a* is set in the injection molding machine 100 to mold the molding member 10 will be described in detail. The injection molding machine 100 molds the molding members of the same shape while using a certain mold 101*a*. An operator operates the operating panel 100*a* of the injection molding machine 100 and inputs a molding condition for molding the molding member 10, or calls up the molding condition saved in advance. The molding condition of the molding member 10 input or called up are then displayed on the operating screen 100*b*. After the display of the molding condition on the operating screen 100*b*, the operator starts a molding operation of the injection molding machine 100. The injection molding machine 100 injects molten molding material into the clamped mold 101*a* and molds the molding member 10 based on the input or called molding condition. As the molding condition, various known parameters such as temperature, pressure, time, amount, speed, position, etc. are included. The molding member 10 molded by the injection molding machine 100 is then taken out from the mold 101*a* by the robot for taking out the molding member 102 after the mold 101*a* is opened.

[Process for Creating the Database Before the Molding Member is Placed in the Inventory Storage Area]

(Process 1)

As shown in FIG. 1A and FIG. 1B, the mark reading portion 140 is fixedly or movably set in a position from which the mark reading portion 140 can pick up the operating screen 100*b*. Incidentally, in a case in which the mark reading portion 140 is movably set, the position for reading and picking up the kind 40*a* is registered in a storage portion (not shown) in advance, and the mark reading portion 140 shall move to the position for reading and picking up the kind 40*a*, which is read out from the storage portion. In addition, in a case in which the mark reading portions 140 are fixedly set, at least one mark reading portion 140 should be set at each of a plurality of pickup positions described below. In other words, a second image pickup means, different from the first image pickup means, may be provided. Furthermore, one mark reading portion 140 may have a field of view which allows the mark reading portion 140 to pick up the plurality of pickup positions. In the case in which the mark reading portion 140 is movably set, it may be configured that one mark reading portion 140 shall move to the plurality of pickup positions, or a plurality of mark reading portions 140 shall move to pick up positions within a certain defined range. With respect to the configuration of the set of the mark reading portion 140, various combinations may be applied.

The mark reading portion 140 picks up the operating screen 100*b* at the position for reading and picking up the kind 40*a*. The image picked up by the mark reading portion 140 is transmitted to the image analyzing portion 150. Part (b) of FIG. 2 is a view illustrating an image processing screen 150*a* of the image analyzing portion 150, and is a schematic view illustrating an image processing which analyzes information on the kind (hereinafter referred to as "kind information") from the picked up operating screen 100*b* of the injection molding machine 100. As shown in part (b) of FIG. 2, the operating screen 100*b* is displayed on the image processing screen 150*a* of the image analyzing portion 150. The image analyzing portion 150 can then identify the current kind of the molding member by capturing a molding condition name 11 within an image processing area 150*b* and performing the image processing. Incidentally, it is necessary for a program of the image processing to be constructed and registered in advance in a storage portion (not shown), which is provided to the image analyzing portion 150, so that the kind information of the molding member 10 can be read from the molding condition name 11.

In the Embodiment 1, a rule is defined that a name of the kind of the molding member 10 (hereinafter referred to as "kind name") should be disposed at a right end of the molding condition name 11, and a program for reading a character at the right end of the image processing area 150*b* is developed. By this, the image analyzing portion 150 performs the image processing of an image within the image processing area 150*b* and determines the kind of the molding member 10 to be, for example, "A". Incidentally, a location for identifying the kind is not limited to the location of the molding condition name 11, but may be positions of other information displayed on the operating screen 100*b*, such as a molding temperature 12 (° C.), molding condition 13, etc. The operating screen 100*b*, which is provided to the injection molding machine 100, serves as a first display portion for displaying information on at least the kind of the molding member.

(Process 2)

FIG. 3 is a view illustrating a process before the molding member 10 is packed, and is a schematic view illustrating a state in which the molding member 10 is transferred from the portion for handing over the molding member 110*a* to the packing position 110*c*. The molding member 10 is placed in the portion for handing over the molding member 110*a* of the device for packing the molding member 110 after being taken out from the injection molding machine 100 by the robot for taking out the molding member 102, as shown by an arrow of broken line in FIG. 3. The robot for storing the molding member 110*b* takes out the molding member 10 from the portion for handing over the molding member 110*a*. The robot for storing the molding member 110*b*' sequentially stores the molding members 10' in a returnable box 20*a* (box), which is set at the packing position 110*c*. Incidentally, in a case in which the molding member 10 can be packed in a posture as it is taken out, or in a case in which a process such as inspection is not performed on the molding member 10 immediately after it is taken out, the robot for taking out the molding member 102 may also serve as the robot for storing the molding member 110*b*.

Part (a) of FIG. 4 is a schematic view illustrating a partition 23*a* of the returnable box 20*a* and a mark 400*a* on a lid 21*a*. As shown in part (a) of FIG. 4, the returnable box 20*a* is provided with the partition 23*a* so that the molding members 10 can be stored in an aligned manner. In addition, the returnable box 20*a* is made of plastic in terms of conveyance, rigidity, etc., and a plurality of returnable boxes 20*a* of the same shape are used to store a large quantity of the molding members 10. Incidentally, the returnable box 20*a* does not have to be provided with the partition 23*a*, nor does it have to be made of plastic. To the lid 21*a*, the mark 400*a* is attached, which is a first mark indicating information on the box for identifying each returnable box 20*a*. In the Embodiment 1, the returnable box 20*a* is provided with the partition 23*a* to store, for example, the sixteen molding members 10 inside.

The molding/storing of the molding member 10 is repeated in this manner, and when the returnable box 20*a* becomes full, the lid 21*a* is put on an opening of the returnable box 20*a*. The lid 21*a* includes the mark 400*a* as shown in part (a) of FIG. 4 and is configured to be separate from the returnable box 20*a*, however, the lid 21*a* may be configured to be integral with the returnable box 20*a*. Here, part (b) of FIG. 4 is a schematic view illustrating other marks, i.e., modified examples of the first mark. In the Embodiment 1, as the mark 400*a*, for example, a two-dimensional code is used, however, as shown in part (b) of FIG. 4, a one-dimensional bar code, a symbol or a number, each of which can be identified, Data Matrix, which is another two-dimensional code, etc., may be used as long as each of these can be identified. Thus, the first mark (mark 400*a*) may include a character, a graphic, a symbol, a color, a one-dimensional bar code or a two-dimensional code, or a combination thereof.

(Process 3)

Part (a) of FIG. 5 is a schematic view illustrating a state in which the returnable box 20*a* is transported to the packing completion position 110*d*. As shown in part (a) of FIG. 5, the returnable box 20*a* is transported from the packing position 110*c* to the packing completion position 110*d* by a moving means such as a conveyor belt, for example.

(Process 4)

As shown in FIG. 1A, FIG. 1B and part (a) of FIG. 5, the mark reading portion 140 is fixedly or movably set at the position for reading and picking up the finished product 40*b*, which is a position where the mark 400*a*, which is attached to the lid 21*a* of the returnable box 20*a* placed at the packing completion position 110*d*, can be picked up. Incidentally, in the case in which the mark reading portion 140 is movably set, the position for reading and picking up the finished product 40*b* shall be registered in the storage portion (not shown) in advance.

The picked-up image is transmitted to the image analyzing portion 150. Part (b) of FIG. 5 is a view illustrating the image processing screen 150*a* of the image analyzing portion 150, and is a schematic view illustrating a state of the image processing which reads the mark 400*a*. As shown in part (b) of FIG. 5, the mark 400*a* is displayed on the image processing screen 150*a* of the image analyzing portion 150. The image analyzing portion 150 then captures the mark 400*a* in the image processing area 150*c*, recognizes the mark 400*a* by the image processing, and transmits information that the molding member 10 is stored in the returnable box 20*a* to which the mark 400*a* is attached to the record controlling portion 130, and the record controlling portion 130 records the information. The image analyzing portion 150 functions as an acquiring means for analyzing the image of the mark 400*a* of the returnable box 20*a* picked up by the mark reading portion 140 and acquiring the information on the box. Then, the record controlling portion 130 refers to a timer (not shown) and defines time when the mark 400*a* is picked up as completion time of packing, so that the time when the mark 400*a* is picked up can be used as completion time of packing Ta of the molding member 10. Incidentally, as in the kind reading, definitions, etc. of the information on the time and the order of the molding member should be programmed in advance. In the Embodiment 1, it is defined as the completion time of packing. The record controlling portion 130 functions as a construction means for constructing a database by associating the information on the box acquired by the image analyzing portion 150 with the information on the time and the order of the molding member.

(Database Registration Process)

FIG. 6 is a flowchart illustrating a registration process to the database. In the flowchart of FIG. 6, which illustrates a process for associating the returnable box, the kind of the molding member and the completion time of packing by the system side S2, when the molding of the molding member 10 by the injection molding machine 100 starts, processes after a step 101 (hereinafter referred to as S101) is initiated. Incidentally, hereinafter the description will be made under an assumption that the mark reading portion 140 is set in the movable configuration. In S101, the system side S2 moves the mark reading portion 140 to the position for reading and picking up the kind 40*a*.

In S102, the system side S2 picks up the operating screen 100*b* of the injection molding machine 100 by the mark reading portion 140 and determines whether or not the kind information of the molding member 10 has been searched by the image analyzing portion 150. Here, the search includes that the image analyzing portion 150 captures the targeted molding condition name 11 of part (b) of FIG. 2, for example, within the image processing area 150*c*. If the system side S2 determines in S102 that the search for the kind information is not completed, then returns the process to S102 to continue the search, and if the system side S2 determines that the search is completed, then proceeds the process to S103.

In S103, the system side S2 acquires the kind information by the image processing of the image analyzing portion 150. As described above, the image picked up by the mark reading portion 140 is transmitted to the image analyzing portion 150, and the operating screen 100*b* is displayed on the image processing screen 150*a* of the image analyzing portion 150, as shown in part (b) of FIG. 2. Here, on the operating screen 100*b*, for example, the input or called up name of molding condition (the molding condition name 11 described above) and specific conditions, such as molding temperature (° C.) 12 and other molding conditions 13 are displayed together with the molding condition name 11.

In S104, the system side S2 moves the mark reading portion 140 to the position for reading and picking up the finished product 40*b*. Incidentally, the system side S2 may move the mark reading portion 140 in advance to the position for reading and picking up the finished product 40*b* without waiting for the returnable box 20*a* to be transported to the packing completion position 110*d*. In S105, the system side S2 picks up the mark 400*a* of the returnable box 20*a* by the mark reading portion 140 and determines whether or not a search for the mark 400*a* by the image analyzing portion 150 is completed. Here, the search includes that the image analyzing portion 150 captures the targeted mark 400*a* within the image processing area 150*c*. Incidentally, in S104, the system side S2 stores the time when the mark 400*a* is picked up by the mark reading portion 140 by the record controlling portion 130 in the storage portion (not shown) as the completion time of packing Ta. If the system side S2 determines in S105 that the search for the mark 400*a* is not completed, then returns the process to S105, and if the system side S2 determines that the search for the mark 400*a* is completed, then proceeds the process to S106.

In S106, the system side S2 acquires information of the mark 400*a* searched in S105 and the completion time of packing Ta stored in the storage portion (not shown). In S107, the system side S2 registers the mark 400*a* of the returnable box 20*a* to the database by the record controlling portion 130. In S108, the system side S2 associates the mark 400*a* of the returnable box 20*a* registered in the database with the kind information acquired in S103 and the completion time of packing Ta acquired in S106, registers these to the database, and ends the process.

(Process 5)

As described in the flowchart of FIG. 6, the various data collected by the image analyzing portion 150 is transmitted to the record controlling portion 130, which is connected via the LAN, association of the information is performed by the record controlling portion 130, and the database is constructed.

(Database)

Part (c) of FIG. 5 is a view illustrating an example of the database at the packing completion position 110*d*. The data transmitted to the record controlling portion 130 are associated with each other in a database structure shown in part (c) of FIG. 5. As shown in part (c) of FIG. 5, in the database of the Embodiment 1, one record is registered per mark number 1001. Each record has columns such as a bar code No. 1002, a kind 1003, an aging time 1004, a completion time 1005, a shipping availability 1006, and a priority order 1007, which are associated as attributes. In the Embodiment 1, for the sake of simplicity of description, the reference numeral "400*a*" of the mark 400*a* is used for the mark number 1001. However, in practice, it may be configured that a serial number starting from 0 or any number is used, or that the bar code No. 1002 also serve as the mark number 1001, etc. The bar code No. 1002 is an unordered number indicating the mark 400*a*.

In the Embodiment 1, in a recording position of the mark number 1001 being "400*a*", "0001", which is the bar code No. indicated by the mark 400*a*, is stored in the bar code No. 1002. In addition, "A", which indicates the kind of the molding member 10, is stored in the kind 1003, and the completion time of packing Ta is registered (recorded) in the completion time 1005, respectively. Then an aging time T corresponding to the kind of the molding member 10 (e.g., "A", etc.) is then recorded in the aging time 1004. In the Embodiment 1, the completion time 1005 of the mark number "400*a*" shall be "2110091000", and the aging time T of the kind "A" of the molding member 10 shall be 3 hours. The completion time is represented as a series of numbers: year (last two digits thereof), month, date, hour and minute. For example, in the database of part (c) of FIG. 5, the completion time of packing Ta, which can be read from the information registered in a field of the completion time 1005 of the mark 400*a*, is "Oct. 9, 2021, 10:00". Incidentally, a format in which the data is registered may be changed depending on the data handled in the completion time 1005. In addition, the aging time T may vary depending on the kind of the molding member 10. At a stage when the data is registered, since the specified aging time T has not yet elapsed, or in other words, counting of the aging time has just started, "shipping unavailable" is registered in the shipping availability 1006. After the database construction is completed as described above, the database is stored in the server 300, which is connected via the LAN, etc. as appropriate. Incidentally, the record controlling portion 130 may start counting of time by the timer (not shown) to control the aging time T at a timing of completion of the registration of the database on the returnable box 20*a*.

(Process 6)

As described above, when the molding member 10 is stored in the returnable box 20*a* and the database construction of the information such as the mark 400*a*, the kind, and completion time of packing Ta is completed, a completion notification is notified to a worker X. The completion notification to the worker X is performed via the display unit 310, which is connected to the record controlling portion 130 via a network means such as the LAN or RS232C. Upon receiving the completion notification, the worker X feeds the returnable box 20*a* from the packing completion position 110*d* to any location in the inventory storage area 120.

By repeating the above processes and operations (process 1 through process 6), the returnable boxes 20*a* storing the molding members 10 molded by the injection molding machine 100 will be placed one after another in the inventory storage area 120. Part (a) of FIG. 7 is a schematic view illustrating a state when nine boxes of the returnable boxes 20*a* through 20*i* are placed in the inventory storage area 120. In the Embodiment 1, nine boxes of the returnable boxes 20*a* through 20*i* are placed in the inventory storage area 120, as shown in part (a) of FIG. 7. Incidentally, the marks corresponding to the returnable boxes 20*a* through 21*i* will be the marks 400*a* through 400*i* attached to the lids 21*a* through 21*i*. In addition, the returnable boxes 20*f* through 20*i* store the molding members of the kind B, which are molded on the same day by the injection molding machine 100 and with which the information is associated through the same processes and operation (process 1 through process 6) as the kind A described above. Incidentally, an even greater number of returnable boxes may be placed, or even a greater number of kinds may be mixed. Hereinafter, suffixes of reference numeral a, b . . . , etc. may be omitted except when describing a specific returnable box, etc.

Part (b) of FIG. 7 is a view illustrating the database corresponding to the state of part (a) of FIG. 7, i.e., the database corresponding to the returnable boxes 20*a* through 20*i* placed in the inventory storage area 120 in part (a) of FIG. 7. Various information registered in the records of each mark (in other words, the returnable box) registered to the mark number 1001 is stored. For example, with respect to the returnable box 20*d*, information such as following is associated with the record of the mark number 1001 being "400*d*" and constructed as the database. That is, the bar code No. 1002 is "0005", the kind 1003 is "A", the aging time 1004 is "3" hours, the completion time 1005 is "2110091100", and the shipping availability 1006 is "shipping unavailable". In addition, for example, with respect to the returnable box 20*g*, information such as following is associated with the record of the mark number 1001 being "400*g*" and constructed as the database. That is, the bar code No. 1002 is "0032", the kind 1003 is "B", the aging time 1004 is "4" hours, the completion time 1005 is "2110090830", and the shipping availability 1006 is "shipping unavailable".

[Updating Process of the Database after the Returnable Box is Placed in the Inventory Storage Area]

(Process 7)

As shown in FIG. 1A and FIG. 1B, the mark reading portion 140 is moved to the position for reading and picking up the inventory storage area 40*c*, which is a position where the mark reading portion 140 can pick up the marks 400*a* through 400*i* attached to the lids 21*a* through 20*i* of the returnable boxes 20*a* through 20*i* placed in the inventory storage area 120. The position for reading and picking up the inventory storage area 40*c* is registered in advance. Incidentally, the mark reading portion 140 may be fixedly set. The image picked up by the mark reading portion 140 is transmitted to the image analyzing portion 150. Part (a) of FIG. 8 is a view illustrating the image processing screen 150*a* of the image analyzing portion 150, and is a schematic view illustrating a state of the image processing which reads the picked-up marks 400*a* through 400*i*. As shown in part (a) of FIG. 8, the marks 400*a* through 400*i* are displayed on the image processing screen 150*a* of the image analyzing portion 150, and the image analyzing portion 150 acquires the coordinates of the marks 400*a* through 400*i* in the image processing. Specifically, the image analyzing portion 150 finds the marks 400*a* through 400*i* within a range of an image processing area 150*d*. Incidentally, in the image processing area 150*d*, a position indicating an origin of X and Y coordinates is assumed in advance, and the image analyzing portion 150 shall determine the coordinates of the marks 400*a* through 400*i* based on the origin. In addition, in the Embodiment 1, two-dimensional coordinates as the coordinates indicating the position of the mark is used, however, three-dimensional coordinates may be used by adding a coordinate in a height direction (Z coordinate) in a case, for example, in which the returnable boxes are placed in a stacked manner, etc. In addition, in the Embodiment 1, a rectangular coordinate system is used, however, other coordinate systems, such as a polar coordinate system, may be used.

From the found marks 400*a* through 400*i*, the image analyzing portion 150 acquires positional information X1 through X9 and Y1 through Y9 of the marks 400*a* through 400*i* (hereinafter referred to as positional information of the mark) in an angle of view of the mark reading portion 140. For example, for the mark 400*a* of the returnable box 20*a*, the positional information of the mark (X1, Y1) is acquired. Similarly, for the mark 400*b* of the returnable box 20*b*, the positional information of the mark (X2, Y2) is acquired, and up to the positional information (X9, Y9) for the mark 400*i* of the returnable box 20*i* is acquired.

Based on the positional information of the mark X1 through X9 and Y1 through Y9 acquired through the image processing by the image analyzing portion 150, the image analyzing portion 150 calculates positional information for displaying an image in a virtual space of the display unit 310 using a conversion formula to a virtual coordinate system prepared in advance. Incidentally, the positional information for displaying the image in the virtual space of the display unit (virtual coordinates) is hereinafter referred to as virtual positional information for display and is denoted by XX1 through XX9 and YY1 through YY9.

Here, virtual representation of the inventory storage area 120 on the display unit 310 is referred to as a virtual inventory storage area 220. Part (b) of FIG. 8 is a schematic view illustrating the virtual inventory storage area 220 displayed on the display unit 310, which is a second display portion. As shown in part (b) of FIG. 8, information 410*a* through 410*i* corresponding to the mark 400 of each box 20 is disposed in the virtual inventory storage area 220 displayed on the display unit 310, based on the virtual positional information for display XX1 through XX9 and YY1 through YY9. Thus, the information 410*a* is an image virtually indicating the mark 400*a*. In addition, in the Embodiment 1, kind information 51*a* through 51*i* is displayed at the positions of the information 410*a* through 410*i* so that the worker can determine which position of the returnable box 20 in the inventory storage area 120 stores which kind of the molding member 10 just by looking at the display unit 310.

Thus, by identifying the marks 400*a* through 400*i* of the returnable boxes 20*a* through 20*i* placed in the inventory storage area 120 with the image analyzing portion 150, the actual inventory storage area 120 shown in part (a) of FIG. 7 can be virtually displayed (virtual view can be displayed) on the display unit 310. Therefore, the worker X can easily know which kind of the molding member 10 is stored in which returnable box 20 simply by looking at the display unit 310.

In addition, the mark reading portion 140, which has been moved to or fixed up at the position for reading and picking up the inventory storage area 40*c*, picks up the inventory storage area 120 at predetermined time interval (e.g., several 10 seconds, etc.). By this, it becomes possible to respond in a case in which changes occur in the returnable boxes 20 in the inventory storage area 120, such as when the new returnable box 20 is placed in the inventory storage area 120 or when the returnable box is moved manually, etc. In other words, by the mark reading portion 140 picking up the inventory storage area 120 at the predetermined time intervals, it becomes possible to detect changes in condition of the inventory storage area 120 and to update information on the condition of the inventory storage area 120. As described above, it is configured that the mark reading portion 140 picks up the inventory storage area 120 at a certain time interval at the position for reading and picking up the inventory storage area 40*c*.

[On after a Predetermined Amount of Time has Elapsed Since the Completion of a Certain Returnable Box 20]

(Process 8)

(Three Hours after the Completion of the Returnable Box 20*a*)

Part (a) of FIG. 9 is a view illustrating changes in the database at 13:00, i.e., when the aging time for the kind A has elapsed (hereinafter referred also to as an end of the aging). More in detail, it is the database in a state in which three hours have elapsed after the storing to the returnable box 20*a* is completed, i.e., after the information on the returnable box 20*a* is registered to the database, i.e., the time is 13:00. The aging time 1004 is three hours since the molding member 10 stored in the returnable box 20*a* is kind A. Therefore, the record controlling portion 130 changes the shipping availability 1006, which is associated with the record of the mark 400*a*, from "shipping unavailable" to "shipping available" because three hours have elapsed.

In the Embodiment 1, the record controlling portion 130 starts counting elapsed time with the timer (not shown) as well as records the time in the completion time 1005. In the record controlling portion 130, a program, which writes "shipping available" to the database after the record controlling portion 130 determines that the aging time for the kind has elapsed, is embedded. In addition, the record controlling portion 130 also determines whether or not there is any other kind A of which the shipping availability 1006 is "shipping available" in the database. In part (a) of FIG. 9, the priority order 1007 becomes "1" in the record of the mark number 1001 being "400*a*" since there is no other mark number 1001 of which the shipping availability 1006 is "shipping available" among the kind A. As such, the record controlling portion 130 determines the priority order for shipping of the returnable boxes based on the information on the kind and the completion time.

Incidentally, in part (a) of FIG. 9, for the kind B of the mark number 1001 being "400*f*" and "400*g*", four hours have already elapsed from the completion time 1005 and the information "shipping available" is registered for both of the shipping availability 1006. In addition, the information "1" and "2" are also registered in the priority order 1007, respectively. For the kind B of the mark number 1001 being "400*h*", because four hours has elapsed from the completion time 1005 thereof at the timing of part (a) of FIG. 9, the information is updated with "shipping available" in the shipping availability 1006 and "3" in the priority order 1007, as described above for the mark number 1001 being "400*a*". For the returnable box 20*h*, the priority order 1007 is set to "3" since the priority orders "1" and "2" have already been registered.

(Three Hours and Twenty Minutes after the Completion of the Returnable Box 20*a*)

Part (b) of FIG. 9 is a view illustrating changes in the database at 13:20, i.e., at the end of the aging time, and it is the database of a state in which three hours and twenty minutes has elapsed after the storing to the returnable box 20*a* is completed. Since the molding member 10 stored in the returnable box 20*b* is kind A and three hours have elapsed since the completion, the shipping availability 1006 associated with the mark 400*b* indicating the returnable box 20*b* is changed to "shipping available". And since there is data for the kind A which has already been "shipping available", the priority order 1007 for the returnable box 20*b* becomes "2". By determining the priority order in this manner, it becomes possible to ship in order from what has earlier time stored in the completion time 1005. In addition, since the same processes are applied to the marks 400*f* through 400*i* associated with the returnable boxes 20*f* through 20*i*, status of the shipment availability and the priority order changes in the same manner

[Shipping (Feeding to Downstream Process) of the Returnable Box (Molding Member)]

(Process 9)

A case in which two more hours have elapsed from the state shown in part (b) of FIG. 9, i.e., a feeding order for the molding member 10 of kind A is issued at 15:20 will be illustrated using part (a) of FIG. 10. Part (a) of FIG. 10 is a view illustrating the virtual inventory storage area 220 on the display unit 310, and a schematic view of a case in which an area corresponding to the returnable box 20*a*, to which the feeding order is issued, is displayed so as to be standing out in particular. Incidentally, with respect to part (a) of FIG. 10, the same reference numeral is used for the same configuration as part (b) of FIG. 8. In the Embodiment 1, based on the information 410*a* through 410*i* on the display unit 310, the record controlling portion 130 automatically identifies (extracts) the mark number 1001, in which the molding member 10 of kind A is stored, of which the shipping availability 1006 is "shipping available", and of which the priority order 1007 is "1". The record controlling portion 130 refers to the database at the time of receiving the feeding order and extracts the mark 400*a* of the returnable box 20*a*, for example, in a case of the state such as part (b) of FIG. 9. As shown in part (a) of FIG. 10, the record controlling portion 130 displays the information 410*a*, which indicates the mark 400*a* of the returnable box 20*a*, in a manner to be distinguishable from the other marks 400*b* through 400*i*, such as highlighting, etc. (in part (a) of FIG. 10, shown in hatching). As such, by using the display unit 310, it becomes possible to inform the worker X of the returnable box 20*a* to be fed by using visual information. Incidentally, with respect to a way of the display so as to be distinguishable, the returnable box to be fed may be informed by other different means.

Then, in order to find the returnable box 20*a* to be fed, the worker X will use coordinates information on the display unit 310, the two-dimensional code reader, etc. to find the returnable box 20*a* in the actual inventory storage area 120. Here, part (b) of FIG. 10 is a view illustrating an image analyzing screen 150*a* of the image analyzing portion 150, and is a schematic view when a symbol for human visibility (30*a*) is attached along with the mark 400*a*. Incidentally, the same reference numeral is attached to the same configuration as in part (b) of FIG. 5. A fourth mark, which is the human visibility mark 30*a*, indicating the information on the returnable box in a recognizable state by a human may be attached adjacent to the mark 400*a*, which is the first mark. In the Embodiment 1, as shown in part (b) of FIG. 10, the record controlling portion 130 displays "0001" of the bar code No. 1002, which is indicated by the mark 400*a*, as a mark which can be understood by the worker X adjacent to the mark 400*a*. By this, it becomes easy even for a human eye to locate the returnable box 20*a*. The identified returnable box 20*a* is fed to the downstream process.

(After Shipping (Fed to the Downstream Process))

In part (a) of FIG. 11, a state of the inventory storage area 120 after the returnable box 20*a* is fed to a downstream process is illustrated. In part (a) of FIG. 11, the same reference numeral is attached for the same configuration as in part (a) of FIG. 7. As described in the process 7, the mark reading portion 140 picks up the inventory storage area 120 at the predetermined time intervals. By this, as shown in part (a) of FIG. 8, by performing the image processing, the state of the inventory storage area 120 is updated. In other words, the image analyzing portion 150 cannot find the mark 400*a* in the image processing since the mark 400*a* is not present. Thus, the image analyzing portion 150 also determines presence or absence of the mark 400 as a result of the image analysis on the picked-up image of the inventory storage area 120. If the image analyzing portion 150 cannot find the mark 400*a*, then image analyzing portion 150 erases the information 410*a* indicating the mark 400*a* from the image processing screen 150*a*. Part (b) of FIG. 11 is a schematic view illustrating the virtual inventory storage area 220 displayed on the display unit 310 corresponding to the state in part (a) of FIG. 11. The record controlling portion 130 updates the display of the display unit 310 as shown in part (b) of FIG. 11. Furthermore, FIG. 12 is the database showing a state of part (b) of FIG. 11. The record controlling portion 130 updates the information in the database as shown in part (a) of FIG. 12.

Specifically, the record controlling portion 130 updates the record of which the mark number 1001 is "400*a*". That is, for the record of the mark number 1001 being "400*a*", the shipping availability 1006 is changed to "shipped" and the priority order 1007 is updated to blank. Accordingly, the priority order for other molding members of the same kind will be updated. For example, the record of the mark number 1001 being "400*b*" is updated, and the priority order 1007 is updated from "2" to "1". In addition, as another way to update the database, the record controlling portion 130 may monitor the status of the shipping availability 1006 at predetermined time intervals and perform updating of the priority order.

Furthermore, in the Embodiment 1, after the process 6, the worker X feeds the returnable box 20 to arbitrary position in the inventory storage area 120, however, it is not limited to this configuration. The returnable box may be fed to a predetermined position. In addition, the returnable boxes may be fed using an automatic guided vehicle (AGV) or the free feeding trolley.

(In a Case in which the Returnable Box is Moved within the Inventory Storage Area)

In a case in which the feeding of returnable boxes is performed by using a feeding device such as the automatic guided vehicle (AGV) or the free feeding trolley, since people may enter the inventory storage area 120, the free feeding trolley of human-cooperating type is preferable. Furthermore, there is a case in which people may take the returnable box out for sampling inspection, etc., and not return the returnable box to the same position. For example, a case in which the returnable box 20*h* is moved from the state of part (a) of FIG. 11 to the position where the returnable box 20*a* was placed will be described. FIG. 13 is a schematic view of the inventory storage area 120 when the returnable box 20*h* is moved and a schematic view of the virtual inventory storage area 220 displayed on the display unit 310. Even if the returnable box 20*h* is moved to the position where the returnable box 20*a* was placed, since the mark reading portion 140 picks up the inventory storage area 120 at the predetermined time intervals, the image of the virtual inventory storage area 220 on the display unit 310 is also updated based on the newly picked up image, as shown in FIG. 13. By this, even if the position of the returnable box 20*h* is changed, the operator X will know the changed position.

In addition, in the case using the device such as the automatic guided vehicle (AGV) and the free feeding trolley, it is preferable to configure as following. FIG. 14 is a view illustrating the database shared with the device controlling the free feeding trolley, etc. For example, in a state of FIG. 13, it is preferable to share the database with the device controlling the free feeding trolley, etc. so as to be able to know positions where the returnable boxes 20*b* through 20*i* are placed, as shown in FIG. 14. FIG. 14 is the view illustrating the database in this case. The coordinates XX and YY of the virtual positional information for display 1008 used for the display of the display unit 310 constructed in the process 7 are shared by applying conversion formulas and converting to actual coordinates XXX1 through XXX9 and YYY1 through YYY9 of an actual coordinate system 1009, which is shared with the device controlling the free feeding trolley, etc. The actual coordinate system 1009 is a coordinate system, which is suitable for the automatic guided vehicle (AGV), the free feeding trolley, etc., to actually move around the inventory storage area 120, and in which a predetermined position is defined as an origin. In this manner, it becomes possible to specify an actual position of the returnable box 20. Incidentally, since the image picked up by the mark reading portion 140 is distorted in end portions, the coordinates may be corrected to take the distortion into account. For a method correcting the coordinates to account for the image distortion, known methods may be used. In the above, it may be configured that the record controlling portion 130 associates the virtual coordinates with the information on the returnable boxes in the database, and the feeding device feeds the returnable boxes based on the database.

(In a Case of a Free Location Feeding)

Part (a) of FIG. 15 is a schematic view illustrating coordinates which are shared with the device controlling the free feeding trolley, etc. In a case of a free location feeding, in which the positions for the returnable boxes 20 to be placed are defined in advance, it may be configured as shown in part (a) of FIG. 15. That is, in an inventory storage area 120*a*, placing positions P1 through P12 are lattice-likely arranged as the positions for the returnable boxes to be placed. A mark reading portion 140*y* then picks up images at pickup positions of the mark reading portion 140*y* corresponding to the placing positions P1 through P12, and the image analyzing portion 150 confirm presence or absence of the mark 400 from the picked-up images. If the mark 400 is present, then the image analyzing portion 150 transmits information of the mark 400 to the record controlling portion 130, and the record controlling portion 130 registers the information to the database.

Specifically, in the inventory storage area 120*a*, the placing positions P1 through P12 for the returnable boxes 20 to be placed are defined in advance. And a case in which, for example, the returnable box 20*k* provided with the mark 400*k* is placed at the placing position P1 will be described. The mark reading portion 140*y* is set so that the placing positions P1 and P4 are in its pickup range 43*a*. By performing the image processing on a picked-up image 155, the image analyzing portion 150 determines that the mark 400*k* is present at the placing position P1 in an image processing area 150*y*1. On the other hand, the image analyzing portion 150 determines that the mark is absent at the placing position P4 in the image processing area 150*y*2.

Thus, as shown in the database of part (b) of FIG. 15, in a placing position 1010 of the mark number 1021 being "400*k*", "P1" indicating the placing position P1 is registered. Incidentally, part (b) of FIG. 15 is a view illustrating the database corresponding to the state of part (a) of FIG. 15. In this manner, the inventory storage area 120*a* is picked up by the mark reading portion 140*y*, which is changing the pickup positions one after another from the pickup range 43*a* through 43*f*. By this, it becomes possible to confirm (determine) whether the mark 400 (returnable box 20) is or is not present in the inventory storage area 120*a*. Incidentally, the database of part (b) of FIG. 15 is provided with columns for a bar code No. 1022 (e.g. "0001"), a kind 1023 (e.g. "K"), an aging time 1024 (e.g. "10") and a completion time 1025 (e.g. "2110091000"). In addition, the database is provided with columns for a shipping availability 1026 (e.g., "shipping unavailable") and a priority order 1027.

Furthermore, by configuring as the above process, it becomes not necessary to share detailed coordinate data. In addition, an actual coordinate system of the placing position P1 may be stored by the device controlling the free feeding trolley, etc. Needless to say, this configuration is also applicable for a case in which there are even more placing positions.

(Process 10)

After more time has elapsed from the state shown in FIG. 13, a case in which the returnable box 20*a* is fed to the downstream process, the molding member 10 is taken out in the downstream process, and the returnable box 20*a* becomes empty and is returned to the inventory storage area 120 will be described.

The mark reading portion 140 picks up the inventory storage area 120 at the predetermined time interval at the position for reading and picking up the inventory storage area 40*c*. Part (a) of FIG. 16 is a schematic view illustrating a status in which the returnable box 20*a*, which became empty, is returned to the inventory storage area 120. As shown in part (a) of FIG. 16, when the returnable box 20*a* is returned to the inventory storage area 120, it can be recognized that the mark 400*a* attached to the returnable box 20*a* appears in the inventory storage area 120 by the image analyzing portion 150 analyzing the image picked up by the mark reading portion 140. The image analyzing portion 150 transmits this information to the record controlling portion 130.

At this time, the record controlling portion 130 can recognize, based on the database shown in FIG. 12, that the returnable box 20*a* having the mark 400*a*, whose shipping availability 1006 is "shipped", is returned with becoming empty. Here, part (b) of FIG. 16 is a view illustrating another database for backup. As shown in part (b) of FIG. 16, the record controlling portion 130 may separately store the information as a backup in the storage portion (not shown) so that history of the mark 400*a* can be followed in the database. For example, in the database for backup, an erased time 1035, etc., may be provided to record the time when the returnable box 20*a* is returned with becoming empty to the inventory storage area 120, etc. Incidentally, a column for the erased time 1035 may be provided in the main database (the database which has been described). In the Embodiment 1, in the database for backup, it is recorded that "400*a*" in a mark number 1031, "0001" in a bar code No. 1032, "A" in a kind 1033, and "2110091000" in a completion time 1034. As such, all information may be stored in the main database, or as shown in part (b) of FIG. 16, a sub-database may be provided as the database for backup. In part (a) of FIG. 10, assuming a case in which the shipping order is issued at, for example, 15:20 and the returnable box is returned, for example, three hours after the shipping, then "2110091820" is recorded in the erased time 1035 of the database.

Part (a) of FIG. 17 is a view illustrating the database in which the information in recording positions for the mark 400*a* has been erased. As shown in part (a) of FIG. 17, the record controlling portion 130 deletes the information registered in the record positions for the mark number 1001 being "400*a*", excluding information on the returnable box, for example, the record controlling portion 130 deletes the information on the molding member 10, and leaves the information on the returnable box 20*a*. Specifically, in the record of the mark number 1001 being "400*a*", "400*a*" of the mark number 1001 and "0001" of the bar code No. 1002 are kept. In the record of the mark number 1001 being "400*a*", the kind 1003, the aging time 1004, the completion time 1005, the shipping availability 1006, the priority order 1007, etc. are deleted.

Then, after a new molding member is stored in the empty returnable box 20*a*, information on the newly stored molding member is recorded in the mark 400*a*. Part (b) of FIG. 17 is a view illustrating the database to which the new information is recorded in the record position for the mark 400*a*. Part (b) of FIG. 17 represents the database when the new molding member (kind C) is molded by the injection molding machine 100 and the molding member of the kind C is stored in the returnable box 20*a* after the process 1 through the process 6. In the record corresponding to the returnable box 20*a*, "C" for the kind 1003, "6" for the aging time 1004, "2110091920" for the completion time 1005, "shipping available" for the shipping availability 1006, etc. are newly registered. Thus, it is possible to reuse not only the returnable box 20*a* and the mark 400*a* but the record in the database corresponding to the returnable box 20*a*.

(Modified Example of a Returning Place for the Empty Returnable Box 20*a*)

Part (a) of FIG. 18 is a schematic view when the empty returnable box 20*a* returns to the empty box standby position 110*e*. The returnable box 20*a* which became empty and is returned may be returned directly to the empty box standby position 110*e*, which stores the empty returnable boxes, for example, as shown in part (a) of FIG. 18, rather than to the inventory storage area 120. At this time, the backup of the information in the record of the database and deletion of the information in the predetermined columns may be performed in the process 6. In addition, as shown in part (a) of FIG. 18, a mark reading portion 140*z* may be set to process at the empty box standby position 110*e*. In other words, the mark reading portion 140*z* may pick up the mark 400*a* on the lid 21*a* of the returnable box 20*a*, and the image analyzing portion 150 may analyze the picked-up image and then back up the information in the record of the database and erase the information in the predetermined columns. Furthermore, after the mark 400*a* is read by the mark reading portion 140*z*, the lid 21*a* may be opened to confirm that the returnable box 20*a* is empty, and then the backup and the erasure described above may be performed.

MODIFIED EXAMPLES

Modified Examples of the Embodiment 1 will be described below.

Modified Example 1. Number of the Mark

Part (b) of FIG. 18 is a schematic view of a case in which a mark 450*p* and a mark 400*p* are attached to a main body of a returnable box 20*p* and to a lid 21*p*, respectively, and a view illustrating an example of the database. As shown in part (b) of FIG. 18, the mark attached to the returnable box is not limited to one. For example, the returnable box 20*p* is provided with the main body having an inner space for storing the molding member and the lid 21*p*, which is put on the main body. To the main body of the returnable box 20*p*, the mark 450*p*, which is the first mark, is attached, and to the lid 21*p*, the mark 400*p*, which is a third mark indicating information on the lid 21*p*, is attached. The record controlling portion 130 may, in the database, make the information on the lid dependent to the information on the box, or make the information on the box dependent to the information on the lid, and associate therebetween. In the case in which the returnable box and the lid are configured to be separate, as in the Embodiment 1, it is preferable for the returnable box 20*p* and the lid 21*p* to have the mark 450*p* and the mark 400*p* to identify the returnable box 20*p* and the lid 21*p*, respectively. For example, the mark 450*p* may be attached to the main body of the returnable box 20*p* and the mark 400*p* may be attached to the lid 21*p*. In addition, a position at which the mark is attached to the main body or to the lid of the returnable box (hereinafter referred to as an “attachment position”) may also be arbitrary position.

In a case in which the mark 450*p* and the mark 400*p* are attached to both the main body of the returnable box 20*p* and the lid 21, the database may be constructed either for the mark 450*p* of the returnable box 20*p* or for the mark 400*p* of the lid 21*p*, as described above. However, it is preferable to set the mark 450*p* of the returnable box 20*p* side, which is a side the molding member is actually put, as primary. As shown in the database of part (b) of FIG. 18, it may be configured that a mark number (lid) 1043 is registered in a manner that the mark number (lid) 1043 is dependent to a record of a mark number (returnable box) 1041, i.e., as one of the columns. Specifically, “450*p*” for the mark number (returnable box) 1041, and the bar code No. “0251” indicated by the mark 450*p* for a bar code No. 1042 are recorded. In addition, “400*p*” for the mark number (lid) 1043, and the bar code No. “6020” indicated by the mark 400*p* for the bar code No. 1044 are recorded, respectively, in the manner dependent to “450*p*” of the mark number 1041. Incidentally, in a case in which the mark is attached to the main body of the returnable box, the mark may be attached to at least one face of the returnable box, or to all faces of the returnable box. In addition, a plurality of marks may be attached to one face of the returnable box.

Furthermore, since the molding member to be stored is often determined in advance, in the mark 450*p* of the returnable box 20*p* side, which is the side the molding member is actually put, the kind information may be incorporated. As such, it becomes possible to simplify the system by incorporating the constant information into the mark 450*p* in advance. In addition, for example, it can also be applied to prevent incorrect put by matching the kind molded in the mold with the kind information incorporated in the mark 450*p*.

(In a Case in which the Returnable Boxes are Placed in a Stacked Manner)

As such, by attaching the mark 450*p* and the mark 400*p* on the main body of the returnable box 20*p* and on the lid 21*p*, respectively, control with the database can be applied even in a case in which the returnable boxes are placed in a stacked manner. FIG. 19A is a schematic view when marks 450*q*, 450*r*, 400*q* and 400*r* are attached to a plurality of the returnable boxes 20*q* and 20*r* and the lids 21*q* and 21*r*, respectively, and a view illustrating an example of the database. For example, the database can be constructed for the returnable box 20*q* and the lid 21*q* and the returnable box 20*r* and the lid 21*r* as shown in FIG. 19A. Specifically, the mark 450*q* is attached to the returnable box 20*q* and the mark 400*q* is attached to the lid 21*q*, and in the database, information of each record is registered in a manner that “400*q*” of the mark number (lid) 1043 is dependent to “450*q*” of the mark number (returnable box) 1041. Similarly, the mark 450*r* is attached to the returnable box 20*r* and the mark 400*r* is attached to the lid 21*r*, and in the database, information for each record is registered in a manner that “400*r*” of the mark number (lid) 1043 is dependent to “450*r*” of the mark number (returnable box) 1041. The other columns of the database are the same as in part (b) of FIG. 18.

Thus, if a database is constructed with the same concept, it is possible to register and update information in the database even in the case in which the returnable boxes 20 are stacked on top of each other. FIG. 19B is a schematic view when the returnable box 20*q* and the returnable box 20*r* are stacked and a view illustrating an example of the database. For example, as shown in FIG. 19B, when the returnable box 20*r* is placed with being stacked on top of the returnable box 20*q*, the mark 400*q* attached to the lid 21*q* of the returnable box 20*q* becomes invisible. In other words, even when the returnable box 20*q* and the returnable box 20*r* are picked up by the mark reading portion 140, the mark 400*q* cannot be recognized by the image analyzing portion 150. However, even when the mark 400*q* on the downside lid 21*q* is invisible, since the mark 450*q* of the returnable box 20*q* is attached in a visible position, it is possible to acquire information on a status of the returnable box 20*q* from the mark 450*q*.

Furthermore, it is possible to construct the database by associating the information of the mark 400*q* with the mark 400*r* of the upside lid 21*r*. For example, the database is constructed so that the records of the database are firstly divided into columns of a first row 1055 (top row) and a second row 1056, and then the mark number (lid) 1051 and 1053, and bar code No. 1052 and 1054 are given, respectively. Specifically, in the first row (top row) 1055, “400*r*” is registered in the mark number (lid) 1051 and the bar code No. “2054” indicated by the mark 400*r* is registered in the bar code No. 1042, respectively. In addition, in the second row 1056, “400*q*” is registered in the mark number (lid) 1053, and the bar code No. “1069” indicated by the mark 400*q* is registered in the bar code No. 1054, respectively. Incidentally, it is possible to construct the database in the same way in a case in which two or more rows of the returnable boxes are stacked.

Furthermore, the same can be applied to a case in which the returnable boxes 2000*a* through 2000*aa* provided with the marks 2400*a* through 2400*aa* are loaded on a pallet 2500 as shown in part (a) of FIG. 31 for an administrative purpose. At this time, it is assumed that, with the marks 2400*a*, 2400*d*, 2400*g*, 2400*j*, 2400*m*, 2400*p*, 2400*s*, 2400*v* and 2400*y* of the top row, the marks of the lower rows are associated in advance. Then, as shown in part (b) of FIG. 31, a Kanban 2502, on which the mark 2501 is printed, is put on top of the returnable boxes, and by associating the information of the marks 2400*a*, 2400*d*, 2400*g*, 2400*j*, 2400*m*, 2400*p*, 2400*s*, 2400*v* and 2400*y* of the top row of the returnable boxes 2000*a* through 2000*aa*, which are loaded on the pallet 2500, with the mark 2501, it becomes possible to control the returnable boxes loaded on the pallet 2500 collectively. Of course, instead of associating with the mark 2501, it may be associated with the mark 2400*a* of the top row, etc. representatively, or it may be associated with the mark 2503, which is provided to the pallet 2500. It may be chosen by taking visibility, convenience, etc. upon control into account. Incidentally, in part (b) of FIG. 31, some reference numerals are omitted for the sake of Figure’s visibility.

(In a Case in which the Lids are Swapped Between the Two Returnable Boxes)

Furthermore, FIG. 20 is a schematic view illustrating a case in which the lid 21*q* and the lid 21*r* are swapped, and a view illustrating an example of the database before and after modification. For example, when a worker opens and returns the lids of the two returnable boxes at the same time to inspect the molding members, there is a case in which the lids are swapped. For example, the lid 21*r* may be put on the returnable box 20*q* and the lid 21*q* on the returnable box 20*r*. Even in that case, as shown in FIG. 20, the mark reading portion 140 picks up the mark 450*q* and the mark 400*r* on the returnable box 20*q* and on the lid 21*r*, and the mark 450*r* and the mark 400*q* on the returnable box 20*r* and on the lid 21*q*, and the image analyzing portion 150 analyzes the picked-up results. The record controlling portion 130 compares the result of the analysis of the images by the image analyzing portion 150 with the current database. By this, it is possible for the record controlling portion 130 to determine that the swapping of the lids has occurred and to correct the information of the mark 400*q* and the mark 400*r* of the lids in the database based on the mark 450*q* and the mark 450*r*.

Specifically, as shown in the database on the left in FIG. 20, the record controlling portion 130 updates the information registered as "400*q*" in the mark number (lid) 1043 for the record of the mark number (returnable box) 1041 being "450*q*" to "400*r*" as shown in the database on the right. The record controlling portion 130 also updates the bar code No. 1044 of the lid from "1069" to "2054". The same applies to the record of the mark number (returnable box) 1041 being "450*r*". Both are changed as shown in broken line frames on the database of FIG. 20. Incidentally, it may be configured that the database remains unchanged (specified as unchangeable), a notification to an operator is issued to instruct to put the lid on the correct returnable box so that the returnable boxes and the lids are consistent with each other, while the database remains unchanged.

Modified Example 2. Acquiring Method of the Kind

The kind of the molding member can also be determined based on the mold. In other words, the injection molding machine 100 may have the mold provided with a second mark which includes the information on the kind of the molding member. Part (a) of FIG. 21 is a schematic view in a case that, to a mold 101*d* of the injection molding machine 100, the mark 470*d*, which is the second mark, is attached. Therefore, as shown in part (a) of FIG. 21, the mark 470*d* provided to the mold 101*d* can be picked up by the mark reading portion 140, and the kind of the molding member can be identified through the image analysis by the image analyzing portion 150. In addition, a shape of the molding member and a shape/color, etc. of the returnable box may be picked up by the mark reading portion 140, and the kind may be identified from the characteristic shape and color of the molding member and/or the returnable box through the image analysis by the image analyzing portion 150. In other words, the molding member has a shape and/or a color related to the information on the kind, and the kind information may be acquired corresponding thereto.

Modified Example 3. Information Constructed to the Database

With respect to constructing the database, information other than the information on the time and the order of the molding members may be recorded. Part (b) of FIG. 21 is a view illustrating an example of the database when the molding history information of the injection molding machine 100 is added. For example, various information as shown in part (b) of FIG. 21 may be added to the database shown in part (c) of FIG. 5. Specifically, the molding history, such as molding log like a molding condition 1060, a maximum injection pressure 1061, a cushion amount 1062, etc., may be extracted from the injection molding machine 100 and registered to the database. In addition, after the aging, there is also a case in which the general molding member is shipped after a predetermined inspection, e.g., the sampling inspection is executed. For this purpose, inspection information 1063 of the sampling inspection, etc. may be registered to the database. The record controlling portion 130 may associate the information on the inspection with the information on the returnable box in the database. The inspection information 1063 in the database may be changed directly, or a targeted kind, a molded date and time, and inspection result thereof may be posted in a form which can be picked up by the mark reading portion 140, and the database may be updated based on the image of the posted form picked up by the mark reading portion 140. Furthermore, information such as which molding machine (mold) was used for the molding and conventional lot information may be added.

Modified Example 4. Extension of the Embodiment 1

FIG. 22A, FIG. 22B and FIG. 22C are views illustrating a configuration of the control system in a case in which there are a plurality of the injection molding machines 100 and 800 and a plurality of the inventory storage areas 120, 120*b* through 120*d*. As shown in FIG. 22A, FIG. 22B and FIG. 22C, the configuration of the Embodiment 1 is applicable even in a case in which a plurality of the injection molding machines 100 and 800 are provided and there are a plurality of the inventory storage areas 120, 120*b* and 120*c*, and a large inventory storage area 120*d* on the device side S1'. In this case, the reading position of the mark reading portion should be increased as a position for reading and picking up the kind 40*aa*, a position for reading and picking up the finished product 40*bb*, and positions for reading and picking up the inventory storage area 40*d* through 40*g*. In addition, the mark reading portions 140 should be increased as the mark reading portions 140*a* through 140*d*. In this manner, the control system can be easily expanded. Furthermore, each device may be increased, such as the image analyzing portions 150 and 150', the record controlling portions 130 and 130', the display units 310 and 310', and the servers 300 and 300' on the system side S2'.

As described above, by associating the information on the time and the order of the molding member with the mark of the returnable box which stores the molding member, it is possible to control the molding member in unit of one returnable box, which is the smallest unit of feeding upon feeding to another location, without directly attaching an identifying portion on the molding member. Furthermore, by applying the configuration of the Embodiment 1, when a defect etc. occurs in the molding member, the returnable boxes to which the storing of the molding members have been completed before and after when the molding member with the defect is stored in a certain time range can be identified based on the information on the returnable box to which the molding member with the defect has been stored. And it becomes possible to compare the actual molded products molded before and after the defective product, and to efficiently identify the molding members to which the specific defect may occur without having to inspect all of the products, etc.

In addition, since the mark on the returnable box retains only the information which identifies the returnable box, unnecessary information is not recorded, and even in a case in which information is added, the addition is executed on the database associated with the mark, therefore there is no need for the mark of the returnable box to be transported in a writing device as well.

As described above, according to the Embodiment 1, it becomes possible to control the molding member in unit of the returnable box.

Embodiment 2

In the Embodiment 1, the information on the kind of the molding member is acquired by picking up the operating screen 100*b* of the injection molding machine 100 with the mark reading portion 140 at the timing of molding the molding member with the injection molding machine 100. For example, in a case in which a number of the kinds of the molding members is small, the information on the kind may be registered to the database by associating the information on the kind with the mark attached to the returnable box at a timing when the returnable box storing the molding member is placed in the inventory storage area. Hereinafter, details will be described.

[System Configuration]

First, a configuration of a control system in the Embodiment 2 is shown in FIG. 23. An inventory storage area 620 is in the device side SS1, and in the system side SS2, the same devices as in the Embodiment 1 are used, and reference numerals are the reference numerals used in the Embodiment 1 added by one. Here, as a record controlling portion 131, MELSEC-Q series from Mitsubishi Heavy Industries, Ltd. is used. As a mark reading portion 141, VB-H45 from Canon Inc., which is the NWC capable of pan, tilt and zoom, is used. As an image analyzing portion 151, Canon Industrial Imaging Platform (hereinafter, CIIP) Vision Edition (hereinafter VE) from Canon Inc. is used. Incidentally, for each device, other products having similar functions may be used. In the Embodiment 2, a case in which two kinds of the molding members (kind H and kind G) are molded, and the returnable boxes in which the molding members are stored are transported to the inventory storage area 620 will be described.

Incidentally, positions used in the system of the Embodiment 2 include: a stocking position 621 (a round number 1 is attached in FIG. 23) and a stocking position 622 (a round number 2 is attached in FIG. 23). In other words, the returnable box in which the molding member is stored is placed at the stocking position 621 or the stocking position 622, which are the first positions with which the information on the kind is associated, and the kind information is acquired corresponding to the position. In addition, the positions used in the system include: a position for picking up the stocking position 41*a* (a round number 1 is attached in FIG. 23) and a position for picking up the stocking position 41*b* (a round number 2 is attached in FIG. 23). In the following description, the round numbers are omitted, and the positions are distinguished by the reference numerals. Here, it is assumed that the returnable box in which the molding member of the kind H is stored is placed at the stocking position 621, and the returnable box in which the molding member of the kind G is stored is placed at the stocking position 622. As such, in the case in which the number of the kinds of the molding members is small, the returnable boxes may be placed separately for each kind.

(Process 1: Acquisition of the Kind Information)

Part (a) of FIG. 24 is a schematic view illustrating a state in which a mark 550*a* and/or a mark 500*a* is read by the mark reading portion 141. As shown in part (a) of FIG. 24, a returnable box 200*a* in which the molding member is stored is transported to the inventory storage area 620. The mark reading portion 141 is fixedly set in a position where the mark reading portion 141 can pick up the mark 500*a* attached to a lid 210*a* of the returnable box 200*a*. Incidentally, the mark reading portion 141 may be movably set, and in this case, the positions described above shall be registered as pick up positions in advance. The mark reading portion 141 picks up a vicinity including the returnable box 200*a* at the position for picking up the stocking position 41*a*. Part (b) of FIG. 24 is a view illustrating an image processing screen 151*a* of the image analyzing portion 151, and is a schematic view illustrating a state of an image processing when the mark 500*a* is read. An image picked up by the mark reading portion 141 is transmitted to the image analyzing portion 151 and, as shown in part (b) of FIG. 24, the mark 500*a* is displayed on the image processing screen 151*a* of the image analyzing portion 151. The image analyzing portion 151 recognizes the mark 500*a* by capturing the mark 500*a* in an image processing area 151*c* and applying the image processing thereto, and the record controlling portion 131 records information that the returnable box 200*a* provided with the mark 500*a* is stocked at the inventory storage area 620.

In the Embodiment 2, as information on the time and the order of molding member, time when the mark reading portion 141 picks up the mark 500*a* is defined as a completion time Tb. In the Embodiment 2, the returnable box in which the molding member of the kind H is stored is placed at the stocking position 621, and the returnable box in which the molding member of the kind G is stored is placed at the stocking position 622. Thus, for the mark 500*a* of the returnable box 200*a* picked up by the mark reading portion 141 at the position for picking up the stocking position 41*a*, information on the kind H is registered to the database. In addition, for the mark of the returnable box picked up by the mark reading portion 141 at the position for picking up the stocking position 41*b*, information on the kind G is registered to the database. In the Embodiment 2, the kind information of the molding member is acquired according to the pickup position of the mark reading portion 141.

Part (c) of FIG. 24 is a view illustrating another example showing the kind information. As shown in part (c) of FIG. 24, a kind information 510*a* on the kind stored in the returnable box 200*a* may be clearly marked on a main body (or lid 210*a*) of the returnable box 200*a*, for example, as "Kind: H". In addition, the kind information may be embedded in the mark 550*a* attached to the returnable box 200*a* which actually stores the molding member. In addition, a marking method of the mark 500*a* may be changed for each kind. For example, it may be configured that the kind can be identified by making types of the mark different such that one kind is represented by a one-dimensional bar code 510, another kind is represented by a two-dimensional code 511. As in the Embodiment 1, where the kind information is acquired from the operating screen 100*b* of the injection molding machine 100, the kind information may be acquired from a configuration related to the injection molding machine.

In an example of part (a) of FIG. 24, the position where the returnable box 200*a* (mark 500*a*) is placed/pickup position is the stocking position 621/position for picking up the stocking position 41*a*. Therefore, the record controlling portion 131 identifies the kind information of the molding member stored in the returnable box 200*a* (mark 500*a*) as "H" based on the positional information. At this time, a plurality of the returnable boxes may be placed at the stocking position 621 and the stocking position 622 and a plurality of the marks may be read.

(Process 2)

Various types of information collected by the image analyzing portion 151 are transmitted to the record controlling portion 131, which is connected via the LAN, and the association of the information is performed. Part (a) of FIG. 25 is a view illustrating an example of the database after the returnable box 200*a* is placed in the inventory storage area 620. Specifically, the information transmitted to the record controlling portion 131 is associated with the database shown in part (a) of FIG. 25, respectively. In the database in part (a) of FIG. 25, one record is registered for each mark number 1101. With each record, a bar code No. 1102, a kind 1103, an aging time 1104, a completion time 1105, a shipping availability 1106 and a priority order 1107 are associated as attributes. In the Embodiment 2, for simplicity of description, the reference numeral 500*a* of the mark is used for the mark number 1101.

In the Embodiment 2, in a record of the mark number 1101 being "500*a*", "7889", which is the bar code No. indicated by the mark 500*a*, is stored in the bar code No. 1102, and "H", which is indicated by the kind information, is stored in the kind 1103. In addition, the completion time Tb is stored in the completion time 1105 in the record of the mark number 1101 being "500*a*". And the aging time T2 corresponding to the kind information is stored in the aging time 1104. In the Embodiment 2, for example, the completion time 1105 shall be "2110101000", and the aging time T2 for the kind H shall be five hours after completion of the stocking. The completion time 1105 is represented by a series of numbers for year (last two digits thereof), month, date, hour and minute, however, it may be changed according to data to be handled. In addition, there is a case that the aging time T2 varies depending on the kind of the molding member. At a stage when the information is stored in the database, since the specified aging time has not yet elapsed, "shipping unavailable" is stored in the shipping availability 1106. After the completion of the database construction as described above, the record controlling portion 131 stores the database on a server 301 connected via the LAN, etc., as appropriate.

(Database Registration Process)

FIG. 26 is a flowchart describing processes for registering the information on the returnable box of the Embodiment 2 to the database (database construction). In S201, the system side SS2 moves the mark reading portion 141 to the stocking position 621 or the stocking position 622. Incidentally, the process S201 may be skipped if the mark reading portion 141 is fixedly set at the stocking position 621 and the stocking position 622, respectively.

In S202, the system side SS2 picks up the inventory storage area 620 by the mark reading portion 141, searches for the mark of the returnable box by analyzing the image by the image analyzing portion 151, and determines whether or not the search is completed. If the system side SS2 determines in S202 that the search is not completed, then returns the process to S202; and if the system side SS2 determines that the search is completed, then proceeds the process to S203. Incidentally, the system side SS2 records the time when the picking up is performed by the mark reading portion 141. In S203, the system side SS2 acquires the kind information of the molding member according to the stocking positions 621 and 622 or the positions for picking up the stocking position 41*a* and 41*b*. For example, if the mark reading portion 141 performs the picking up at the position for picking up the stocking position 41*b*, then the kind information is acquired as "G".

In S204, the system side SS2 analyzes the mark of the returnable box by the image analyzing portion 151 as a result of the search in S201. For example, the image analyzing portion 151 analyzes that the mark is "500*a*", and acquires the bar code No. of the mark 500*a*. In addition, the system side SS2 acquires the completion time, which is the time when the picking up is performed by the mark reading portion 141 in S202. In S205, the system side SS2 registers the mark "500*a*" acquired in S204 to the mark number 1101 in the database by the record controlling portion 131. Incidentally, in a case in which "500*a*" is already registered in the mark number 1101 of the database, the process S205 may be skipped.

In S206, the system side SS2 registers the acquired information, etc. in the record of the mark number 1101 being "500*a*" in the database, associates the information on the returnable box with the information on the molding member, and terminates the process. For example, in the database, the record controlling portion 131 registers the bar code No. acquired in S203 in the bar code No. 1102, the kind information acquired in S203 in the kind 1103, and the completion time acquired in S204 in the completion time 1105.

(Process 3)

Next, when the various information is registered in the record of the mark 500*a* in the database (completion of the database construction), a worker Y is notified of a transporting order of the returnable box 200*a* via a display unit 311, which is connected to the record controlling portion 131 via the LAN, the RS232C, etc. Upon receiving a completion notification, the worker Y transports the returnable box 200*a* from the stocking position 621 to arbitrary location in the inventory storage area 121. Incidentally, the stocking position 621 may also serve as an inventory storage area.

As described above, by repeating the process 1 through the process 3, the returnable boxes are transported one after another to the stocking position 621 and the stocking position 622, and placed in the inventory storage area 620. Part (b) of FIG. 25 is a schematic view illustrating a state in which the returnable boxes 200*a* through 200*i* are placed in the inventory storage area 620. In the Embodiment 2, nine boxes of the returnable boxes 200*a* through 200*i* are placed as shown in part (b) of FIG. 25. Arrangement of each box may be aligned as of the returnable box 200*a* of the mark 500*a* through the returnable box 200*d* of the mark 500*d*, or may be placed randomly as of the returnable box 200*e* of the mark 500*e* through the returnable box 200*i* of the mark 500*i*. Furthermore, it may be placed in the lattice-likely manner suitable for the free-location as described in the Embodiment 1.

(Process 4)

Process 4 and thereafter are the same as the process 7 and thereafter in the Embodiment 1. In addition, the Modified Examples described in the Embodiment 1 are also applicable to the Embodiment 2. Therefore, these descriptions will be omitted.

As described above, according to the Embodiment 2, it becomes possible to control the molding member in unit of the returnable box.

Embodiment 3

In cases of molding sites with a certain degree of automation, according to the recent Internet of Things (IOT), it may be configured that an inner pressure sensor is provided in the mold in order to collect previously unseen information. By applying the present invention to such cases, it becomes possible to associate the molding member to the collected data easily. Hereinafter, details will be described. In other words, the injection molding machine includes the mold, molds the molding member by a predetermined molding condition and a predetermined inner pressure in the mold and transmits molding history information including the molding condition and the inner pressure to a record controlling portion 132. The record controlling portion 132 associates the molding history information with the information on the returnable box in the database.

[System Configuration]

A configuration of a control system of the Embodiment 3 is shown in FIG. 27. The device side SSS1 is constituted by an injection molding machine 900, a mold 901*a*, a robot for taking out the molding member 902*a* and a device for packing the molding member 910. The device for packing the molding member 910 includes a portion for handing over the molding member 910*a* and a robot for storing the molding member 910*b*. As positions related to the device side SSS1, there are an empty box standby position 910*e*, a packing position 910*c*, and a packing completion position 910*d*. The inventory storage area has the same configuration as the Embodiment 1 and the Embodiment 2.

In addition, a system side SSS2 is constituted by a record controlling portion 132, a mark reading portion 142, an image analyzing portion 152, a server 302, a display unit 312 and an inner pressure amplifier 162. As positions related to the system side SSS2, there is a position for reading and picking up the finished product 42*b*. Furthermore, the injection molding machine 900 and the robot for storing the molding member 910*b* are connected to the record controlling portion 132 via a network, etc., and an inner pressure sensor 901*b* of the mold 901*a* is connected to the record controlling portion 132 via the inner pressure amplifier 162 through a network, etc.

As the record controlling portion 132, MELSEC-Q series from Mitsubishi Heavy Industries, Ltd. is used. As the reading portion 141, VB-H45 from Canon Inc., which is the NWC capable of pan, tilt and zoom, is used. As the image analyzing portion 151, Canon Industrial Imaging Platform (hereinafter, CIIP) Vision Edition (hereinafter VE) from Canon Inc. is used. Ejector pin type SSE series and a pressure measurement amplifier MPS08B from Futaba Corporation are used for the inner pressure sensor 901*b* and the inner pressure amplifier 162, respectively. For each device, other products having similar functions may be used.

In the Embodiment 3, a case in which a database is constructed by associating various information with the mark after a number of the molding members, for example, four pieces of the molding members of the kind "J" are molded by the injection molding machine 900 and the mold 901*a* approximately simultaneously, and are stored automatically in the returnable box will be described. In the database, the record controlling portion 132 associates information indicating each of a plurality of divided spaces described below with the information on the returnable box, and associates the information indicating the divided spaces with the information on the molding members stored in the divided spaces. Processes in which molding members 10*j*1 through 10*j*4 are stored in a returnable box 20*s* will be described using FIG. 27 and FIG. 28.

(Process 1)

Four of the molding members 10*j*1 through 10*j*4 are molded approximately simultaneously and stored in the returnable box 20*s*. In the molding, cavity numbers (hereinafter referred to as a "cavi number") are commonly used. In the Embodiment 3, the cavity numbers are used, and the molding member 10*j*1 shall be a cavity 1, the molding member 10*j*2 shall be a cavity 2, the molding member 10*j*3 shall be a cavity 3, and the molding member 10*j*4 shall be a cavity 4. The returnable box 20*s* is divided by a partition 23*s*, as shown in part (b) of FIG. 28, and is capable of storing the molding members 10*j*1 through 10*j*4 in one row, and have three rows of them, for a total of 12 pieces (4 pieces×3 rows). Incidentally, divided spaces separated by the partition 23*s* and divided for storing the molding members 10*j*1 through 10*j*4 are referred to as accommodating space positions Sp1 through Sp12, respectively.

(Process 2)

The molding members 10*j*1 through 10*j*4 are sequentially stored in the returnable box 20*s* by the robot for storing the molding member 910*b*. Positions where the robot for storing the molding member 910*b* temporarily stops upon storing the holding molding member in the returnable box are referred to as robot positions Rp1 through Rp3, respectively. Part (a) of FIG. 28 is a schematic view illustrating a state in which the robot for storing the molding member 910*b* stores the molding members 10*j*1 through 10*j*4 in the returnable box 20*s*. Specifically, as shown in part (a) of FIG. 28, the robot for storing the molding member 910*b* stores the molding members 10*j*1 through 10*j*4 in the accommodating space positions Sp1 through Sp4 at the robot position Rp1 for the empty returnable box 20*s*. Next, the robot for storing the molding member 910*b* stores the molding members 10*j*1 through 10*j*4 in the accommodating space positions Sp5 through Sp8 at the robot position Rp2. Finally, the robot for storing the molding member 910*b* stores the molding members 10*j*1 through 10*j*4 in the accommodating space positions Sp9 through Sp12 at the robot position Rp3.

Thus, in a case in which the storing of the molding members 10*j*1 through 10*j*4 is automated, it is common practice to sequentially store the molding members. Part (b) of FIG. 28 is a view illustrating a state in which the molding members 10*j*1 through 10*j*4 are stored in the accommodating space positions Sp1 through Sp4 of the returnable box 20*s* and a mark 400*s* on a lid 21*s* of the returnable box 20*s*. Next, registration of information to the database is performed by utilizing the operation of the robot for storing the molding member 910*b*. However, in a case in which the storing of the molding members is ordered as a usual practice (e.g., storing order is from upper left of the properly placed returnable box, regardless of the kind to be molded), there is no problem to exclude the accommodating space position Sp from the database.

[Construction of the Database]

Construction of the database in the Embodiment 3 will be described using FIG. 27, FIG. 29A and FIG. 29B. FIG. 29A is a view illustrating an example of the database in a state in which the molding history information, etc., of the injection molding machine 900 is associated. The record controlling portion 132 receives a signal that the robot for storing the molding member 910*b* is in the robot position Rp1 and performs recording to the database as shown in FIG. 29A. Here, in the database of the Embodiment 3, as shown in FIG. 29A, each column of one record associated with a mark number 1071 is constructed as follows. That is, one record includes a bar code No. 1072, a Sp 1078, a work ID 1079, a kind 1073, a cavity number 1080, an aging time 1074 and a completion time 1075. In addition, one record includes an inner pressure 1081, a maximum injection pressure 1082, an inner pressure inspection 1083, a shipping availability 1076, a priority order 1077, etc.

In the Embodiment 3, an actual molding completion time, a molded year, month and date, and order of molding (shot number) received from the injection molding machine 900 are defined as information on the time and information on the order of the molding member.

When the construction of the database is performed, the record controlling portion 132 receives various information from the injection molding machine 900 and the inner pressure amplifier 162, which are connected via a network, etc. For example, the various information is such as signals output when the molding of the molding members 10*j*1 through 10*j*4 are completed (hereinafter referred to as a "molding completion signal"), information of the maximum injection pressure and inner pressure data. And the record controlling portion 132 associates the received various data with the records of the accommodating space positions Sp1 through Sp4. In the Embodiment 3, the aging time is six hours for the molding member of the kind "J".

Specifically, since the robot for storing the molding member 910*b* is in the robot position Rp1, the targeted accommodating space positions are Sp1 through Sp4. The record controlling portion 132 stores "1" indicating the accommodating space position Sp1 in the Sp 1078 of the database, and associates the work ID, which is constituted by the molded date and a number indicating order molded in the molded date (shot number), with the work ID 1079. In the Embodiment 3, it is assumed that the molding member recorded in the first row of the database is a molding member of 0001st work molded on May 31, 2021, therefore "2105310001" is stored in the work ID 1078. Furthermore, since it is sufficient to be able to know the order of the molding later, the shot number may be replaced by order in which the molding members are stored, order in which the work IDs are generated, or the like. In addition, in a case in which the aging time is short and the molding member is used up in one day (e.g., in a process where the molding member can be consumed in the downstream process immediately after the molding), it may be configured that only the shot number is used and the completion time 1075 is excluded.

Of course, there is no problem with a control combining information on conventional lot control and the shot numbers.

The record controlling portion 132 then sequentially stores the data received from the injection molding machine 900 and the inner pressure amplifier 162. The record controlling portion 132 stores "J" in the kind 1073 and "1" in the cavity number 1080. This is because the molding member 10*j*1 is stored in the accommodating space position Sp1. The record controlling portion 132 stores "6" as the aging time 1074 corresponding to the kind "J". The record controlling portion 132 stores, in the completion time 1075, the actual molding completion time "2105311000", which is received from the injection molding machine 900. The completion time 1075 is represented by a series of numbers for year (last two digits thereof), month, date, hour and minute, however, it may be changed according to data to be handled. In addition, the record controlling portion 132 stores "20" indicating 20 MPa, which is received from the inner pressure amplifier 162, in the inner pressure 1081, and "30" indicating 30 MPa, which is received from the injection molding machine 900, in the maximum injection pressure 1082.

In the Embodiment 3, since it is defined that "equal to or greater than 15 is OK" as a threshold value of the inner pressure, the record controlling portion 132 stores "OK" in the inner pressure inspection 1083, and since the specified aging time has not yet elapsed, the record controlling portion 132 stores "shipping unavailable" in the shipping availability 1076. Then, by the robot for storing the molding member 910*b* moving sequentially from the robot position Rp1 to the robot position Rp2, and then to the robot position Rp3, the database is updated corresponding to the operation, and the returnable box 20*s*, to which the storing of the molding members 10*j*1 through 10*j*4 is completed, is covered by the lid 21*s*.

(Process 3)

The returnable box 20*s* is transferred to the packing completion position 910*d* shown in FIG. 27.

(Process 4)

The mark 400*s* attached to the lid 21*s* of the returnable box 20*s*, which has been transferred to the packing completion position 910*d*, is picked up by the mark reading portion 142, as in the process 4 of the Embodiment 1, and the image analysis is performed by the image analyzing portion 152. The record controlling portion 132 records that the storing of the molding members 10*j*1 through 10*j*4 to the returnable box 20*s* (mark 400*s*) is completed.

(Process 5)

The record controlling portion 132 performs the association of the information in the same manner as in the process 5 of the Embodiment 1. FIG. 29B is a view illustrating an example of the database in which information such as the molding history information of the injection molding machine 900 is associated with the mark 400*s*. Specifically, as shown in FIG. 29B, the mark 400*s* is stored in the mark number 1071, and the bar code No. "1000" indicated by the mark 400*s* is stored in the bar code No. 1072. By this, as shown in FIG. 29B, it becomes possible to associate the molding history, etc. for each work by utilizing the accommodating space position Sp. Incidentally, the mark 400*s* may be read at the time of the storing of the molding member in the process 2 and associated to the database in advance. Since a process 6 and thereafter are the same as in the Embodiment 1, the description will be omitted.

And, according to the Embodiment 1 through the Embodiment 3, by sharing the database with the downstream assembly processes, etc., it becomes possible to trace the molding members, the molding history, etc., later. According to the Embodiment 1 and the Embodiment 2, it becomes possible to trace with the information on the time and the order of the molding member in unit of the returnable box. On the other hand, according to the Embodiment 3, in addition to the trace with the information on the time and the order of the molding member in unit of the returnable box, it becomes possible to trace with the molding history information, etc. in unit of the molding member. In order to associate information with an assembly product, for example, in a case in which a two-dimensional code is engraved on the product, it is preferable to associate the bar code No. of the returnable box, in which the molding member used for the assembly is stored, and the work ID with this two-dimensional code.

Hereinafter, in a case of the Embodiment 3 will be described briefly. By associating the work ID 1079 with the product, for example, in a record of the Sp 1078 being "12", as shown in FIG. 29B, the inner pressure inspection 1083 is "NG". Here, the maximum injection pressure 1082 of the Sp 1078 being "12" is "29", which is the same as the one previous molding member (of the Sp 1078 being "11").

Thus, even if the molding member, of which the inner pressure inspection 1083 is "NG", is put into assembly of the product, it becomes possible to trace the corresponding molding member later by the work ID 1079 read from the two-dimensional code engraved on the product.

As described above, according to the Embodiment 1 through the Embodiment 3, by attaching the mark to the returnable box storing the molding members, and by associating the information on the kind, the time and the order of the molding members with the mark, it becomes possible to control the shipping availability, the priority order, etc. in unit of one returnable box. Therefore, a controlling method different from a conventional lot management becomes possible. In addition, from the information constructed to the database, in a case in which a molding defect occurs, it becomes easier to identify the returnable boxes before and after the returnable box storing the defected molding member. For example, in a case in which the molding defect occurs due to switching of lot of resin material (hereinafter referred to as "resin lot"), it becomes easier to confirm condition of the molding members before and after the molding member in which the defect occurred. Therefore, both a number of inspections and a number of discards can be kept to a minimum since the molding member at a timing when the molding defect occurred can be easily confirmed without having to inspect/discard all the molding members. Furthermore, by sharing the database with the downstream assembly processes, etc., it is possible to trace the molding member, the molding history information, etc., later based on the information on the time and the order of the molding member.

[Control of the Lot of the Resin Material]

In a record of the database, information on the resin lot may be registered. The resin material is held in a bag to which information on the lot of the resin material is attached. The record controlling portion 130 may associate the information on the lot and/or time upon acquiring information on the lot with the information on the returnable box in the database. Part (a) of FIG. 30 illustrates the database described in part (c) of FIG. 5 with an additional column for a resin lot 1206. Columns of the database include: a mark number 1201, a bar code No. 1202, a kind 1203, an aging time 1204, a completion time 1205, the resin lot 1206, a shipping availability 1207 and a priority order 1208. Incidentally, the column of the resin lot can be added for the various databases described above.

The resin material used for the molding member may vary from lot to lot. In addition, the resin material may run low during the molding process by the injection molding machine, and there is a case in which another lot of the resin material is replenished. In other words, the resin material may switch. Conventionally, the switching of the resin material is simply controlled by an individual record by an operator, etc. Therefore, in a case in which a defect of the molding member is caused by a factor attributable to the resin material (e.g., quality of the resin material itself, switching of the resin material, etc.), it is difficult to identify the molding members which are molded by that resin material.

Part (b) of FIG. 30 is a view illustrating a hopper 101*c* of the injection molding machine 100 and a position for replenishing the resin material 109*c*. For example, as shown in part (b) of FIG. 30, the injection molding machine 100 is provided with the hopper 101*c*, which is a tank into which resin is fed, and the resin is supplied from the hopper 101*c* to the mold 101*a*. When the resin material in the hopper 101*c* is equal to or lower than a predetermined amount, an operator opens a bag 109 filled with the resin material and feeds the resin material into the hopper 101*c*. Incidentally, it should be configured that, to the bag 109, information 109*a* indicating at least a lot number of the resin material is attached in a manner readable by the mark reading portion 143. Thus, for example, the mark reading portion 143 picks up the information 109*a* of the bag 109, which is positioned at the position for replenishing the resin material 109*c*, at a position for reading and picking up the resin lot 42*a*. The image analyzing portion (not shown) acquires the information 109*a* of the resin lot by analyzing the image picked up by the mark reading portion 143. In addition, time when the information 109*a* of the resin lot is acquired is defined as switching time of the lot of the resin material. Incidentally, in a case in which there is a certain time lag before the fed resin actually begins to contribute to the molding process, time equivalent to the time lag may be added to the picked-up time, and the sum may be used as the switching time of the lot. The acquired information on the resin lot and the switching time of the resin lot may be temporarily stored in a memory area (not shown), and may be acquired together with other information during, for example, the process of S106 of FIG. 6 and registered in a predetermined record in the database in S107.

Incidentally, the information on the resin lot is not limited to the configuration in which the information is picked up by the mark reading portion 142. For example, to the operating panel 100*a* of the injection molding machine 100, an input means such as a keyboard, a mouse, various buttons, a touch panel, etc. may be provided. Information on the resin lot may be input by an operator via the input means, or a button indicating that the resin material has been replenished may be pressed, and the input time or the time when the button is pressed may be used as the switching time of the resin lot. In addition, in the database, both the resin lot 1206 and the switching time may be registered, or only the switching time may be registered. Furthermore, the position for replenishing the resin material 109*c* may also serve as a position for changing the resin material. Furthermore, in addition to the resin lot, a type and a name of the resin may also be registered.

As described above, in a case in which an object or operation which causes the molding defect in the molding member contributes to the molding process at a given time, the given time is associated with the molding member (mark) and registered in the database. By this, it becomes possible to identify the time when the molding defect occurs and focus on the molding members which are molded before and after that time to conduct inspections or discard thereof. In addition, the bag of the resin material is generally stored in a resin storage area. For this reason, the configuration applied to the returnable box described above may be applied directly to the control of the bag of the resin material stored in the resin storage area.

As described above, according to the Embodiment 3, the molding member can be controlled in unit of the returnable box.

INDUSTRIAL APPLICABILITY

According to the present invention, a control system which can control a molding member in unit of a returnable box is provided.

The present Embodiment is not limited to the embodiments described above, and various changes and variations are possible without departing from the spirit and scope of the invention. Accordingly, the following claims are attached to make public the scope of the present invention.

This application claims priority based on Japanese Patent Application No. 2021-142984 filed on Sep. 2, 2021, and all of its contents are hereby incorporated herein by reference.

The invention claimed is:

1. A control system for controlling a molding member stored in at least one box, with at least one first mark indicating information on the at least one box, in which the molding member molded by an injection molding machine is stored, the control system comprising:

a first image pickup means for picking up an image of the first mark on the box;

an acquiring means for analyzing the image, of the first mark on the box, picked up by the first image pickup means and acquiring the information on the box indicated by the first mark; and a construction means for constructing a database by associating the information on the box acquired by the acquiring means with at least one of information on time and information on order of the molding member, wherein the injection molding machine includes a first display portion for displaying information on at least a kind of the molding member, wherein the first image pickup means picks up a first image the first display portion, wherein the acquiring means analyzes the first image of the first display portion picked up by the first image pickup means and acquires the information on the kind, and wherein the construction means associates the information on the kind with the information on the box in the database.

2. The control system according to claim 1, further comprising a second image pickup means, different from the first image pickup means, for picking up a second image of the first display portion, wherein the second pickup means picks up the second image of the first display portion, wherein the acquiring means analyzes the second image of the first display portion picked up by the second image pickup means and acquires the information on the kind, and wherein the construction means associates the information on the kind with the information on the box in the database.

3. The control system according to claim 1, wherein the injection molding machine includes a mold with a second mark including information on the kind of the molding member, wherein the first image pickup means picks up an image of the second mark of the mold, wherein the acquiring means analyzes the image of the second mark of the mold picked up by the first image pickup means and acquires the information on the kind, and wherein the construction means associates the information on the kind with the information on the box in the database.

4. The control system according to claim 1, wherein the injection molding machine includes a mold with a second mark including information on the kind of the molding member, and further comprising a second image pickup means, different from the first image pickup means, for picking up an image of the second mark of the mold, wherein the second pickup means picks up the image of the second mark of the mold, wherein the acquiring means analyzes the image of the second mark of the mold picked up by the second image pickup means and acquires the information on the kind, and wherein the construction means associates the information on the kind with the information on the box in the database.

5. The control system according to claim 1, wherein the box in which the molding member is stored is placed on a first position related to the information on the kind, wherein the first image pickup means picks up an image of the first position, wherein the acquiring means analyzes the image of the first position picked up by the first image pickup means and acquires the information on the kind, and wherein the construction means associates the information on the kind with the information on the box in the database.

6. The control system according to claim 1, wherein the box in which the molding member is stored is placed on a first position related to the information on the kind, and further comprising a second image pickup means, different from the first image pickup means, for picking up an image of the first position, wherein the second image pickup means picks up the image of the first position, wherein the acquiring means analyzes the image of the first position picked up by the second image pickup means and acquires the information on the kind, and wherein the construction means associates the information on the kind with the information on the box in the database.

7. The control system according to claim 1, wherein the molding member has a shape and/or a color related to the information on the kind, wherein the box has a shape and/or a color related to the information on the kind, wherein the first pickup means picks up an image of the molding member and/or the box, wherein the acquiring means analyzes the image, of the molding member and/or the box, picked up by the first pickup means and acquires the information on the kind, and wherein the construction means associates the information on the kind with the information on the box in the database.

8. The control system according to claim 1, wherein the molding member has a shape and/or a color related to the information on the kind, and wherein the box has a shape and/or a color related to the information the kind, and further comprising a second image pickup means, different from the first image pickup means, for picking up an image of the molding member and/or the box, wherein the second pickup means picks up the image of the molding member and/or the box, wherein the acquiring means analyzes the image of the molding member and/or the box picked up by the second pickup means and acquires the information on the kind, and wherein the construction means associates the information on the kind with the information on the box in the database.

9. The control system according to claim 2, wherein the second image pickup means is a camera connected to a network.

10. The control system according to claim 1, wherein the construction means determines a priority order for shipping the box based on at least one of the information on the kind, the information on the time, and the information on the order, and associates the priority order with the information on the box in the database.

11. The control system according to claim 1, wherein the injection molding machine includes a mold, molds the molding member by a predetermined molding condition and a predetermined inner pressure in the mold and transmits molding history information including the molding condition and the inner pressure, and wherein the construction means associates the molding history information with the information on the box.

12. The control system according to claim 1, wherein a predetermined inspection is executed for the molding member stored in the box, and wherein the construction means associates information on the inspection with the information on the box.

13. The control system according to claim 1, wherein the molding member is molded using a resin material, wherein the first pickup means picks up an image of a bag with information on a lot of the resin material and in which the resin material is held, wherein the acquiring means analyzes the image of the bag picked up by the first pickup means and acquires the information on the lot, and wherein the construction means associates the information on the lot and/or time when the information on the lot is acquired with the information on the box.

14. The control system according to claim 1, wherein the first pickup means picks up an image of a first place where a plurality of boxes are placed, the image of the first place including respective images of first marks of the plurality of boxes, and wherein the acquiring means acquires respective coordinates of the plurality of boxes based on the respective images of the first marks of the plurality of boxes in the first place, picked up by the first pickup means and converts the acquired coordinates to virtual coordinates in a virtual space, and further comprising a second display portion including a screen for displaying the virtual space, and for displaying an image corresponding to the plurality of boxes by using the virtual coordinates on the screen.

15. The control system according to claim 1, further comprising a feeding device for feeding the box, wherein the first pickup means picks up an image of a first place where a plurality of boxes are placed, the image of the first place including respective images of first marks of the plurality of boxes, wherein the acquiring means acquires respective coordinates of the plurality of boxes based on the respective images of first marks of the plurality of boxes in the first place, picked up by the first pickup means and converts the acquired coordinates to virtual coordinates in a virtual space, wherein the construction means associates the virtual coordinates with the information on the boxes in the database, and wherein the feeding device feeds the boxes based on the virtual coordinates in the database.

16. The control system according to claim 1, wherein a plurality of the boxes are placed on the first place, wherein in the first place, a position where the boxes are disposed is determined lattice-likely in advance, and wherein the construction means associates the position determined lattice-likely with the information on the boxes in the database.

17. The control system according to claim 1, wherein a plurality of the molded members have the same shape, and wherein a plurality of the boxes have the same shape.

18. The control system according to claim 17, wherein the box includes a partition for dividing an inner space into a plurality divided spaces to store the plurality of molding members, and wherein the construction means associates information indicating the plurality of the divided spaces respectively with the information on the box in the database and associates the information indicating the divided spaces with information on the molding members stored in the divided spaces.

19. The control system according to claim 1, wherein the construction means deletes information excluding the information on the box in the database when the molding member is taken out of the box and the box becomes empty.

20. The control system according to claim 1, wherein the box includes a main body including a space for storing the molding member therein and a lid put on the main body, wherein the first mark is attached to the main body, wherein a third mark indicating information on the lid is attached to the lid, and wherein the construction means associates by subordinating the information on the lid to the information on the box or the information on the box to the information on the lid in the database.

21. The control system according to claim 1, wherein the information on the time is mold opening/closing time when the molding member is formed by the injection molding machine, starting or completion time of process time regarding molding including injection and dwelling time, molding completion time and taking-out time, starting or completion time of packing of the molding member to the box, time when the box reaches and is disposed in a predetermined place, time when an ID for storing the information on the molding member in the database is generated, or aging time determined by at least one of these times and the molding member, and the information on the order includes a shot number of the molding member, the order of packing of the molding member to the box, or the order of completion of packing of the molding member to the box.

22. The control system according to claim 1, wherein a fourth mark indicating the information on the box in a recognizable state by a human is attached adjacent to the first mark.

23. A control system for controlling a molding member stored in at least one box, with at least one first mark indicating information on the at least one box, in which the molding member molded by an injection molding machine is stored, the control system comprising:

a first image pickup means for picking up an image of the first mark on the box;

an acquiring means for analyzing the image, of the first mark on the box, picked up by the first image pickup means and acquiring the information on the box indicated by the first mark; and a construction means for constructing a database by associating the information on the box acquired by the acquiring means with at least one of information on time and information on order of the molding member, wherein the injection molding machine includes a first display portion for displaying information on at least a kind of the molding member, and further comprising a second image pickup means, different from the first image pickup means, for picking up an image of the first display portion, wherein the second pickup means picks up the image of the first display portion, wherein the acquiring means analyzes the image of the first display portion picked up by the second image pickup means and acquires the information on the kind, and wherein the construction means associates the information on the kind with the information on the box in the database.

24. A control system for controlling a molding member stored in at least one box, with at least one first mark indicating information on the at least one box, in which the molding member molded by an injection molding machine is stored, the control system comprising:

a first image pickup means for picking up an image of the first mark on the box;

an acquiring means for analyzing the image, of the first mark on the box, picked up by the first image pickup means and acquiring the information on the box indicated by the first mark; and a construction means for constructing a database by associating the information on the box acquired by the acquiring means with at least one of information on time and information on order of the molding member, wherein the injection molding machine includes a mold with a second mark including information on a kind of the molding member, wherein the information on the time is mold opening/closing time when the molding member is formed by the injection molding machine, starting or completion time of process time regarding molding including injection and dwelling time, molding completion time and taking-out time, starting or completion time of packing of the molding member to the box, time when the box reaches and is disposed in a predetermined place, time when an ID for storing the information on the molding member in the database is generated, or aging time determined by at least one of these times and the molding member, and the information on the order includes a shot number of the molding member, the order of packing of the molding member to the box, or the order of completion of packing of the molding member to the box.

* * * * *